US012790238B2

(12) United States Patent
Gagnon et al.

(10) Patent No.: US 12,790,238 B2
(45) Date of Patent: Nov. 10, 2026

(54) CARBON REMOVAL FROM SEAWATER AND OTHER LIQUIDS USING PHOTOACTIVE COMPOUNDS

(71) Applicant: University of Washington, Seattle, WA (US)

(72) Inventors: Alex Gagnon, Seattle, WA (US); Julian Sachs, Seattle, WA (US)

(73) Assignee: University of Washington, Seattle, WA (US)

( * ) Notice: Subject to any disclaimer, the term of this patent is extended or adjusted under 35 U.S.C. 154(b) by 369 days.

(21) Appl. No.: 18/573,865

(22) PCT Filed: Jun. 23, 2022

(86) PCT No.: PCT/US2022/034790
§ 371 (c)(1),
(2) Date: Dec. 22, 2023

(87) PCT Pub. No.: WO2022/271992
PCT Pub. Date: Dec. 29, 2022

(65) Prior Publication Data

US 2024/0368000 A1 Nov. 7, 2024

Related U.S. Application Data

(60) Provisional application No. 63/363,844, filed on Apr. 29, 2022, provisional application No. 63/265,515, (Continued)

(51) Int. Cl.

*C02F 1/02* (2023.01)
*C02F 1/26* (2023.01)
(Continued)

(52) U.S. Cl.

CPC .................. *C02F 1/26* (2013.01); *C02F 1/02* (2013.01); *C02F 1/30* (2013.01); *C02F 1/42* (2013.01);
(Continued)

(58) Field of Classification Search

CPC ...... C02F 1/26; C02F 1/02; C02F 1/30; C02F 1/42; C02F 1/66; C02F 2001/425;
(Continued)

(56) References Cited

U.S. PATENT DOCUMENTS 8,658,016 B2 2/2014 Lakkaraju et al.
9,227,168 B1 1/2016 DeVaul
(Continued)

FOREIGN PATENT DOCUMENTS

AU 2017276466 B2 12/2017
CN 211013761 U 7/2014
(Continued)

OTHER PUBLICATIONS

Machine English translation of WO_2005121030, Dec. 22, 2005. (Year: 2005).*
(Continued)

*Primary Examiner* — Joseph W Drodge
(74) *Attorney, Agent, or Firm* — Katherine M. Mead; Lee & Hayes PC

(57) ABSTRACT

Systems and methods to remove carbon from liquids such as seawater and other natural waters are described. The systems and methods utilize photoactive compounds to alter the pH of a fluid, drawing carbon out of the liquid and channeling it into a secondary environment. The carbon can be captured and sequestered or used in the formation of a product.

21 Claims, 28 Drawing Sheets

Related U.S. Application Data filed on Dec. 16, 2021, provisional application No. 63/215,029, filed on Jun. 25, 2021.

(51) Int. Cl.

| | |
|---|---|
| ***C02F 1/30*** | (2023.01) |
| ***C02F 1/42*** | (2023.01) |
| ***C02F 1/66*** | (2023.01) |
| ***C02F 1/68*** | (2023.01) |
| *C02F 101/32* | (2006.01) |
| *C02F 101/34* | (2006.01) |
| *C02F 103/08* | (2006.01) |
| *C02F 103/12* | (2006.01) |
| *C02F 103/26* | (2006.01) |
| *C02F 103/34* | (2006.01) |

(52) U.S. Cl.

CPC ................ *C02F 1/66* (2013.01); *C02F 1/685* (2013.01); *C02F 2001/425* (2013.01); *C02F 2101/32* (2013.01); *C02F 2101/34* (2013.01); *C02F 2103/08* (2013.01); *C02F 2103/12* (2013.01); *C02F 2103/26* (2013.01); *C02F 2103/34* (2013.01); *C02F 2201/009* (2013.01); *C02F 2209/06* (2013.01); *C02F 2305/10* (2013.01)

(58) Field of Classification Search

CPC .............. C02F 2101/32; C02F 2101/34; C02F 2103/08; C02F 2103/12; C02F 2103/26; C02F 2103/34; C02F 2201/009; C02F 2209/06; C02F 2305/10; C02F 1/32; C02F 2103/001; C02F 2103/007; C02F 1/68; C02F 1/685; C02F 1/686; B01D 2252/602; B01D 2311/02; B01D 2311/04; B01D 2311/10; B01D 2311/12; B01D 2311/18; B01D 2311/2611; B01D 2325/42

See application file for complete search history.

(56) References Cited

U.S. PATENT DOCUMENTS

| | | | | |
|---|---|---|---|---|
| 9,303,323 | B2 | 4/2016 | DiMascio | |
| 9,776,127 | B2 | 10/2017 | Puxty | |
| 9,914,644 | B1 | 3/2018 | Eisaman | |
| 2002/0005385 | A1* | 1/2002 | Stevens, Sr. | B01D 61/147 210/748.11 |
| 2004/0234888 | A1 | 11/2004 | Lamanna | |
| 2005/0044847 | A1 | 3/2005 | Twigg | |
| 2010/0099580 | A1* | 4/2010 | Carroll | G03F 7/0045 548/462 |
| 2011/0233142 | A1* | 9/2011 | Grossman | C02F 9/20 210/175 |
| 2014/0217017 | A1 | 8/2014 | Fry | |
| 2016/0158690 | A1 | 6/2016 | Puxty | |
| 2016/0251343 | A1 | 9/2016 | Liao | |
| 2017/0050871 | A1 | 2/2017 | El-Naas | |
| 2019/0217255 | A1* | 7/2019 | Ardo | B01D 61/422 |
| 2020/0277207 | A1 | 9/2020 | Park | |
| 2020/0402782 | A1* | 12/2020 | Ardo | B01D 61/463 |
| 2021/0331115 | A1 | 10/2021 | Itani | |
| 2021/0362094 | A1 | 11/2021 | George | |

FOREIGN PATENT DOCUMENTS

| | | | | |
|---|---|---|---|---|
| CN | 107485968 | A | 12/2017 | |
| CN | 112387117 | A | 2/2021 | |
| EP | 0471067 | A4 | 7/2003 | |
| JP | 2010207770 | A | 9/2010 | |
| JP | 2015051012 | A | 3/2015 | |
| WO | WO2003035227 | A1 | 5/2003 | |
| WO | WO-2005121030 | A1 * | 12/2005 | H10F 77/68 |
| WO | WO-2011055234 | A1 * | 5/2011 | C02F 1/32 |
| WO | WO2013022349 | A1 | 2/2013 | |
| WO | WO2020175711 | A1 | 9/2020 | |
| WO | WO2022271992 | A1 | 12/2022 | |

OTHER PUBLICATIONS

Machine English translation of WO_2011055234, May 12, 2011. (Year: 2011).*

Albo, et al., "Use of an optofluidic microreactor and Cu nanoparticles synthesized in ionic liquid and embedded in TiO2 for an efficient photoreduction of CO2 to methanol," Chemical Engineering Journal, vol. 404, 2021, 12 pages.

Arabi, et al., "Capturing atmospheric carbon dioxide by depleting inorganic carbon in municipal wastewater," International Journal of Greenhouse Gas COntrol, vol. 111, 2021, 6 pages.

Babson, "Direct Removal of Carbon Dioxide from Oceanwater," arpa-e. energy.gov, 3 pages.

BBC Research, "Carbon Capture, Utilization & Storage Technologies," retreived from https://www.bccresearch.com/market-research/energy-and-resources/carbon-capture-and-storage-market.html, on May 1, 2024, 9 pages.

Beaupre, et al., "A low-blank photochemical extraction system for concentration and isotopic analyses of marine dissolved organic carbon," Limnl. Oceanogr. Methods., vol. 5, 2007, pp. 174-184.

Bhaduri, Gaurav Ashok, "Catalytic Enhancement of Hydration of CO2 Using Nickel Nanoparticles for Carbon Capture and Storage," Newcastle University, 2015, 298 pages.

Bhola, et al., "Overview of the potential of microalgae for CO2 sequestration," Int. J. Environ. Sci. Technol., vol. 11, 2014, pp. 2103-2118.

Bolden, et al., "Temporally-variable productivity quotients on a coral atoll: Implications for estimates of reef metabolism," Marine Chemistry, vol. 217, 2019, 13 pages.

Chakrabortty, et al., "Photocatalytic conversion of CO2 to methanol using membrane integrated Green approach: A review on capture, conversion and purification," J. Environmental Chemical Engineering, vol. 8, 2020, 15 pages.

Ding, et al., "Carbon capture and conversion using metal-organic frameworks and MOF-based materials," Chem. Soc. Rev., vol. 48, 2019, 46 pages.

Eisaman, et al., "CO2 extraction from seawater using bipolar membrane electrodialysis," Energy Environ. Sci., vol. 5, 2012, 7 pages.

Gagnon, Alexander C., "Geochemical Mechanisms of Biomineralization from Analysis of Deep-Sea and Laboratory Cultured Corals," C.I.T., 2009, 188 pages.

Gao, et al., "Rapid sample preparation of dissolved inorganic carbon in natural waters using a headspace-extraction approach for radiocarbon analysis by accelerator mass spectrometry," Limnol. Oceanogr. Methods, vol. 12, 2014, pp. 174-190.

Gospodinova et al., "Rapid extraction of dissolved inorganic carbon from seawater and groundwater samples for radiocarbon dating," Limnol. Oceanogr, Methods., vol. 14, 2016, pp. 24-30.

Hathorne, et al., "Interlaboratory study for coral Sr/Ca and other element/Ca ratio measurements," Geochemistry Geophysics Geosystems, vol. 14, No. 9, 2013, 21 pages.

Humayun and Anwar, "CO2 capture, storage, transformation, and utilization: An introduction," Micro and Nano Tech., 2021, 19 pages.

Ittekkot, et al., "Organic carbon removal in the sea: the continental connection," Upwelling Systems, 1992, pp. 167-176.

Johnson, et al., "Infrared nanospectroscopic imaging in the rotating frame," Optica, vol. 6, No. 4, 2019, 6 pages.

Kleypas, Joan A., "Impacts of Ocean Acidification on Marine Biodiversity," Yale University Press, 2019, 12 pages.

Kumar, et al., "The role of nanotechnology on post-combustion CO2 absorption in process industries," J. of Low-Carbon Tech., vol. 15, 2020, pp. 361-367.

(56) References Cited

OTHER PUBLICATIONS

Kumaravel, et al., "Photoelectrochemical Conversion of Carbon Dioxide (CO2) into Fuels and Value-Added Products," ACS. Energy Lett., vol. 5, 2020, pp. 486-519.
Lindsey, Rebecca, "Climate Change: Atmospheric Carbon Dioxide," retreived from https://www.climate.gov/news-features/understanding-climate/climate-change-atmospheric-carbon-dioxide on May 1, 2024, 5 pages.
McNichol, et al., "The Rapid Preparation of Seawater CO2 for Radiocarbon Analysis at the National Ocean Sciences Ams Facility," Radiocarbon, vol. 36, No. 2, 1994, pp. 237-246.
Singh, et al., "Effects of electrolyte, catalyst, and membrane composition and operating conditions on the performance of solar-driven electrochemical reduction of carbon dioxide," Phys. Chem. Chem Phys., vol. 17, 2015, pp. 18924-18936.
Su, et al., "Recent advances in the photocatalytic reduction of carbon dioxide," Environ. Chem. Lett., vol. 14, 2016, pp. 99-112.
Takahashi, et al., "A Simple CO2 Extraction Method for Radiocarbon Analyses of Dissolved Inorganic Carbon in Water Samples Without a Carrier Gas," Radiocarbon, vol. 63, No. 4, 2021, pp. 1339-1353.
Tweedie, et al., "The analysis of dissolved inorganic carbon in liquid using a microfluidic conductivity sensor with membrane separation of CO2," 10 pages.
Wilberforce, et al., "Progress in carbon capture technologies," Science of the Total Environment, vol. 761, 2021, 11 pages.
Xu, et al., "Radiocarbon in Dissolved Organic Carbon By Uv Oxidation: Procedures and Blank Characterization at Nosams," Radiocarbon, vol. 63, No. 1, 2021, pp. 357-374.
Zhang, et al., "Carbon capture with iconic liquids: overview and progress," Energy Environ. Sci., vol. 5, 2012, 14 pages.
Zhang, et al., "Photocatalytic reduction of carbon dioxide to methanol and formic acid by graphene-TiO2," A&WMA, vol. 64, No. 5, 2014, pp. 578-585.
Bennett, et al., "Carbon Capture Powered by Solar Energy," Energy Procedia, vol. 114, 2017, pp. 1-6.
Invitation to Pay Additional Fees Dated Aug. 30, 2022 for PCT Application No. PCT/US2022/034790, 2 pages.
PCT Search Report and Written Opinion Dated Nov. 1, 2022 for PCT Application No. PCT/US22/34790, 14 pages.
Hartmann, "Enhanced Chemical Weathering as a Geoengineering Strategy to Reduce Atmospheric Carbon Dioxide, Supply Nutrients, and Mitigate Ocean Acidification", Reviews of Geophysics, 51(2), May 23, 2013, pp. 113-149.

* cited by examiner

Degradation products of hydrolysis are the reactants of the final step of synthesis, allowing regeneration

CARBON REMOVAL FROM SEAWATER AND OTHER LIQUIDS USING PHOTOACTIVE COMPOUNDS

CROSS-REFERENCE TO RELATED APPLICATIONS

This application is a U.S. National Phase based on International Patent Application No. PCT/US2022/034790, filed on Jun. 23, 2022, which claims priority to U.S. Provisional Patent Application Nos. 63/215,029 (filed Jun. 25, 2021), 63/265,515 (filed Dec. 16, 2021), and 63/363,844 (filed Apr. 29, 2022), the entire contents of each of which are incorporated by reference herein in their entirety.

FIELD OF THE DISCLOSURE

The current disclosure provides systems and methods to remove carbon from carbon-containing liquids. The carbon can be dissolved inorganic carbon and the liquid can be carbon-containing water, such as seawater, ocean water, or river water.

BACKGROUND OF THE DISCLOSURE

Earth's climate change is a global concern. Since 1880, the Earth's temperature has risen by 0.14° F. (0.08° C.) per decade, and this rate of warming has more than doubled (0.32° F. (0.18° C.)) per decade since 1981. This increase has caused extreme temperatures, arctic sea ice melt, glacier melt, shifts in rainfall, and it has contributed to the changing habitats of plants and animals. (Climate Change: Global Temperature. NOAA Climate.gov, 2021 [Accessed 18 Jun. 2021]).

The greenhouse effect is responsible for the natural warming of Earth's climate and is critical to life's existence on Earth. Mainly, greenhouse gases such as carbon dioxide ($CO_2$), water vapor ($H_2O$), nitrous oxide ($N_2O$), methane ($CH_4$), ozone ($O_3$), and artificial chemicals such as chlorofluorocarbons (CFCs) absorb and re-radiate some of the sun's radiation that reaches the Earth's atmosphere by reflecting the infrared radiation (heat) the Earth emits.

Carbon dioxide is one of the major components that make up greenhouse gases. It is a naturally occurring chemical compound that is present in Earth's atmosphere as a gas and in the Earth's oceans as a dissolved molecule. Sources of atmospheric $CO_2$ are varied and include humans and other living organisms that produce $CO_2$ in the process of respiration and other naturally occurring sources, such as volcanoes, hot springs, and geysers. Carbon dioxide readily dissolves in water. Depending on the pH of the water parcel, carbon dioxide exists in several forms when dissolved in water, such as $CO_2$, carbonic acid ($H_2CO_3$), bicarbonate ($HCO_3^-$), and carbonate ($CO_3^{2-}$). The total of the dissolved components of $CO_2$ makes up the dissolved inorganic carbon concentration in water (Dodds, et al., *Freshwater Ecology,* 2002).

Human (or anthropogenic) activity such as the burning of fossil fuels (coal, oil, and natural gas) and agriculture and land clearing have released an estimated 2000 Gt of $CO_2$ since 1750 (IPCC, 2014: *Climate Change* 2014: *Synthesis Report. Contribution of Working Groups I, II and III to the Fifth Assessment Report of the Intergovernmental Panel on Climate Change*). These carbon emissions disrupt the natural warming process of Earth's climate by increasing the concentration of greenhouse gases, such as $CO_2$, which has increased in the atmosphere from a pre-industrial level of 280 ppm in 1750 to more than 400 ppm today. This increase leads to an enhanced greenhouse effect, thereby causing significant global warming. (Department of Agriculture, Water, and the Environment. Environment.gov.au. 2021 [Accessed 18 Jun. 2021]).

Several international agreements as well as complementary efforts led by industry and concerned citizens aim to reduce the amount of greenhouse gases in the atmosphere in an attempt to slow global warming. Meeting these ambitious carbon reduction goals will require the simultaneous deployment of many strategies, including emission reductions, increased utilization of renewable energy production, and the use of carbon removal technologies (IPCC, 2014: *Climate Change* 2014: *Synthesis Report. Contribution of Working Groups I, II and III to the Fifth Assessment Report of the Intergovernmental Panel on Climate Change*). Carbon removal aims to remove carbon from earth surface reservoirs like the atmosphere or surface ocean and then capture this removed carbon so that it cannot contribute to global warming. There are further benefits to removing carbon from ocean water specifically. Much of the carbon emitted by humans into the atmosphere is quickly dissolved into the ocean. This extra carbon lowers seawater pH in a process called ocean acidification. Ocean acidification negatively impacts marine organisms in many ways. Organisms with calcium carbonate shells or skeletons, like oysters and corals, are especially sensitive to ocean acidification. Ocean acidification has been implicated in major disruptions to the shellfish industry and is projected to harm coral reefs, which would put a major aspect of the global tourism industry at risk.

Given the previously described motivations, the capture of $CO_2$ (e.g., anthropogenic $CO_2$) is of great importance. Specifically, there is a need to develop techniques to remove carbon from liquids like seawater and capture the removed carbon. Such capture of carbon is essential in the effort to slow or reverse global warming and ocean acidification.

SUMMARY OF THE DISCLOSURE

Several embodiments of systems and methods to remove carbon from liquids are presented. In certain examples, removed carbon is transferred into a target stream and captured for a use.

One set of systems and methods utilize photoactive compounds (e.g., photocacids) within a working fluid situated between a source liquid containing carbon and a target stream. The photoactive compounds within the working fluid can be used to alter the pH of the working fluid, drawing carbon out of the source liquid and channeling it into the target stream (e.g., target liquid or gas).

Another set of systems and methods utilize photoactive compounds to lower the pH of the carbon-containing source liquid, driving carbon out of this liquid. These photoactive compounds can be directly situated within the carbon-containing source liquid itself, either within the source liquid stream or at the boundary in contact with that liquid; or they can be embedded within a material that contacts the source liquid; or the photoactive compounds can be part of another auxiliary fluid that influences the pH of the source liquid via an ion permeable membrane.

Another set of systems and methods combines the two approaches described previously; photoactive compounds are utilized to change the pH of a working fluid and photoactive compounds are utilized to lower the pH of the source liquid.

Another set of systems and methods is similar to the approaches described above but adds heating to the use of photoactive compounds to drive the flow of carbon.

Another set of systems and methods combines the previously described approaches, utilizing heating, cooling, and pH changes of the source liquid and/or working fluid to remove carbon from the source liquid, and optionally, subsequently capture the removed carbon.

BRIEF DESCRIPTION OF THE SEVERAL VIEWS OF THE DRAWINGS

As shown in FIG. 1A, removing $CO_2$ from the surface ocean is equivalent to direct air capture. First, carbon is removed from seawater in the surface ocean instead of from the atmosphere. Since carbon in the atmosphere and the surface ocean equilibrate rapidly (timescale of months), the atmosphere and surface ocean can be effectively treated as a single reservoir. $CO_2$ emissions may occur anywhere. For example, $CO_2$ emissions can be from a delivery truck in the middle of a continent, from a flying airplane, or from a cargo ship at sea. In each case, $CO_2$ gets dispersed throughout the atmosphere and the ocean acts like a sponge for $CO_2$. When the carbon is removed from the ocean, then the ocean will absorb an equal amount of $CO_2$ from the air in its place. The surface ocean equilibrates quickly with the atmosphere (timescale of 3 to 4 months; Jones, Daniel C., Takamitsu Ito, Yohei Takano, and Wei-Ching Hsu. "Spatial and Seasonal Variability of the Air-Sea Equilibration Timescale of Carbon Dioxide." Global Biogeochemical Cycles 28, no. 11 (November 2014): 1163-78). (1B) amount of carbon dioxide in seawater and the atmosphere on a volume basis. As shown in FIG. 1B, typical seawater contains 99 grams carbon/$m^3$. Seawater naturally concentrates $CO_2$ from the air. On the other hand, $CO_2$ is rare in the atmosphere with an amount of 0.7 grams carbon/$m^3$.

The disclosed seawater-based carbon removal can be compared to other competing processes, like direct air capture. Existing direct air capture needs massive fan farms. Moreover, the air-based processes rely on energy-intensive processes to remove carbon from the atmosphere. However, there is less than a gram of $CO_2$ in every cubic meter of air. Thus, 1.4 million $m^3$ of air needs to be processed to remove a metric ton of $CO_2$. Furthermore, the separation problem is difficult. Because for every molecule of carbon dioxide that is captured from the air, there are more than 2000 other gas molecules in the way.

Advantages of the disclosed direct seawater capture include the following:

The ocean is a "passive fan farm." Pumping seawater is an established technology. Seawater capture may have synergy with other industrial processes. Large nearshore sequestration capacity is available.

Seawater naturally concentrates carbon from the atmosphere. There are more than 140 times more grams of carbon in a cubic meter of typical seawater than a cubic meter of air, which means that a carbon capture facility that relies on seawater has to pump less volume. Furthermore, pumping seawater at scale is an established technology. Therefore, instead of massive fan farms—the whole surface ocean can be used as a passive natural fan farm. The separation problem with respect to other dissolved gases is also more favorable in seawater. Instead of being a minor component, dissolved carbon is much more abundant than all other dissolved gases in seawater. This enrichment of carbon in seawater fundamentally changes key aspects of the energetics and ability to scale carbon capture.

There is ample sequestration capacity near coasts—on the continental shelves. Therefore, carbon removal at coasts is conveniently located for the end user. Moreover, there are many power plants and desalination facilities that already pump seawater that can be co-located with the process. There may be even deeper ways to integrate the carbon removal process with these processes. At a minimum, the operation of these facilities for decades at scale indicates the extent to which pumping large volumes of seawater is a proven technology.

Figure 1A:
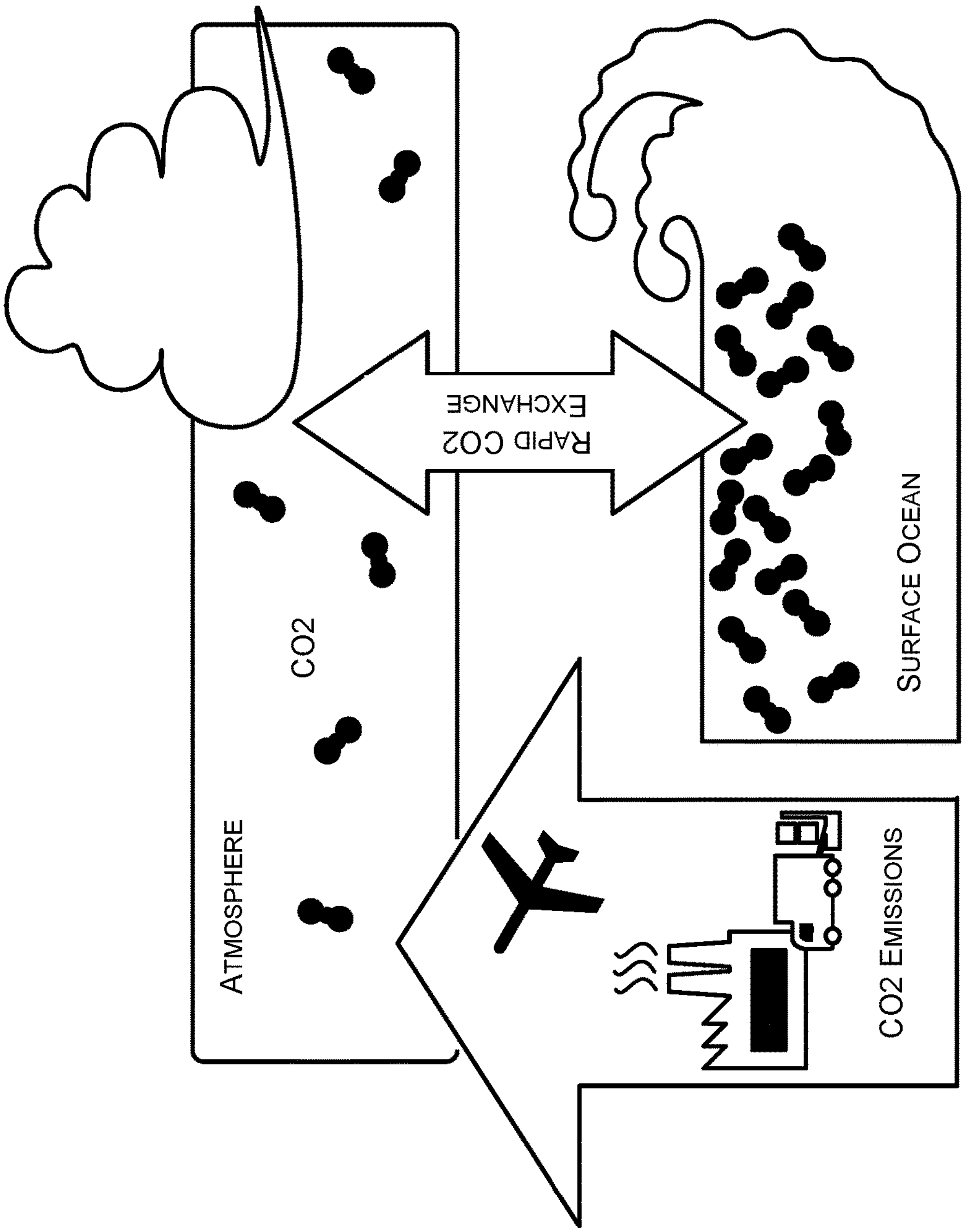
FIGS. 1A, 1B. (1A) mechanism of removing $CO_2$ from the atmosphere.
Figure 1B:
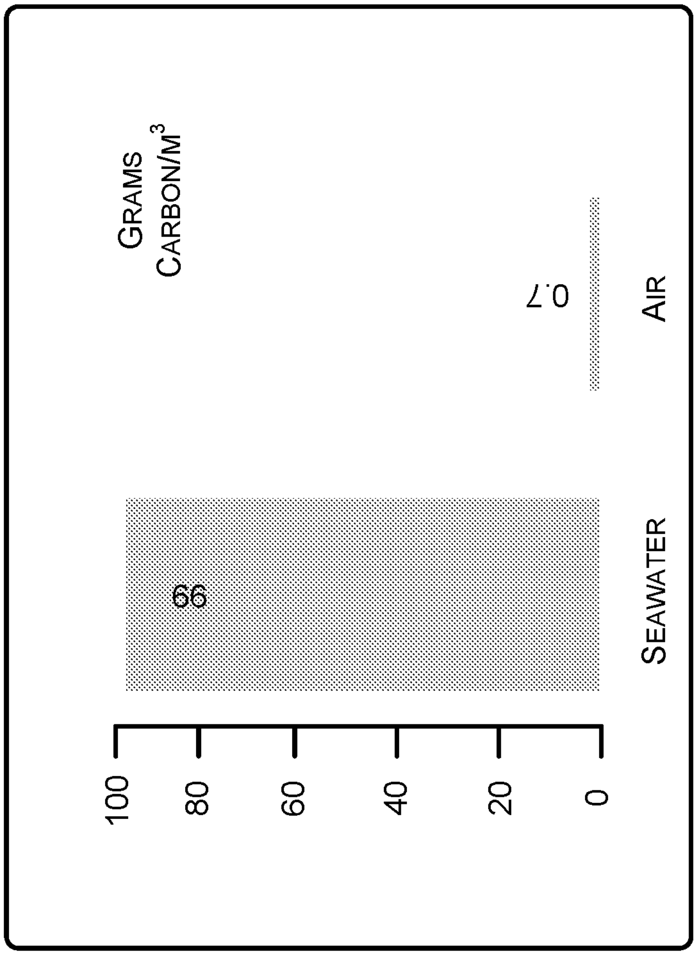
Figure 2A:
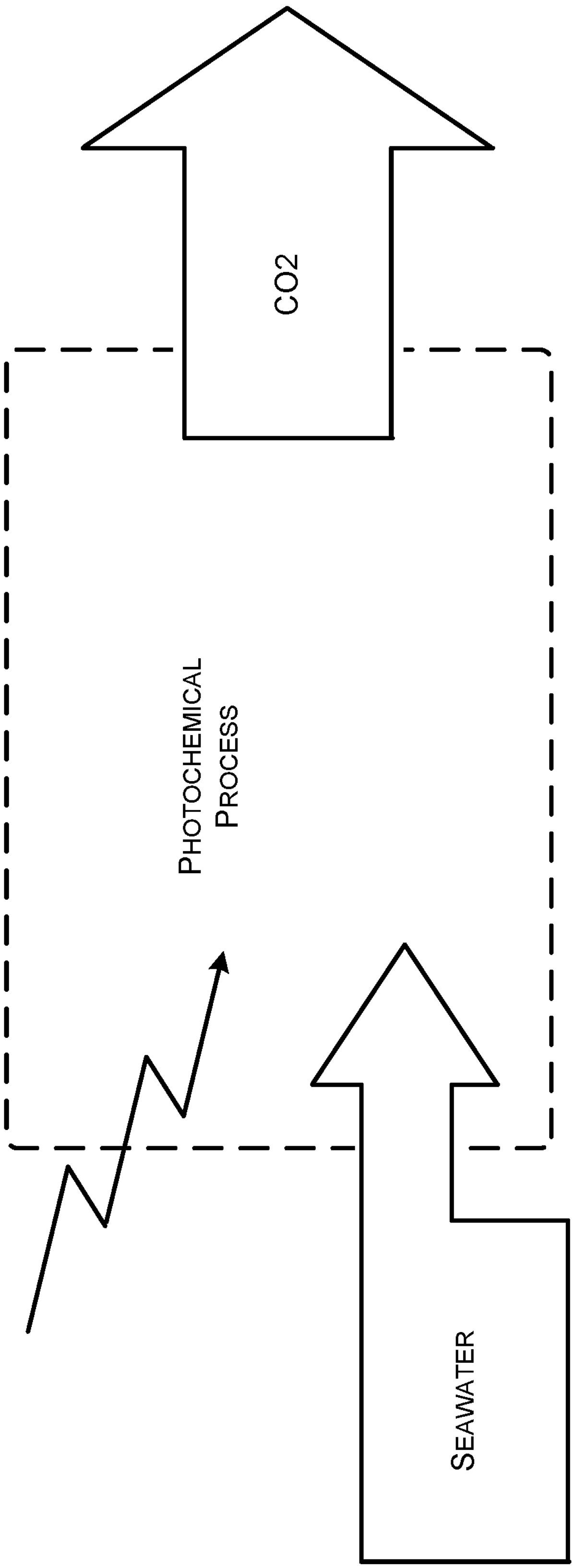
Figure 2B:
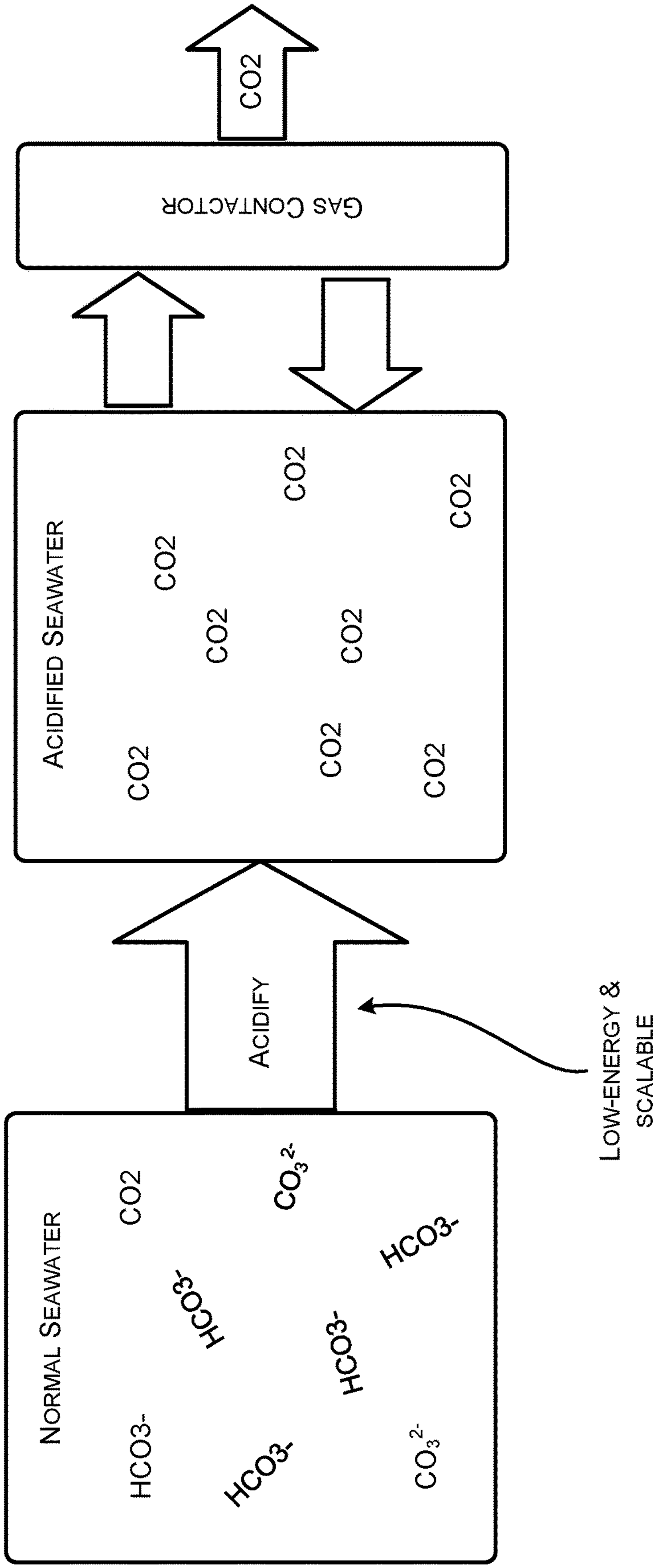

FIGS. 2A, 2B. (2A) process for carbon removal and capture. As shown in the embodiment depicted in FIG. 2A, the inputs are natural seawater, and light, the outputs are seawater with carbon removed and carbon dioxide. This process has been developed to remove carbon from the environment to reduce the impacts of climate change, meet the needs of a rapidly growing carbon removal market, and hasten the global transition to a net-zero carbon economy. In implementations, carbon removal credits can be sold—which are required for companies and governments to meet their ambitious climate goals. Reduced to its simplest form, the process is designed to take seawater as an input and produce carbon dioxide for subsequent sequestration or utilization. The light-triggered chemical reaction during the process is a new approach that can significantly reduce the cost of direct carbon removal. (2B) process of acidifying seawater to liberate $CO_2$. As shown in FIG. 2B, most carbon in seawater occurs in protonated and hydrated forms. By acidifying seawater, carbon in protonated and hydrated forms can be converted into $CO_2$ that passively diffuses across a gas contactor membrane. The innovation described herein uses photoactive compounds (e.g., light-activated reversible photoacids) to make the acidification step low-energy and scalable. In this example, the $CO_2$ removal efficiency may be more than 80%. This process does not rely on sorbents or solvents, so that there use is optional and can be included or excluded. There is immediate and verifiable removal of $CO_2$. The seawater depicted in the FIG. can also represent other carbon-containing liquids, such as those described elsewhere herein, as well as other forms of artificial light.

Figure 3:
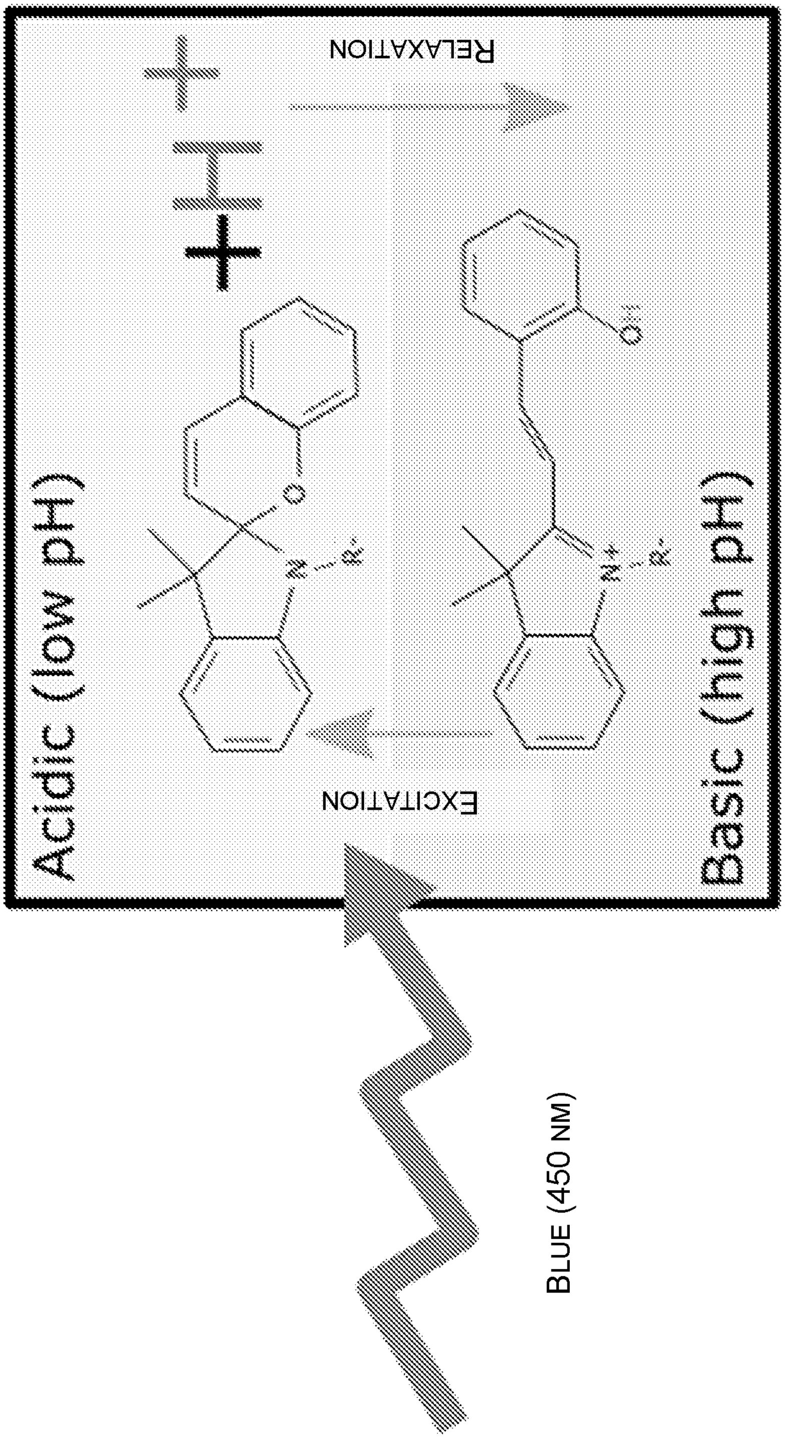

FIG. 3 illustrates an example process of using reversible photoacids, triggered by light, to acidify seawater. As shown in FIG. 3, this technology makes use of reversible photoacids to acidify seawater. Upon exposure to light (such as blue light with a wavelength of 450 nm), these molecules (photoacids) assume a conformation that makes them more acidic, causing them to release protons that are then used to acidify seawater. Relaxation of the photoacids occurs spontaneously in the dark in seconds to minutes, after which they can be reactivated with light to release protons once again. This figure shows a specific class of reversible photoacids, but other examples of photoacids can be used, as described in this application.

Figure 4:
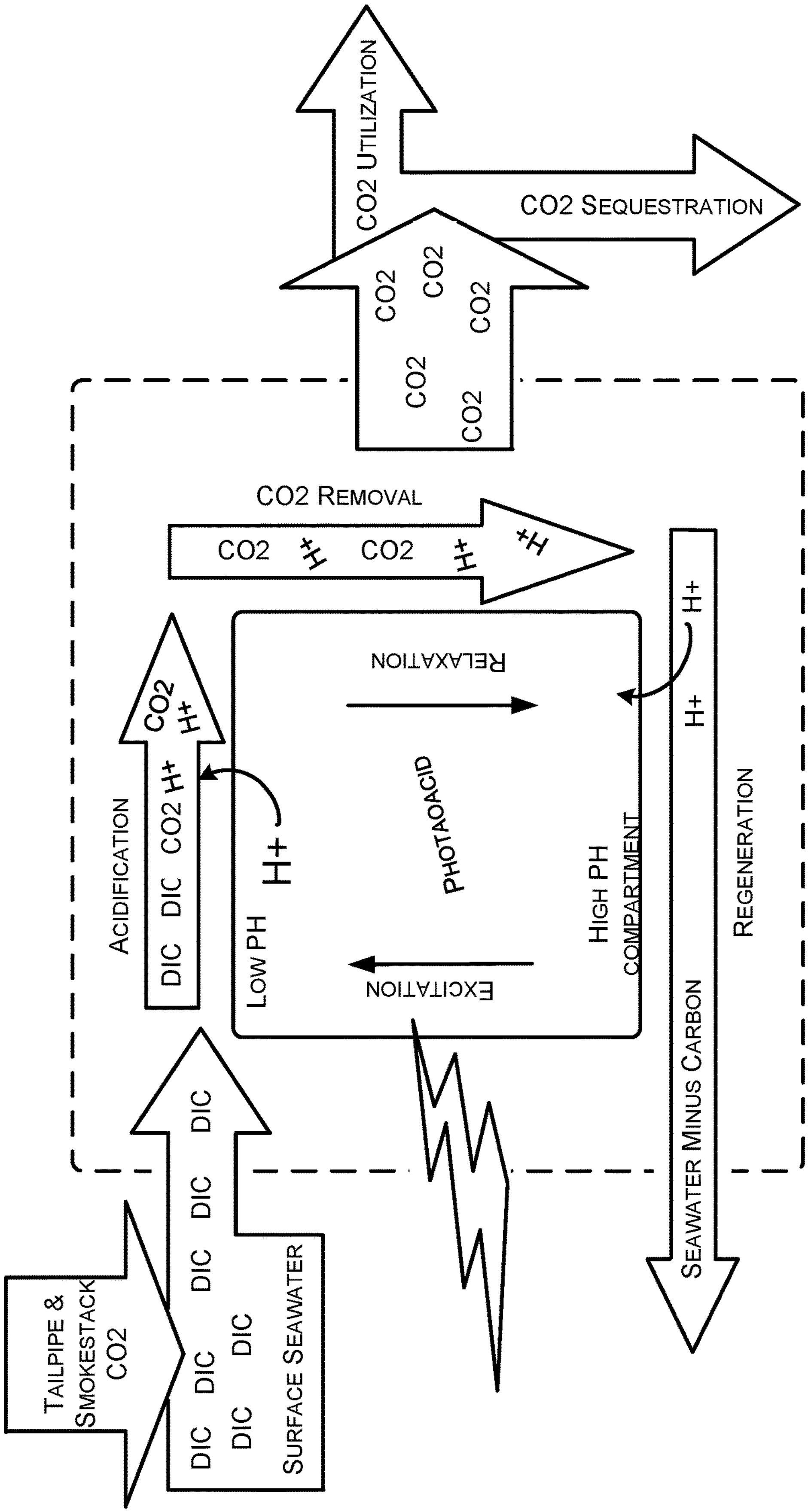

FIG. 4 illustrates an example process of carbon removal and capture from surface seawater. During the first step of the chemical cycle at the heart of our process, visible light from the sun or an artificial light source excites reversible photoacids to release protons. These protons acidify seawater, lower seawater pH, and shift the dissolved carbon into $CO_2$ gas. This $CO_2$ gas is removed from seawater by rapid, passive diffusion across gas contactor membranes. The $CO_2$ thus produced can be used as is or pressurized and purified to levels required for different markets, such as sequestration or in the production of fertilizer, plastics, cement, methanol, or biofuels. By co-locating with facilities that pump and discard large volumes of seawater, such as power and desalination plants, or utilizing tidal or river currents to provide the necessary pressure head, the energy and cost expenditures associated with pumping water can be further reduced and a waste stream can be converted into a green revenue stream. Meanwhile the photoacid is pumped from light into the dark, where it spontaneously relaxes back to its more basic form. The cycle is completed when the now basic photoacid is regenerated using spent seawater. The carbon-deficient seawater that is returned to the ocean has the added benefit of counteracting ocean acidification. DIC stands for dissolved inorganic carbon (which consists of $H_2CO_3$, $CO_2$ (aq), $HCO_3^-$, $CO_3^{2-}$).

Figure 5:
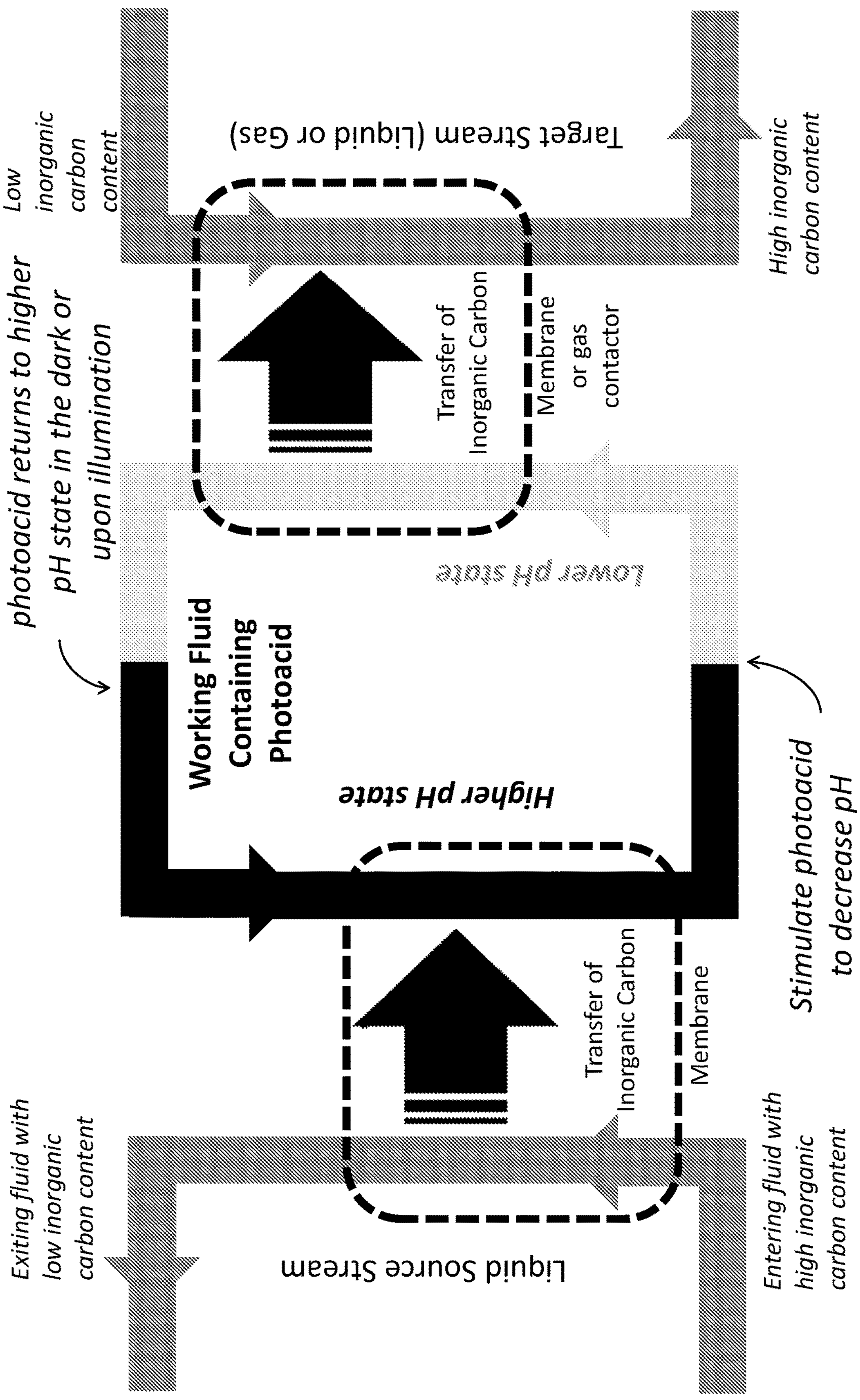

FIG. 5: Illustrates the diffusion of $CO_2$ from a liquid source stream (also referred to herein as a carbon-containing liquid) into a working fluid to a target stream (e.g., liquid or gas).

Figure 6:
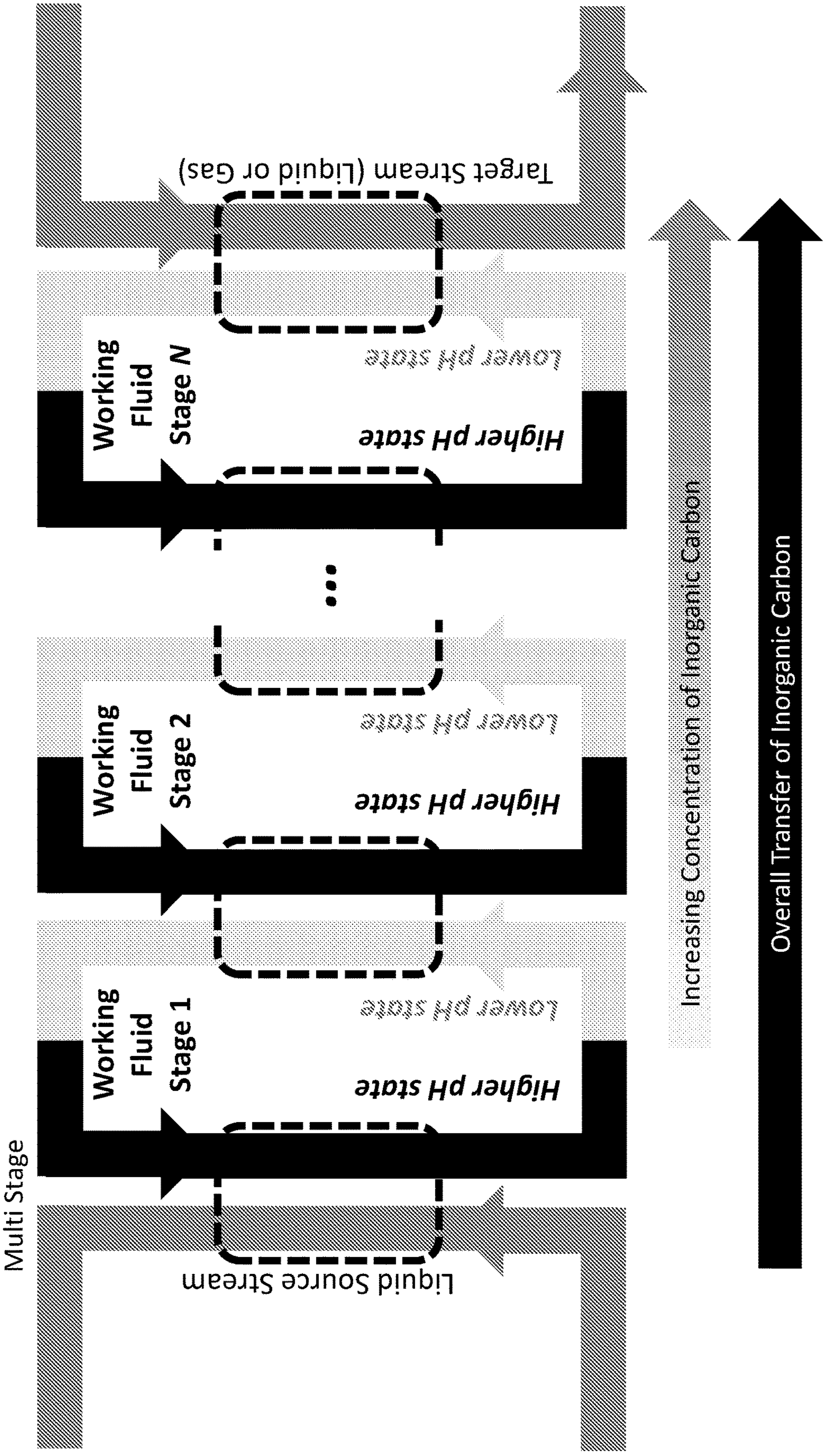

FIG. 6: Illustrates a multi-stage process for diffusing $CO_2$ from one sample of working fluid in the higher pH state to another sample of working fluid in the lower pH state across a membrane to concentrate $CO_2$.

Figure 7:
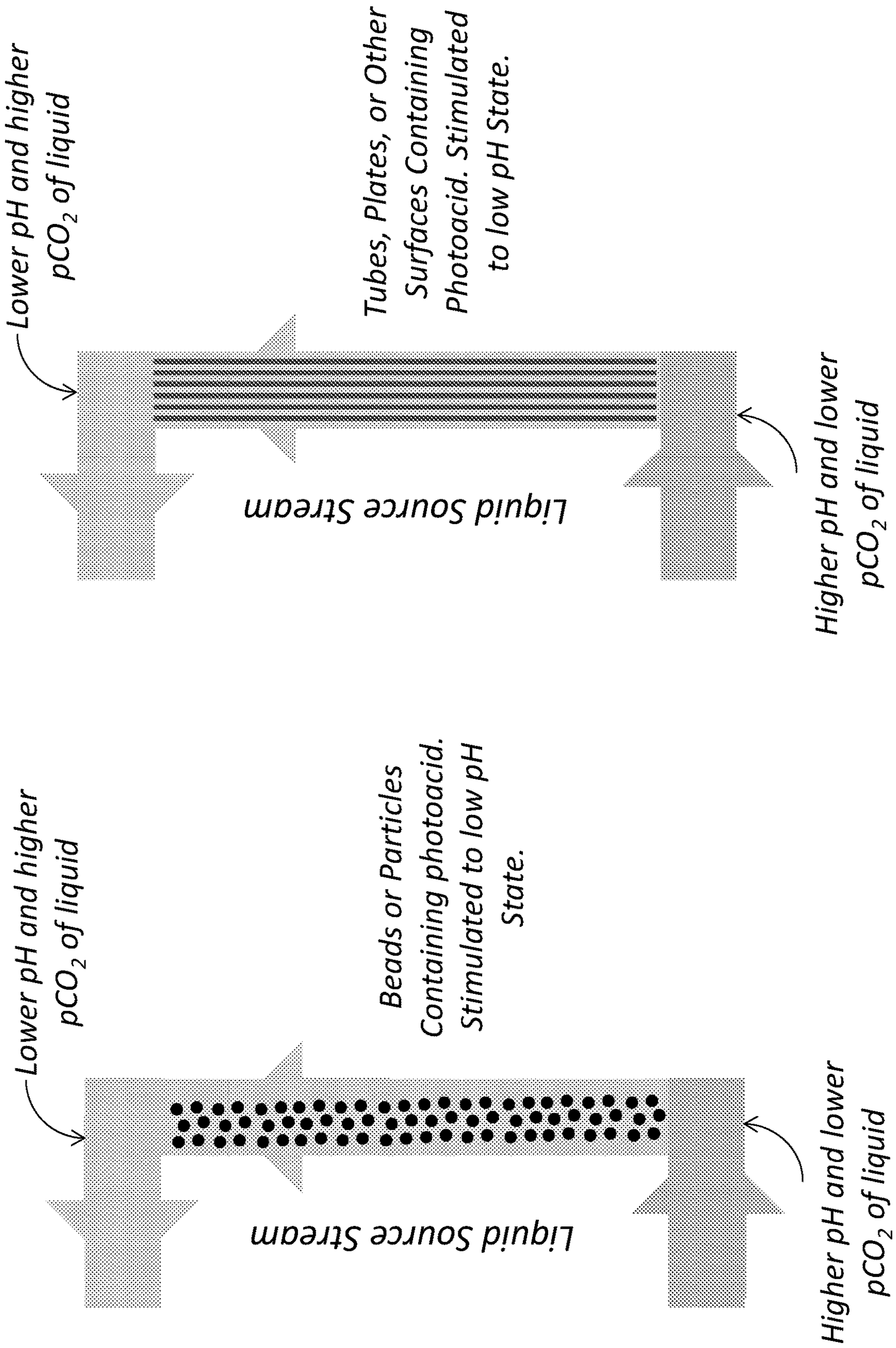

FIG. 7: Illustrates the removal of inorganic carbon out of a carbon-containing liquid source stream by lowering its pH to increase the partial pressure of carbon dioxide and convert some or all of the inorganic carbon into $CO_2$ using photoacids that are embedded within beads or on solid surfaces through/by which the carbon-containing liquid passes.

Figure 8:
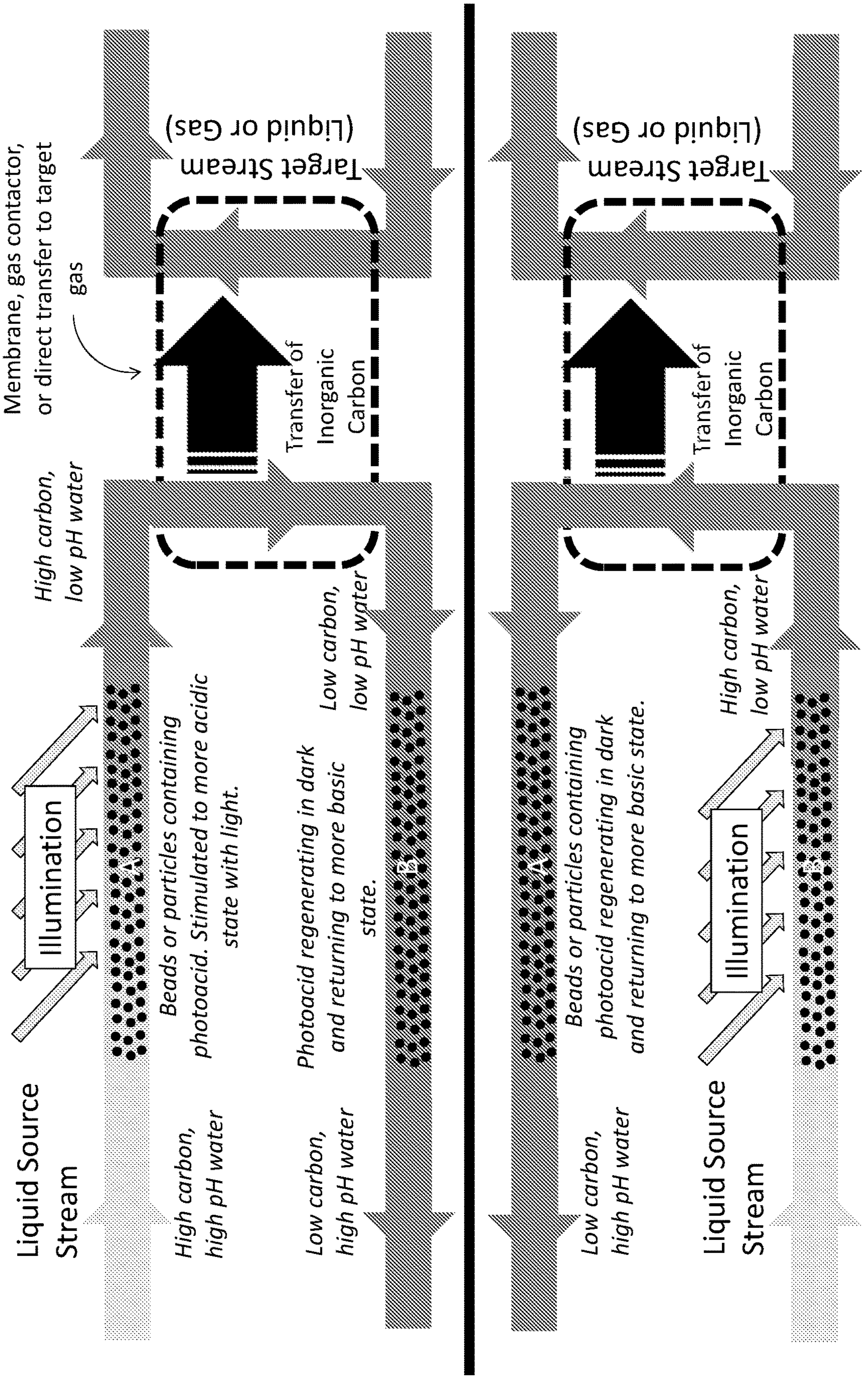

FIG. 8: Illustrates the acidification of a carbon-containing liquid (liquid source stream) by photoacids embedded in beads or particles stimulated to acidic state by illumination (A in top diagram) to increase the partial pressure of carbon dioxide by converting some or all of the dissolved inorganic carbon to $CO_2$ and the transfer of that $CO_2$ to a target stream. The photoacid is returned to the basic state in the absence of illumination (B in top diagram) whereby the pH of the liquid source stream becomes increased. Direction of liquid source stream flow can be reversed such that the regenerated photoacid can be used to acidify the liquid source stream upon illumination of the photoacid (B in bottom panel) while the previously stimulated photoacid is regenerated in the dark and returned to its more basic state (A in bottom panel).

Figure 9:
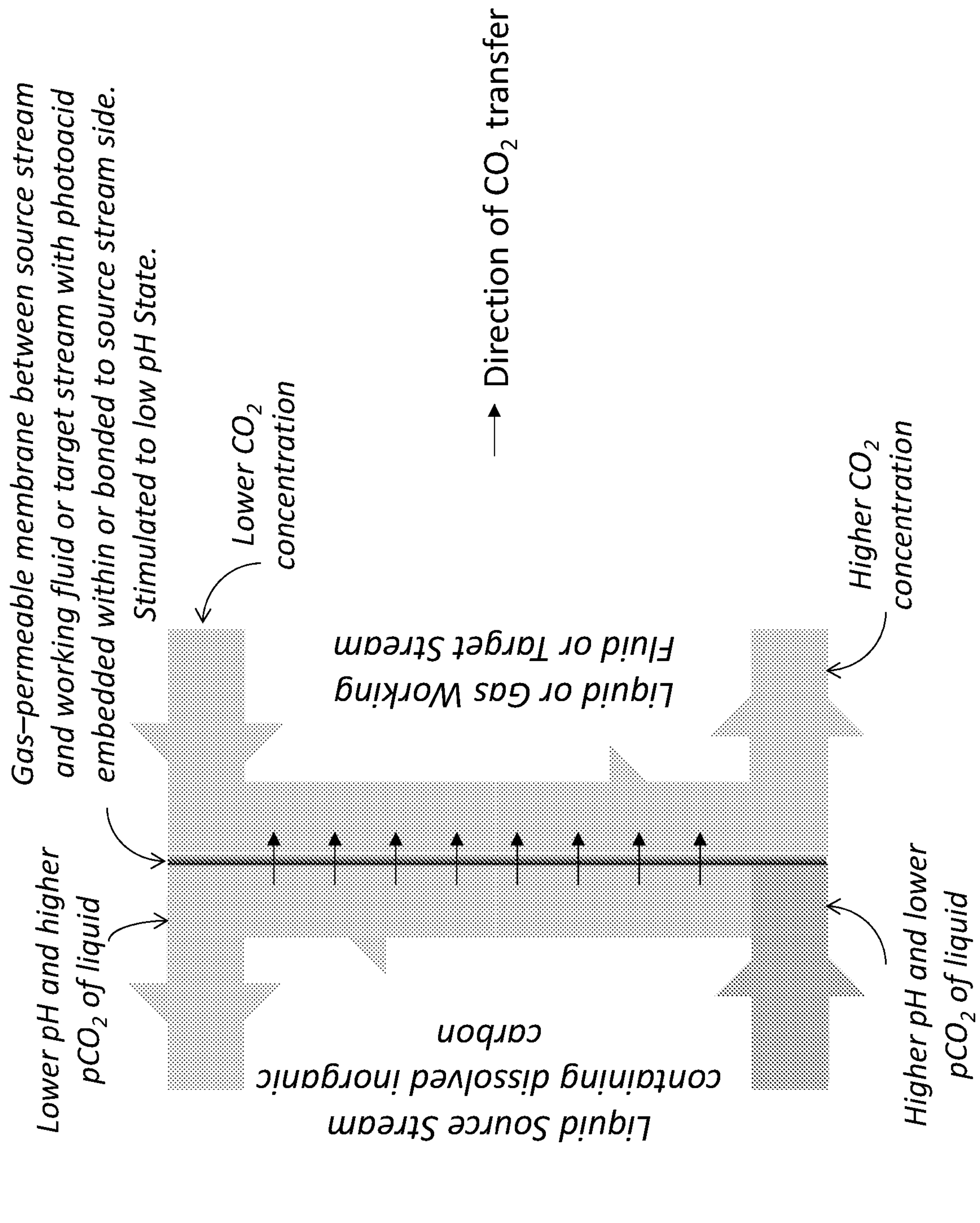

FIG. 9: Illustrates photoacids embedded on the carbon-containing liquid (liquid source stream) sides of a gas-permeable membrane.

Figure 10:
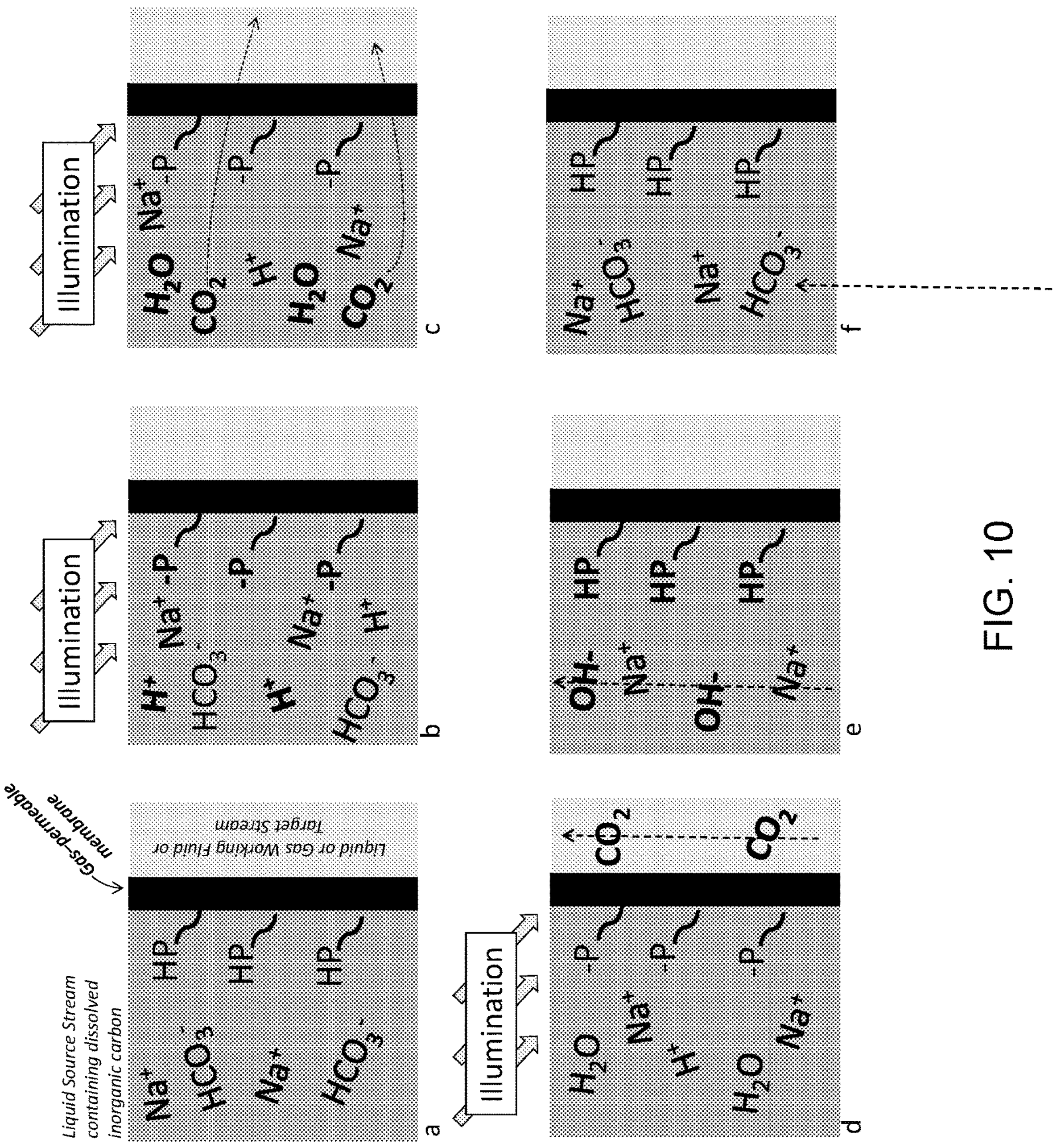

FIG. 10: Illustrates one process through which photoacids attached to the carbon-containing liquid (liquid source stream) of a gas-permeable membrane can enhance carbon removal from the carbon-containing liquid with subsequent carbon uptake by the target stream. In this figure "HP" indicates protonated photoacid and "-P" indicates deprotonated photoacid. (a) Fluid on the carbon-containing liquid source side of the membrane contains dissolved inorganic carbon, primarily as ions like bicarbonate that cannot diffuse across a gas permeable membrane (b) Illumination of the photoacid lowers the pH within the carbon-containing liquid source side boundary layer and/or the region nearby the membrane on the carbon-containing liquid source side. (c) low pH in this region causes bicarbonate and/or carbonate ions to combine with protons, which results in the formation of $CO_2$ molecules. (d) $CO_2$ diffuses across the membrane where it is quickly transported away from the membrane region. (e) Illumination is removed and the photoacids are regenerated, resulting in a basic solution that is advected away by the flow of the carbon-containing liquid source fluid. (f) The flow of the carbon-containing liquid source fluid replaces the dissolved inorganic carbon ions on the source side of the membrane and the process is ready to begin again. Dashed arrows indicate the action of fluid or gas flow. Although arrows are only included in some sub-figures to highlight the impact of this flow, the flow can be continuous. The direction of the fluid and gas flow could also differ from the arrows shown here, what is important is the transport of materials by this flow.

Figure 11:
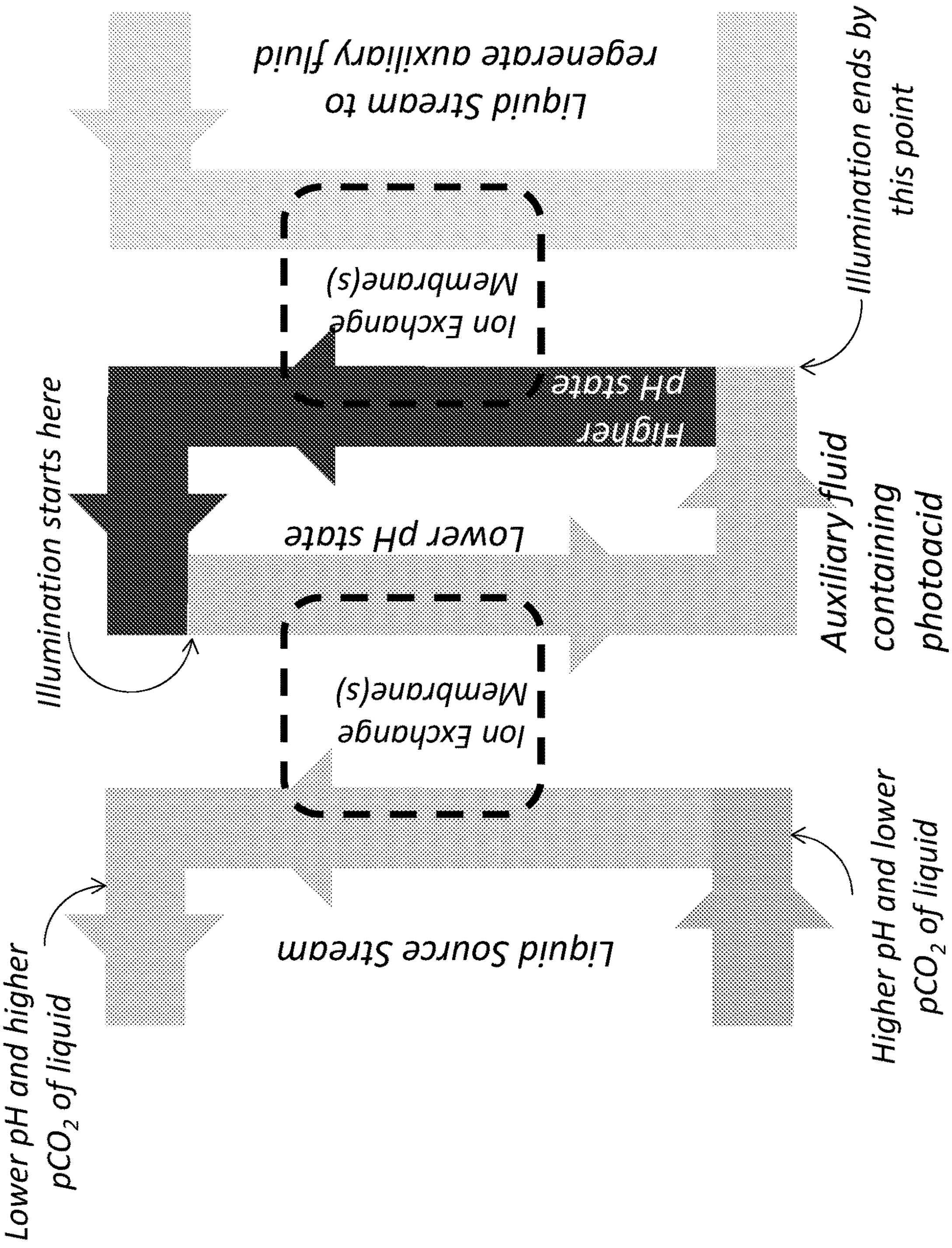

FIG. 11: Illustrates photoacids contained within an auxiliary fluid separated from the carbon-containing liquid source stream by one or more ion exchange membranes such that protons generated by this photoacid act to acidify the carbon-containing source fluid and convert some or all of the dissolved inorganic carbon species into $CO_2$. Regeneration of this auxiliary fluid could be done using the source fluid after $CO_2$ removal or regeneration could be done using other fluids, like natural seawater or natural river water.

Figure 12:
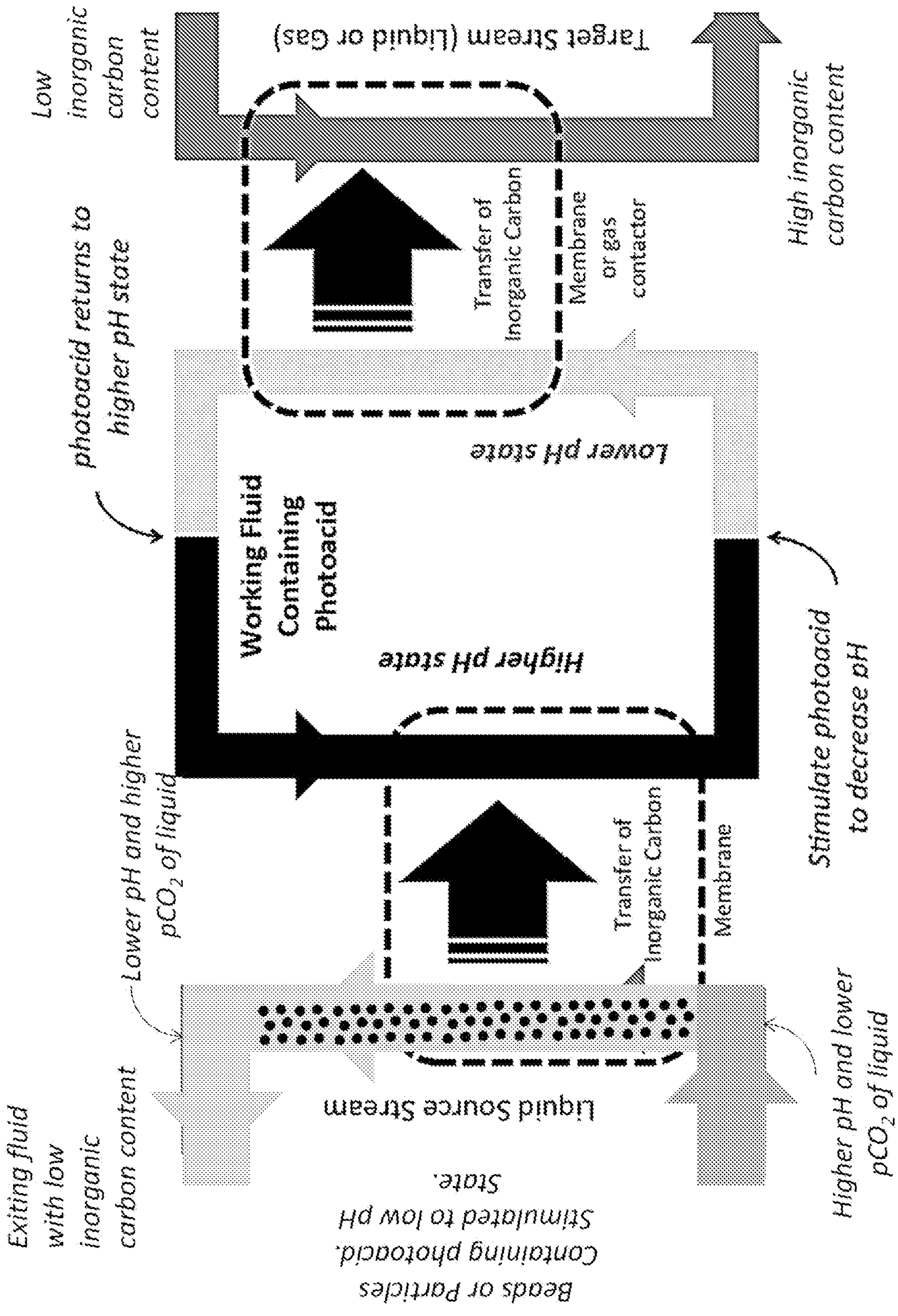

FIG. 12: Illustrates how the two processes of (1) acidification of carbon-containing source stream with photoacids to elevate carbon dioxide partial pressure and (2) transfer of that carbon dioxide to a target stream via a working fluid containing photoacids are used in tandem to maximize the efficiency of carbon transfer from source stream to target stream.

Figure 13:
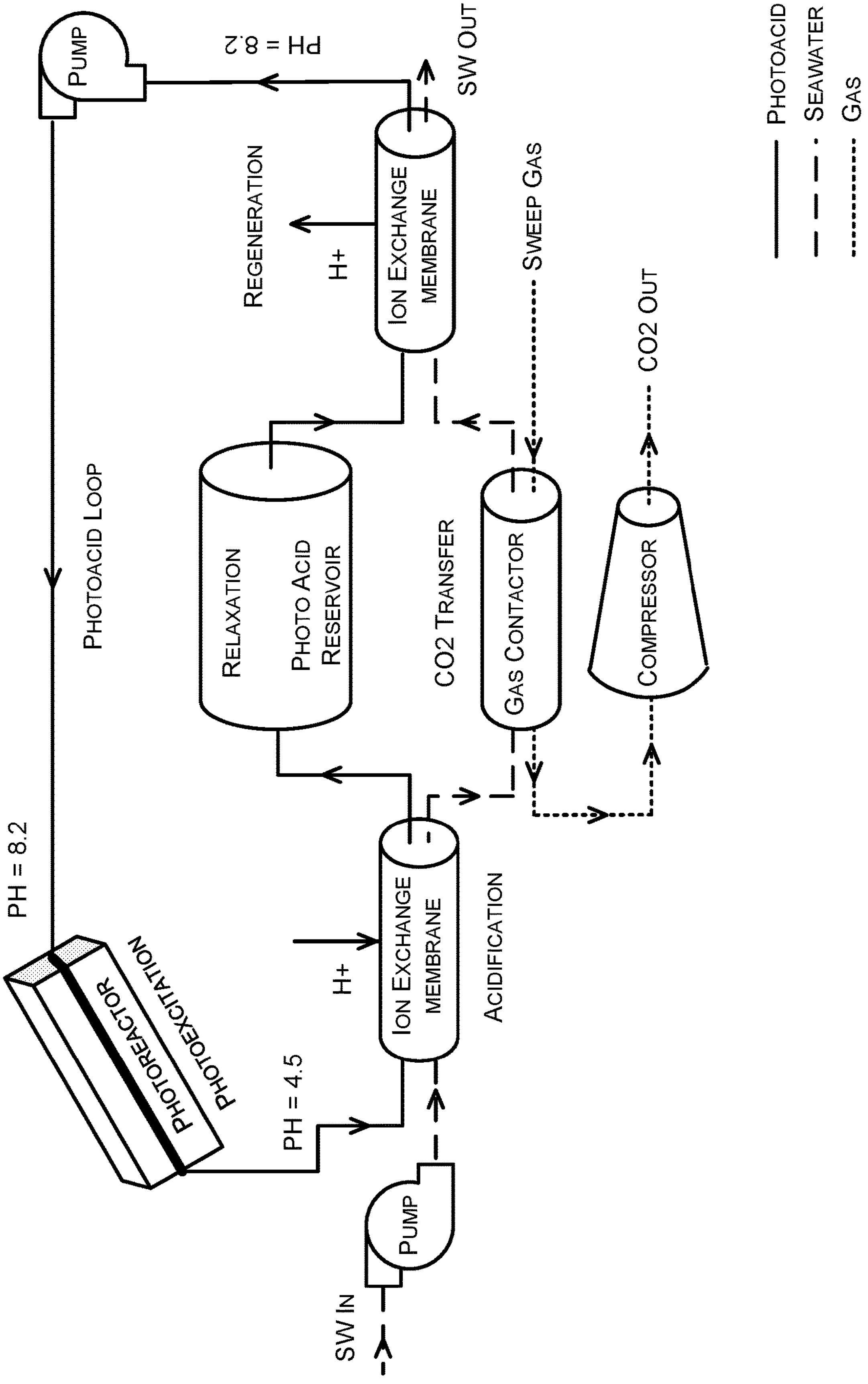

FIG. 13 illustrates an example process of carbon capture using sweep gas, seawater, and photoacid. In FIG. 13, incoming seawater (SW In) could be provided by the waste water from desalination or thermoelectric power plants; by currents or tides. A SW In flow of 36,000 $m^3$ SW/day could produce 1 kton $CO_2$/yr; a SW In flow of 36,000,000 $m^3$ SW/day could produce 1 Mton $CO_2$/y. The amount of seawater needed is estimated here; the exact amount is influenced by the efficiency of $CO_2$ removal. For comparison, the amount of seawater pumped and discarded each day by the Diablo Canyon Nuclear Power Plant in California is 8 million $m^3$/day and the amount of seawater pumped each day by the seawater cooling facility in Jubail, Saudi Arabia is 30,000,000 $m^3$/day. As shown in FIG. 13, the process may include a photoacid loop (represented by solid lines), a water flow path (represented by dashed lines), and a gas flow path (represented by dotted lines).

The photoacid loop may include the following operations. Photoacids (PA) are converted to an acidic state in the photoreactor. Protons are transferred to seawater through a cation exchange membrane. The photoacid is subject to thermal relaxation to the ground state in the dark reservoir. Regeneration of ground state (basic form/high pH) is conducted by cation exchange from seawater. Then, the cycle can be repeated.

The water flow path may include the following operations. Seawater is pumped through a cation exchange membrane where it is acidified by activated PA. Dissolved carbon is converted to $CO_2$. $CO_2$ is stripped out by a gas contactor membrane. Seawater with higher pH transfers protons back to ground state PA, regenerating it for the next cycle. Seawater outflow lowers ocean acidity (i.e., raises pH) of receiving water, regionally countering ocean acidification.

The gas flow path may include the following operations. Sweep gas is pumped through the gas contactor membrane where $CO_2$ from acidified seawater is added. $CO_2$ product is compressed for transport to sequestration or utilization sites. Alternatively, sweep gas may not be used with only a vacuum applied to the gas contactor.

Figure 14:
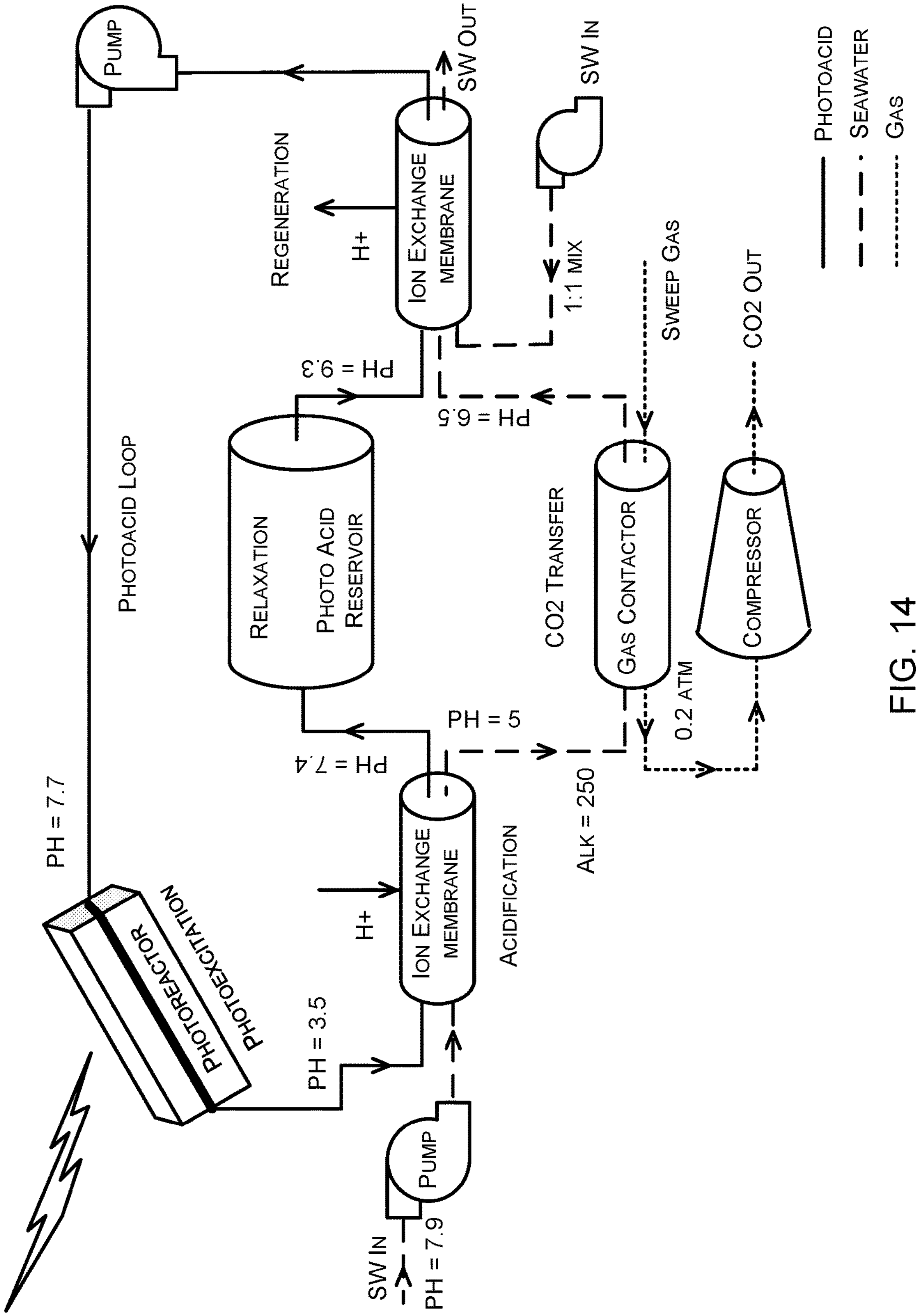

FIG. 14 illustrates an example process of carbon capture using seawater, photoacids, and sweep gas. As shown in FIG. 14, the process may include a photoacid loop (represented by solid lines), a water flow path (represented by dashed lines), a gas flow path (represented by dotted lines), and sunlight illumination (lightning bolt symbol). In FIG. 14, parameters regarding the gas may include: a design capacity of 1 Kton $CO_2$/yr captured. Parameters regarding the seawater source may include: Salinity=35; Temperature=30° C.; Alkalinity=2250 uequiv/kg; total dissolved inorganic carbon (DIC)=2000 umol/kg and an input flow rate of 36,000 $m^3$ seawater/day. Parameters regarding the seawater as it exits the process may include: total dissolved inorganic carbon (DIC)=1000 umol/kg. Parameters regarding the photoacid loop may include: Average annual sunlight illumination equivalent to 6 kWhr $m^{-2}$ sunlight per day and peak illumination of (San Diego); 17% of incident sunlight absorbed by multiple photoacids; a quantum yield of the photoacids of 0.7 (8.8 moles of acid generated $m^{-2}$ $day^{-1}$; Total sunlight collection area is roughly 2 American football fields or roughly 10,000 $m^2$); Flow rate through each 1 $m^2$ panel at peak light=5 LPM; Optical depth=5 mm; maximum fluid velocity of photo acid containing auxiliary solution=2 cm/sec; total flow rate of photo acid containing auxiliary solution=40 $m^3$/min; total volume of photo acid containing auxiliary solution=122 $m^3$; total moles of photoacid needed for the facility during operations=600 moles. Parameters regarding the photoacid may include: $pK_{a\text{-}Dark}$=8.3; $pK_{a\text{-}light}$=5.0; solubility ground state protonated form=3 mM; concentration of total dissolved photoacid=5 mM.

The photoacid loop may include the following operations. PA is converted to an acidic state in the photoreactor. Protons are transferred to seawater through a cation exchange membrane. The photoacid is subject to thermal relaxation to the ground state in the dark reservoir. Regeneration of ground state relaxed photoacid is conducted by proton exchange from two sources of seawater: acidified seawater with reduced inorganic carbon after it exits the gas contactor and natural seawater. Then, the cycle can be repeated.

The water flow path may include the following operations. Seawater is pumped through a cation exchange membrane where it is acidified by activated PA. Dissolved carbon is converted to $CO_2$. $CO_2$ is stripped out by a gas contactor membrane. Seawater with higher pH transfers protons back to ground state PA, regenerating it for the next cycle. Seawater outflow lowers ocean acidity (i.e., raises pH) of receiving water, regionally countering OA. Co-location of the system with existing seawater pumping can save energy and costs.

The gas flow path may include the following operations. Sweep gas is pumped through the gas contactor membrane where $CO_2$ from acidified seawater is added. A gas product with high $CO_2$ purity is compressed for transport to sequestration or utilization sites.

Figure 15:
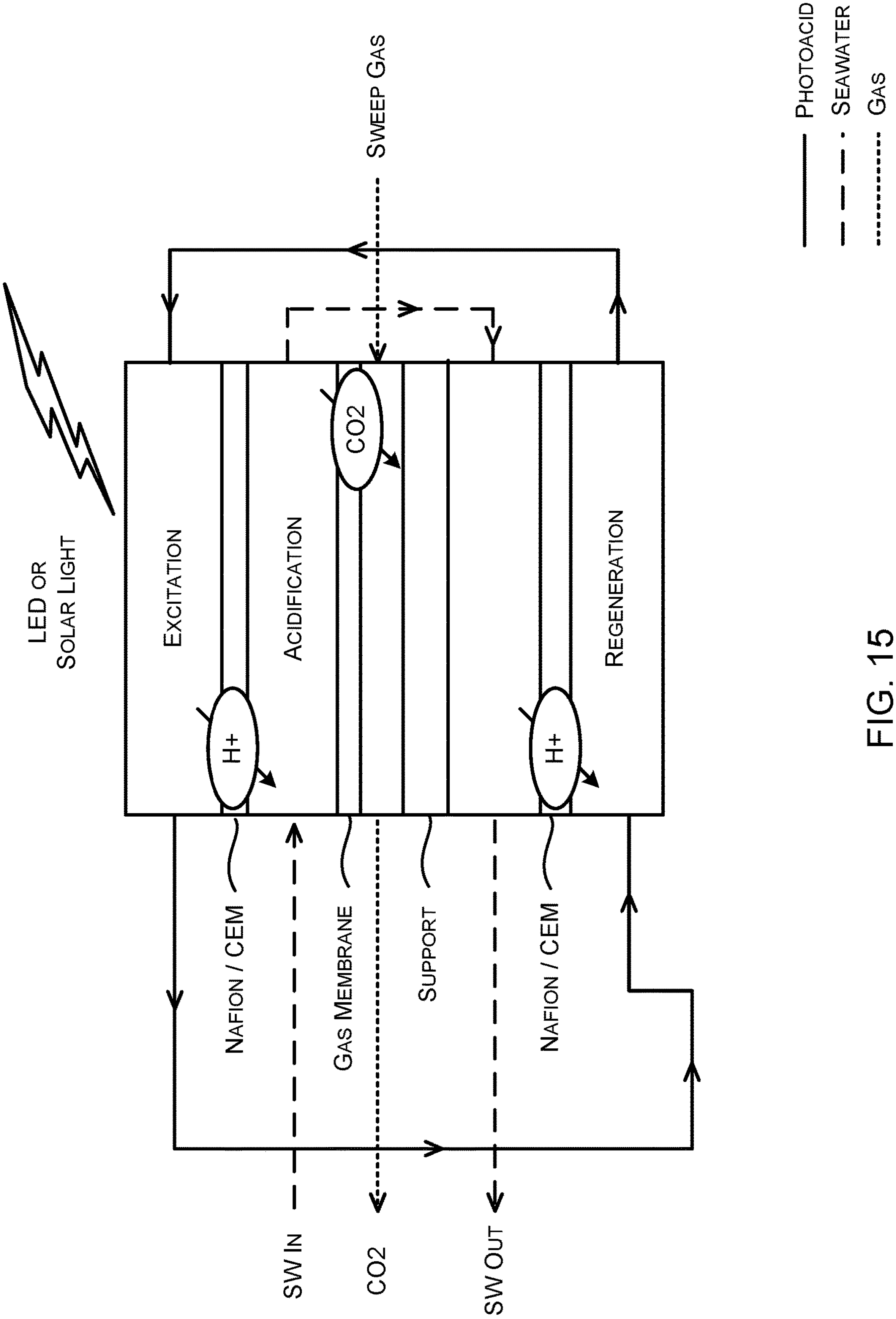

FIG. 15. Photochemical carbon capture stack. One configuration of the system has a compact form factor achieved with a stack of membranes and chambers enabling modular mass production. Similar form factors are used in fuel cells and membrane desalination. As shown in FIG. 15, the photochemical carbon capture stack includes a photoacid excitation chamber, a first cation exchange membrane (e.g., Nafion), an acidification chamber, a gas contactor membrane, a gas path chamber, a support, a seawater out chamber, a second cation exchange membrane (e.g., Nafion), and a photoacid regeneration chamber.

This system can have a similar form factor as hybrid thermal electric solar collectors. Indeed, there are use cases where sunlight can be used for the process and other parts of the solar spectrum can also be used for solar PV electricity.

Figure 16:
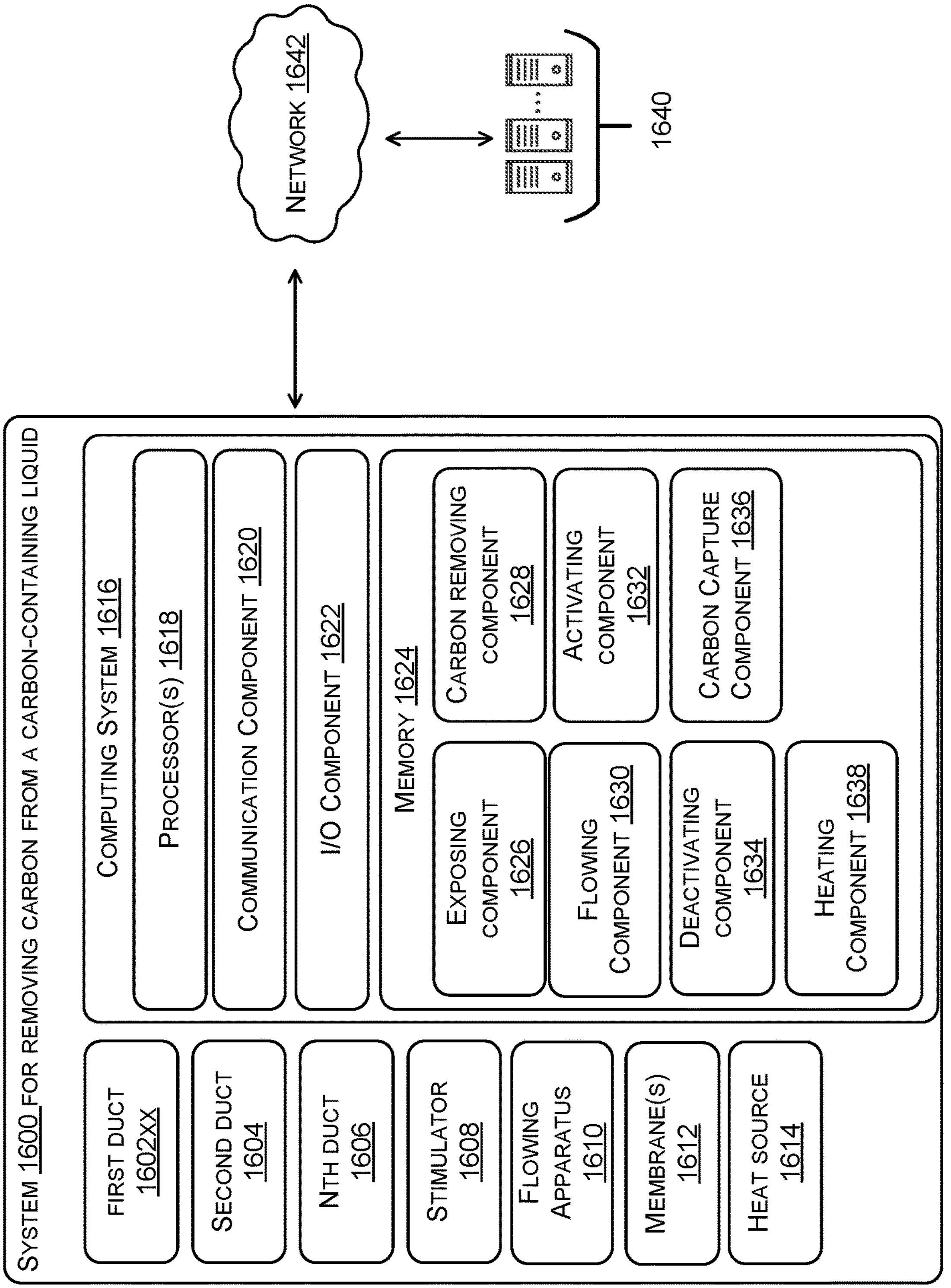

FIG. 16 illustrates an example system 1600 for removing carbon from a carbon-containing liquid. The system includes a first duct 1602, a second duct 1604, an nth duct 1606, a stimulator 1608, a flowing apparatus 1610, one or more membranes 1612, a heat source 1614, and a computing system 1616. The first duct 1602, the second duct 1604, and the nth duct 1606 are configured for carrying a carbon-containing liquid, an auxiliary fluid, and/or a target stream. The stimulator 1608 is configured for activating the photoactive compound. The stimulator may include a light source. The flowing apparatus 1610 is configured for driving the carbon-containing liquid to flow. The membrane(s) 1612 are configured for enabling the transfer of the carbon from one environment to another environment. The heat source 1614 is configured for heating the carbon-containing liquid. The computing system 1616 includes a processor 1618, a communication component 1620, an input/output (I/O) component 1622, and a memory 1624. The memory 1624 may be a computer-readable medium storing computer-executable instructions. The memory may include the following components: an exposing component 1626 is configured for exposing the carbon-containing liquid in the first duct to photoactive compounds thereby lowering the pH of the carbon-containing liquid. In some examples, the exposing component 1626 may expose the carbon-containing liquid to the membrane(s) 1612, when the auxiliary fluid is in a higher pH state, for a period of time sufficient to allow carbon removal from the carbon-containing liquid to the auxiliary fluid. A carbon removing component 1628 is configured for removing the carbon from the carbon-containing liquid into a secondary environment. A flowing component 1630 is configured for directing a flow of the carbon-containing liquid using the flowing apparatus 1610. An activating component 1632 is configured for activating the photoactive compounds using the stimulator 1608. A deactivating component 1634 is configured for deactivating the photoactive compounds by removing exposure of the photoactive compounds to the stimulator 1608. A carbon capture component 1636 is configured for capturing the removed carbon. The capture of the removed carbon follows the de-activation of the photoactive compounds. A heating component is configured for heating the carbon-containing liquid with the heating source 1614. In some instances, the system 1600 can communicate with remote computing devices 1640 via a network 1642.

Figure 17:
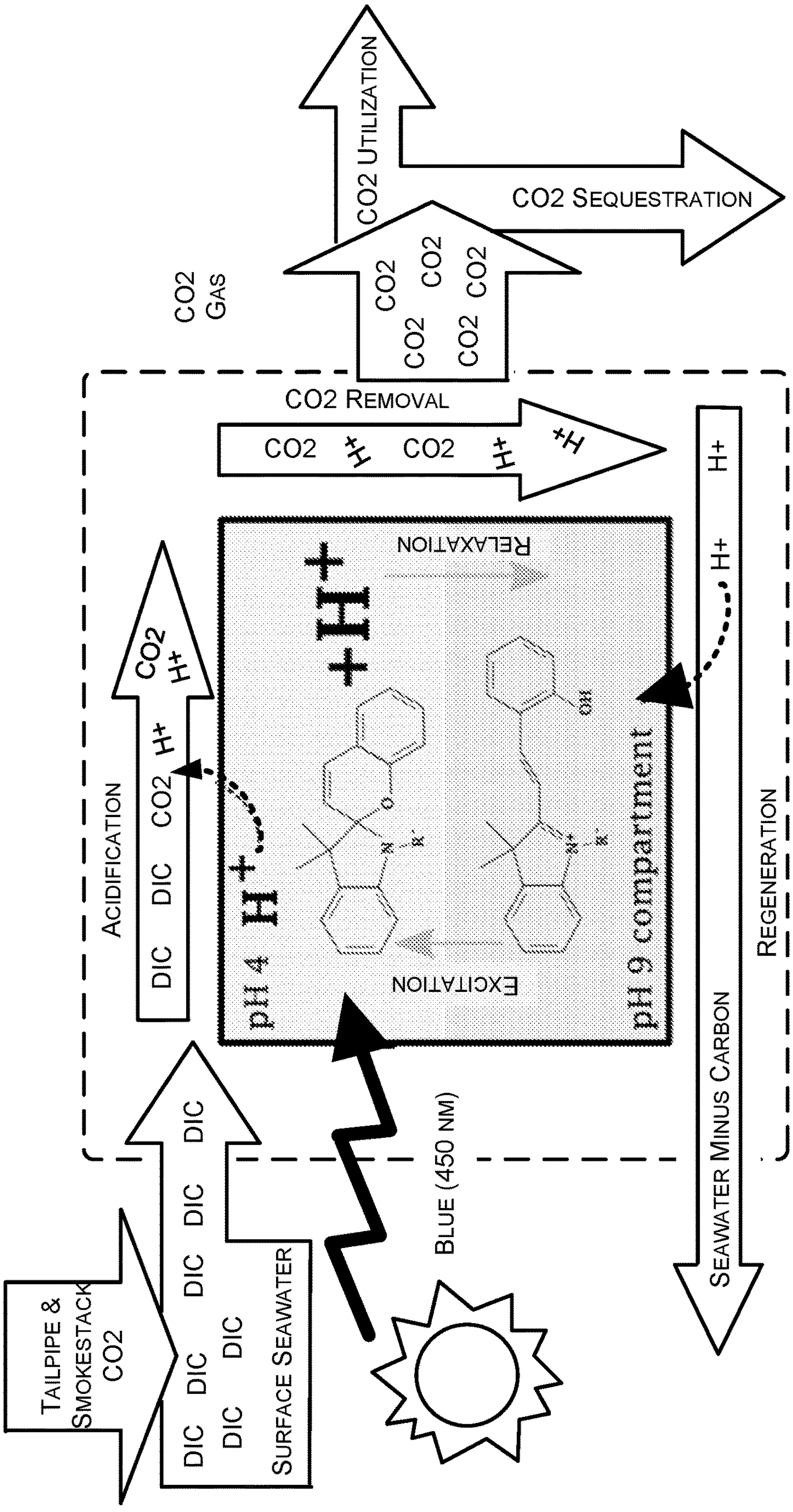

FIG. 17: Seawater and sunlight can be used as part of a low energy method to produce $CO_2$ for subsequent utilization or sequestration. This carbon capture process leverages the high concentration of dissolved carbon in seawater (DIC). This DIC is converted to $CO_2$ by light-activated photoacids, followed by diffusion across a gas contactor membrane. The $CO_2$ product can be used as is or pressurized and purified to levels required for different markets, such as sequestration or in the production of fertilizer, plastics, cement, methanol, or biofuels. By co-locating with facilities that pump and discard large volumes of seawater, such as power and desalination plants, or utilizing tidal or river currents to provide the necessary pressure head, the energy and cost expenditures associated with pumping water can be further reduced and a waste stream can be converted into a green revenue stream.

Figure 18:
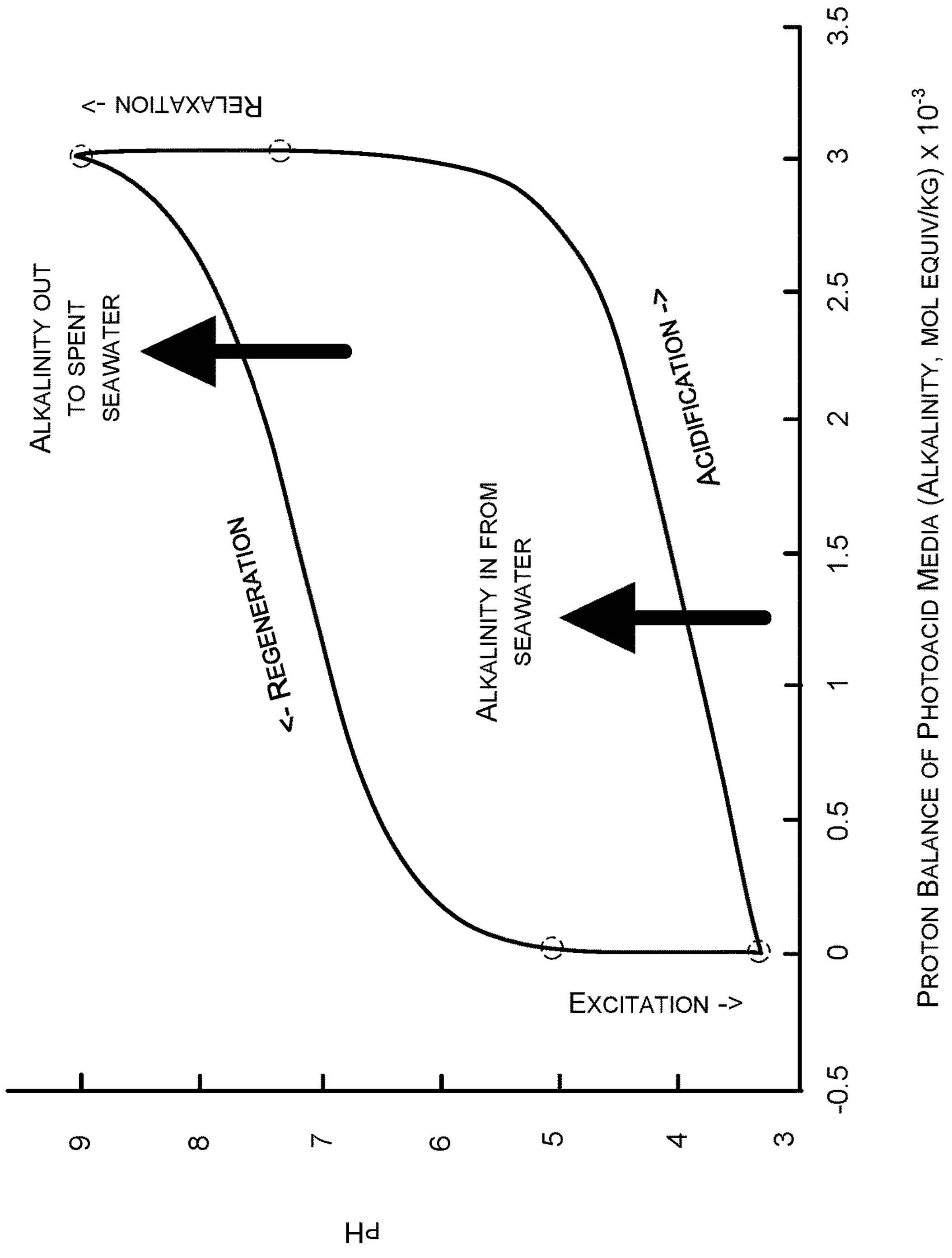

FIG. 18: Photoacid Cycle. The light-triggered reaction can transfer alkalinity from incoming seawater to outgoing seawater. In between, the seawater is temporarily acidified which causes it to release $CO_2$. This graph shows photoacid pH as it cycles through disclosed processes, modeled using the characteristics of a recently reported photoacid with $pK_{a\text{-}Dark}$=7.33 (Wimberger et al, Basic-to-acidic reversible pH switching with a merocyanine photoacid. *Chemical*

*Communications,* 2022, 58(37), 5610-5613). The model, which was validated against published photoacid reports, shows that existing photoacids like this one can be used as part of a carbon removal cycle. The shape and position of this cycle can be optimized and is affected by amount of strong base or acid that is initially added to the photoacid solution. In this example, the plotted pH is the pH of a photoacid-containing auxiliary fluid.

Figure 19:
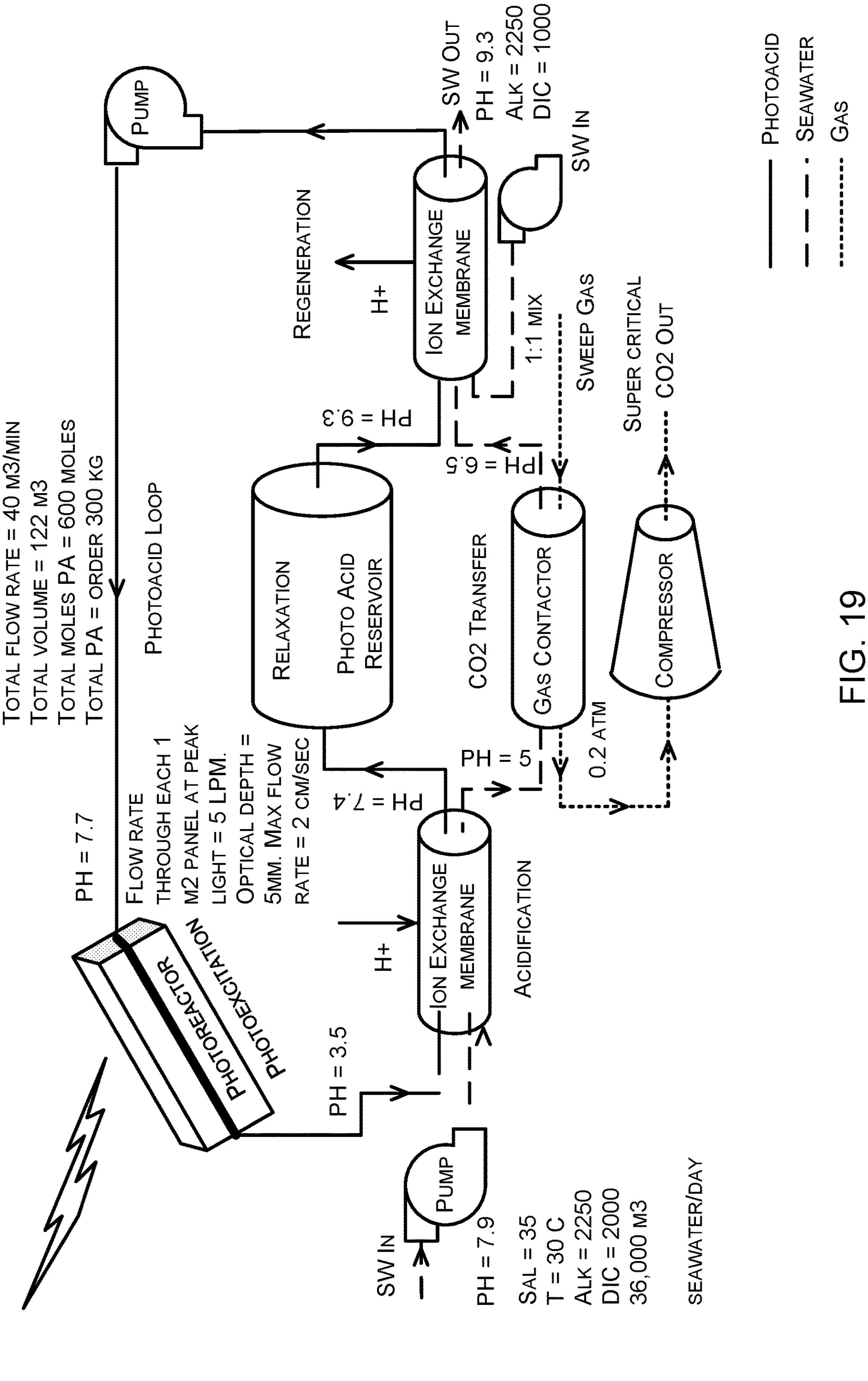

FIG. 19: An exemplary full process diagram for disclosed system to capture $CO_2$ from seawater or other natural or industrial wastewater streams.

Figure 20:
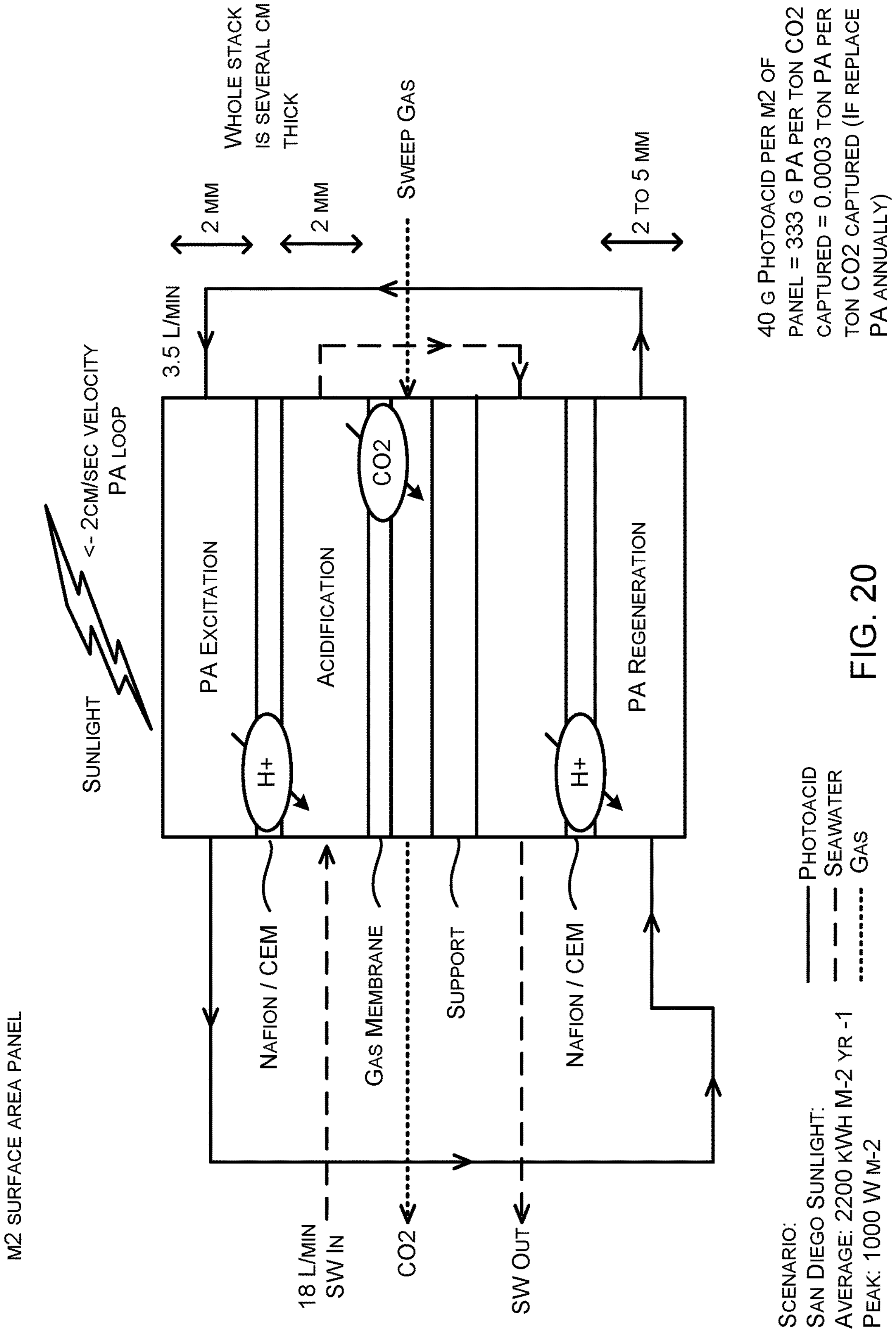

FIG. 20: An exemplary modular carbon collector showing layers of solutions, gas, ion exchange membranes, and gas contactor membrane. Dimensions and fluid flow rates are indicated for a modular carbon collector with a surface area of 1 $m^2$.

Figure 21:
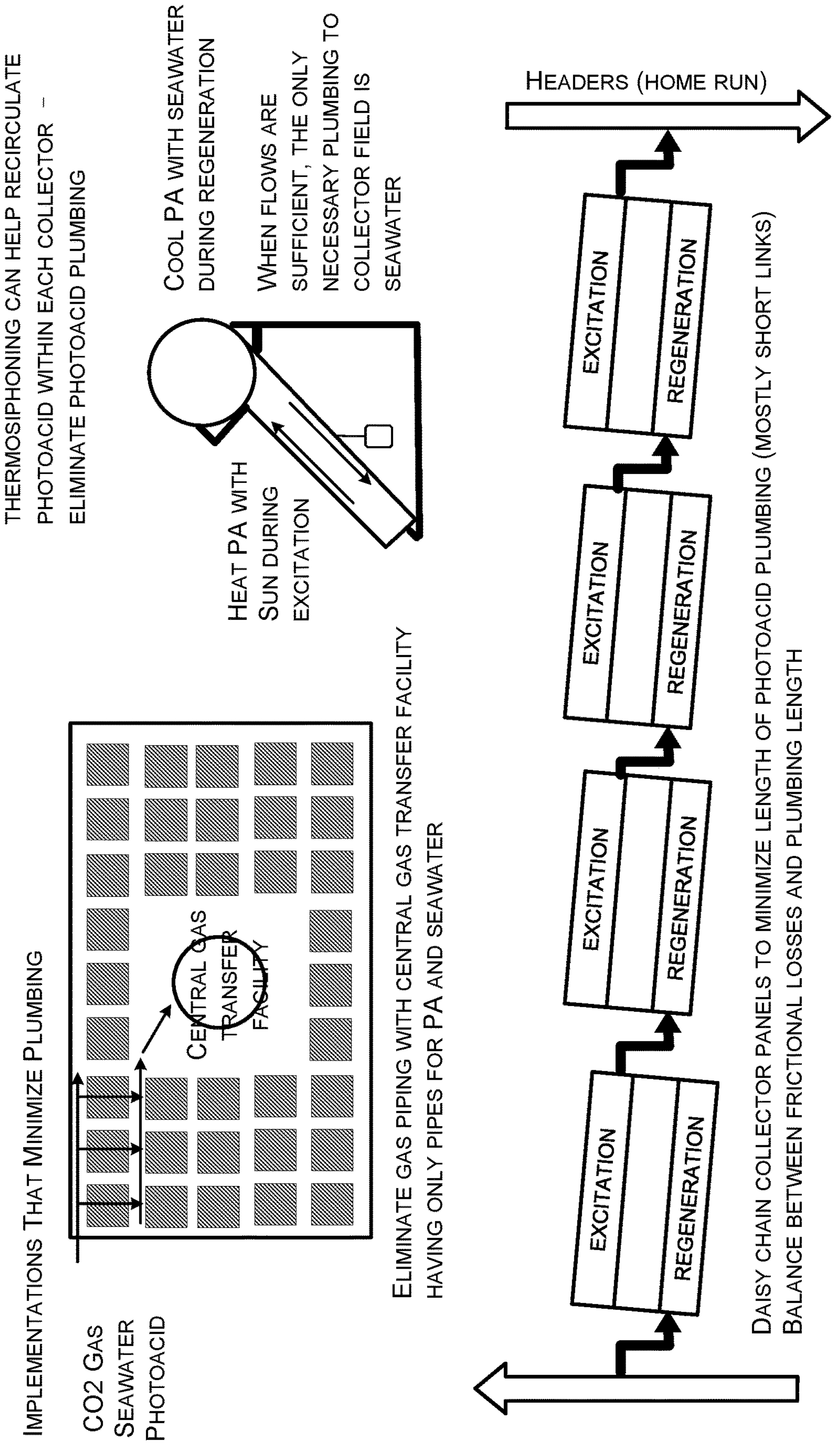

FIG. 21: An exemplary disclosed carbon capture system in which the $CO_2$ is removed from the source water within a series of individual carbon collectors like those shown in FIG. 20. (top left) Acidified seawater is transferred to a centralized gas transfer facility where carbon is removed. (top right and bottom) Exemplary diagrams of techniques to circulate photoacids that reduce the number of required pumps.

Figure 22:
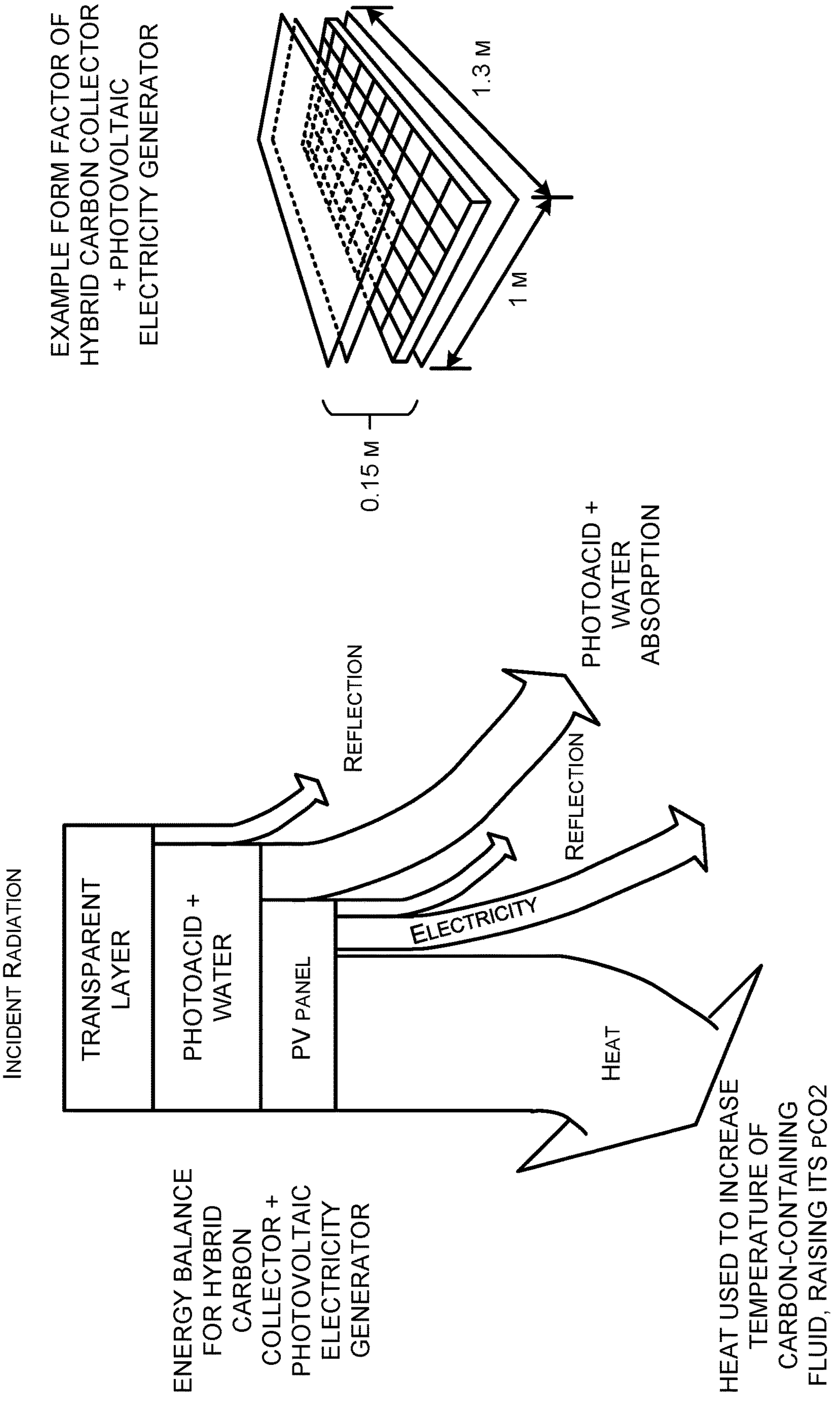
Figure 22:
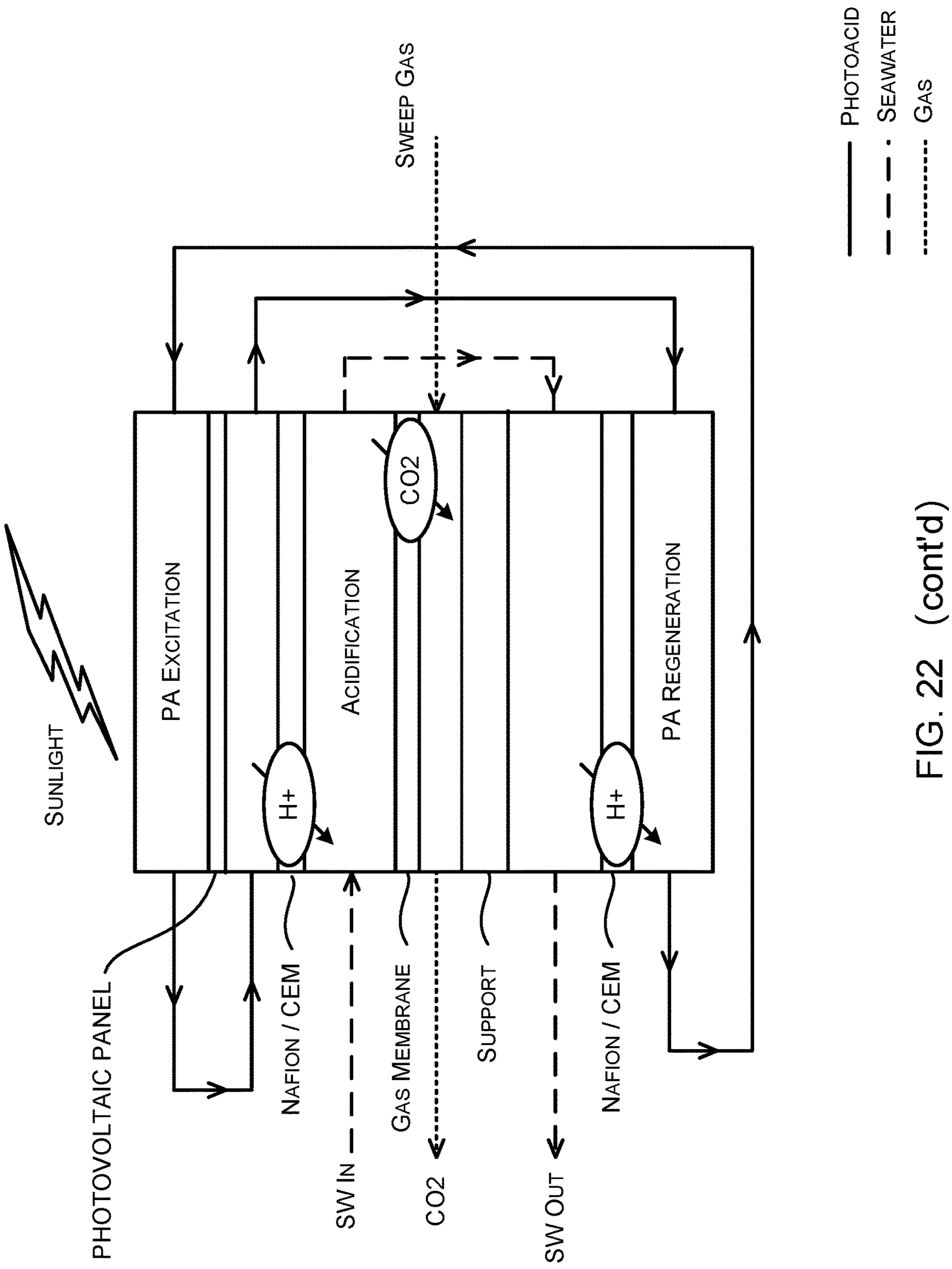

FIG. 22: Implementation of a carbon collector that incorporates solar photovoltaic (PV) cells that can generate electricity with the >80% of incident sunlight that is not required to activate the reversible photoacids (RPAs). This configuration is distinct, but analogous to, commercially available hybrid solar photovoltaic-solar thermal (PVT) panels that are used to generate electricity and heat water simultaneously. The left panel of FIG. 22 shows the energy balance for a hybrid carbon collector+PV electricity generation system. Sunlight activates the photoacid and heats water in the layer below a transparent cover layer. Light passing through the water+photoacid impacts a PV panel below the water. Heat generated is used to increase the temperature of the carbon-containing fluid, raising its $pCO_2$. An example form factor for a modular design of this system that is analogous to commercially available PVT panels is shown on the right panel of FIG. 22. A schematic showing the fluid layers and flow paths, along with the membrane and PV layers is shown in FIG. 22 (cont'd).

Figure 23:
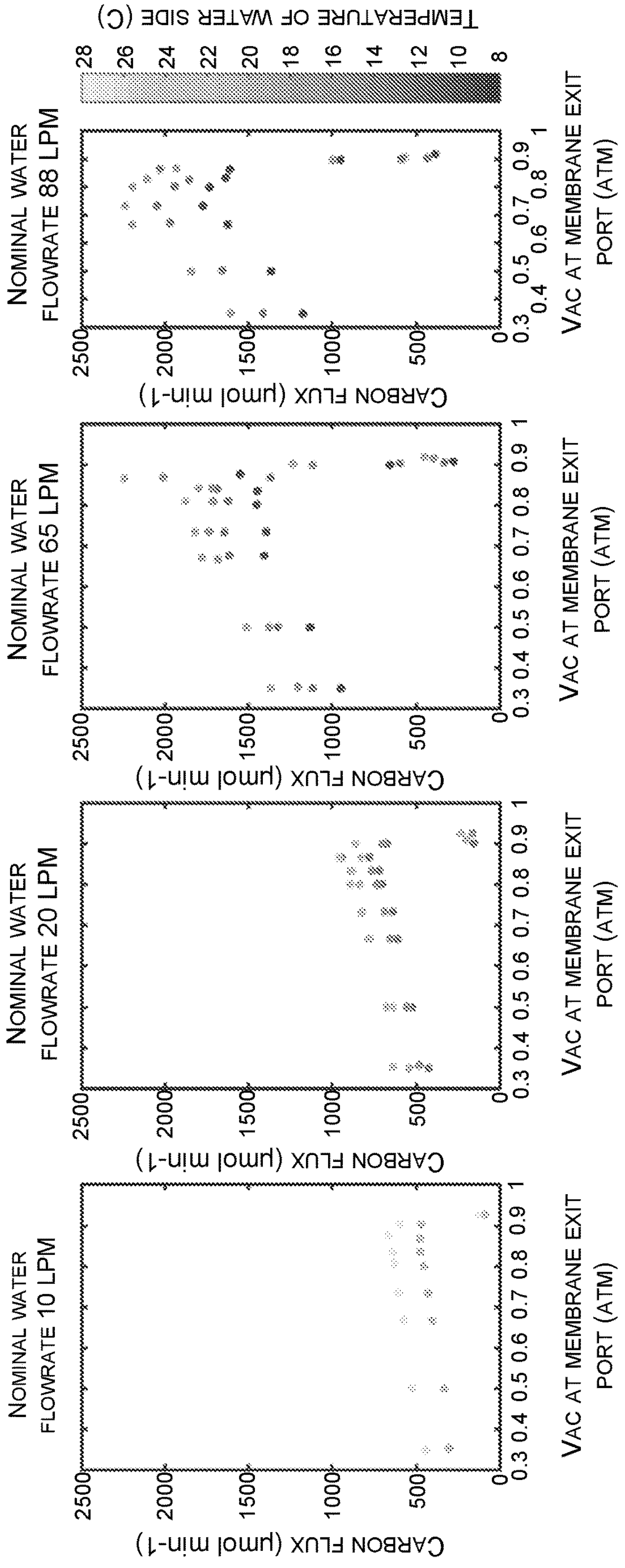

FIG. 23: Relationship of carbon flux to vacuum (x-axis), seawater flow rate (sub figures), and seawater temperature (gray shading). These experimental results are from experiments using mildly acidified water in which the $pCO_2$ was 800 ppm.

Figure 24:
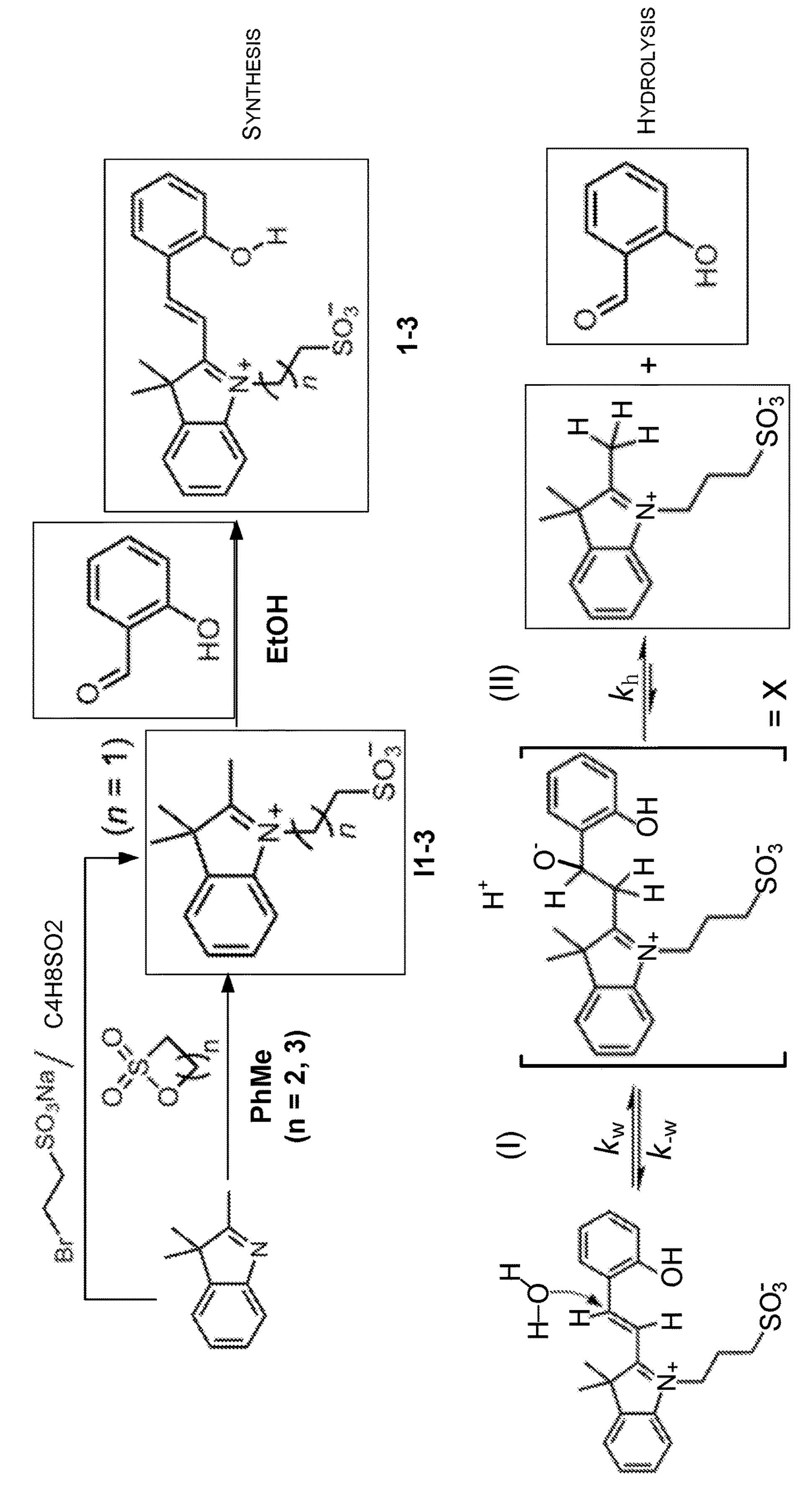

FIG. 24: The degradation products of the hydrolysis of merocyanine photoacids like those that could be used in our process can be the reactants of the final step of the synthesis of these photoacids. This could allow for the hydrolysis products being recouped from a photoacid solution after it has been used for multiple cycles in our process, and reacted to form new photoacid, saving on costs to produce our photoacid. Adapted from Berton et al., (2020) Chem. Sci. 11(32): 8457-8468.

Figure 25:
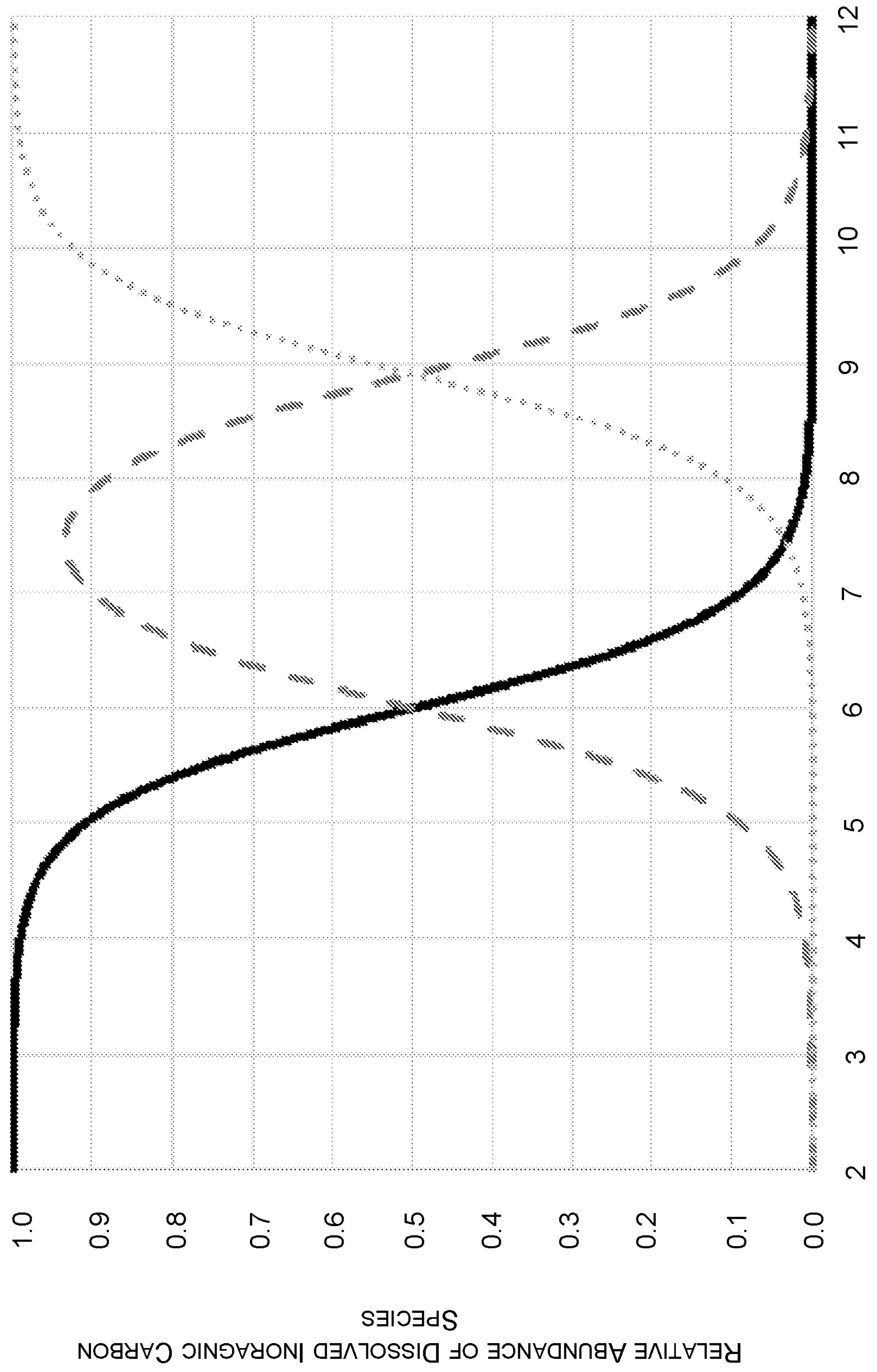

FIG. 25. The relative abundance of dissolved inorganic carbon species in typical seawater is shown as a function of pH. The bold black line indicates the relative abundance of dissolved aqueous $CO_2$*. This species becomes the minor component of dissolved inorganic carbon when seawater pH is higher than the pKa of carbonic acid, which is 6 in seawater but depends on temperature pressure and other solution properties. Other species of dissolved inorganic carbon $HCO_3^-$ (grey dashed line) and $CO_3^{2-}$ (grey dotted line) become more abundant above this pH level.

DETAILED DESCRIPTION

The disclosed systems and methods remove dissolved inorganic carbon from a carbon-containing liquid, removing this carbon from the source stream into a secondary environment. The secondary environment can be another liquid or gas, called the target stream wherein the removal results in transfer into the target stream. Dissolved inorganic carbon concentration, or dissolved carbon dioxide, in water can have multiple forms depending on the pH of the water parcel, such as $CO_2$, carbonic acid ($H_2CO_3$), bicarbonate ($HCO_3^-$), and carbonate ($CO_3^{2-}$). The total of the dissolved components of $CO_2$ makes up the dissolved inorganic carbon concentration in water (Dodds, et al., *Freshwater Ecology,* 2002).

In one version of the process (left half of FIG. 5), $CO_2$ is first removed from the source stream to a working fluid through a membrane. The working fluid contains one or more photoactive compounds. The process can be used, for example, with reversible photoacids or metastable-state photoacids. In certain examples, the photoactive compound is used to shift the pH of the working fluid between a higher pH state and a lower pH state as a result of a light stimulus.

As part of the envisioned process (FIG. 5), diffusion of $CO_2$ from the source stream into the working fluid occurs while the working fluid is in the higher pH state. After some time to allow for $CO_2$ removal from the source stream, the working fluid is functionally separated from the source stream, by sealing or otherwise making the membrane or gas contactor impermeable and/or by separating the working stream from the membrane. The amount of time necessary for sufficient $CO_2$ removal is governed by well-known chemical principles. This duration is related to the diffusivity of the membrane, the rate of source streamflow, the rate of working fluid flow, the volume of the shell and core portions of the membrane, the temperature of the source stream, and the concentration gradient for inorganic carbon species across the membrane. In one example, the separation is achieved by pumping the working fluid as part of a continuously flowing system. When not in contact with the membrane, the working fluid is isolated from other fluids or gases to limit carbon exchange. Other methods of functional separation may also be used.

The working fluid can then be shifted into a lower pH state through the stimulus of the photoactive compound with light. For other types of photoactive compounds where the more stable form is acidic, this shift occurs through the spontaneous reversion of the acid to a lower pH state over time in the absence of a stimulus. The shift to lower pH causes the concentration of carbonic acid and the partial pressure of carbon dioxide to increase within the working fluid. While in this lower pH state, the working fluid is made to interact with the target stream via a membrane or gas contactor. Inorganic carbon diffuses across a membrane or gas contactor into the target stream driven by the higher concentration of carbonic acid, and higher partial pressure of carbon dioxide. After some time to allow for carbon transfer to the target stream, the working fluid is functionally separated from the target stream. This can be by sealing or otherwise making the membrane or gas contactor impermeable and/or by separating the working stream from the membrane or gas contactor. It is thereby separated from interaction with the target stream. The amount of time necessary for sufficient carbon transfer is governed by well-known chemical principles. This duration is related to the diffusivity of the membrane, the rate of target streamflow, the temperature of the target stream, the rate of working fluid flow, the volume of the shell and core portions of the membrane, and the gradient for partial pressure of carbon dioxide across the membrane.

The working fluid is then returned to the higher pH state through the spontaneous reversion of the photoactive compound to a higher pH state with time in the absence of stimulus or for other types of photoactive compounds where the more stable form is acidic, through stimulus with light. A shift to higher pH causes the concentration of carbonic acid and the partial pressure of carbon dioxide to decrease within the working fluid. The regenerated working fluid is again made to chemically interact with the source stream via a membrane or gas contactor. Carbon diffuses into the working fluid, and the process is repeated.

In the single-stage process described above, the same sample of working fluid interacts with the source and target streams. A multi-stage process is envisioned in (FIG. 6). For each stage, $CO_2$ is transferred from one sample of working fluid in the higher pH state to another sample of working fluid in the lower pH state across a membrane. Each sample of working fluid cycles between lower pH and higher pH as described above. The use of multiple stages can increase the concentration of inorganic carbon in the final target stream to meet the needs of a wide range of applications.

In another version of the process (FIG. 7), the source stream is acidified to convert all or some of the dissolved inorganic carbon species into $CO_2$ that is then removed out of the source stream. Many embodiments of this version of the process will remove $CO_2$ directly from the source stream and transfer it into the target stream (e.g., target liquid or gas), possibly through a membrane. As part of this process the source fluid is shifted into a lower pH state through the action of a photoactive compound, which causes all or some of the dissolved inorganic carbon species ($H_2CO_3$, $HCO_3^-$, $CO_3^{2-}$) to be converted into $CO_2$ that can be removed from the source stream and transferred into the target fluid possibly through a membrane or gas contactor. The process can be used, for example, with reversible photoacids or metastable-state photoacids added directly to the source stream. Such a process could be used at small (e.g., mL to L) scales, such as in laboratory analyses of dissolved inorganic carbon concentrations and isotopic compositions, or at large scales to extract $CO_2$ from seawater or other carbon containing fluids.

In certain examples (FIGS. 7-10 and 12), photoactive compounds are directly situated within the carbon-containing source stream itself, (e.g., Chandra, A., et al. (2021). "Highly Sensitive Fluorescent pH Microsensors Based on the Ratiometric Dye Pyranine Immobilized on Silica Microparticles." Chemistry—A European Journal 27(53): 13318-13324); are attached to a boundary in contact with the carbon-containing source stream; are embedded within a material that contacts the carbon-containing source stream; are within an auxiliary fluid; or a combination of these approaches. Stimulus of the photoactive compound with light causes the photoactive compound to become more acidic, which will shift the pH of the source liquid lower as long as the pKa of the photoactive compound in its stimulated form is low compared to the initial pH of the source fluid. For other types of photoactive compounds where the illuminated form is more basic, this shift occurs through the spontaneous reversion of the photoactive compound to a more acidic state overtime in the absence of a stimulus. The shift of the source fluid to lower pH causes the concentration of carbonic acid to increase and the partial pressure of carbon dioxide to increase within the source fluid. While in this lower pH state, the source fluid is made to interact with the target stream, such that carbon dioxide can diffuse, possibly via a membrane or gas contactor. Carbon exchange without a membrane or gas contactor is also an option when removing and transferring carbon directly from a source liquid to a target gas stream. The amount of time necessary for sufficient carbon transfer between the acidified source fluid and target stream is governed by well-known chemical principles. This duration is related to the diffusivity of the membrane, the rate of source stream flow, the rate of target stream flow, the properties of the membrane if it is used, the temperature of the process streams, and the concentration gradient for inorganic carbon species between the streams.

After some time to allow for the photoactive compound to acidify the source stream, this photoactive compound is functionally separated from the part of the process where carbon dioxide exchange occurs. This can be done for example by physically removing or replacing the component containing the photoactive compound and/or by sealing or otherwise making the membrane or gas contactor impermeable and/or by changing the flow of the source stream so it no longer interacts with the photoactive compound upstream of the carbon transfer process, or a combination of these processes. The capacity of the photoactive compound to acidify the source stream is governed by well-known chemical principles. This capacity is primarily related to the amount of photoactive compound, the portion of photoactive compound that converts to a more acidic state when exposed to stimulus and the source fluid, and the rate of source stream flow. Functional separation is maintained until the photoactive compound is returned to a more basic state, a step in the process referred to as "regeneration". Herein, "relaxation" or "deactivation" refers to the photoacid itself spontaneously returning to a less acidic form in the absence of light, while "regeneration" refers to the combination of a photoacid relaxing followed by diffusion of protons into the photoacid solution so that the process can function as a continuous cycle. Regeneration occurs when the photoactive compound is removed from stimulus, returned to a more basic state, and exposed to a liquid with a pH that is low relative to the pKa of this more basic state. After regeneration, the photoactive compound is again functionally returned to the part of the process where carbon dioxide exchange occurs. The overall cycle is repeated to remove additional carbon.

There are many arrangements that allow for the acidification of source water using a photoactive compound followed by separation of the photoactive compound from the location where carbon transfer occurs and regeneration of the photoactive compound. In one example (FIG. 8), the source fluid acidification step is achieved as part of a flow through system when the source fluid is pumped past a batch of photoactive compound that is being illuminated and that is situated upstream of a membrane or gas contacting device. The batches may consist of photoacid attached to a substrate. This batch is indicated as batch A. The source fluid that flows past batch A becomes acidified and subsequently transfers carbon to the target stream through the membrane or gas contacting device (FIG. 8 top). After the source fluid transfers carbon, it is then made to pass through a batch photoactive compound in the non-stimulated state. This batch is indicated as Batch B. The source fluid exiting the carbon exchange region then regenerates Batch B of photoactive compound. After the capacity of Batch A to acidify source water has been reached and Batch B has been regenerated, the direction of the source fluid reverses, the stimulation of Batch A stops, and Batch B is stimulated (FIG. 8 bottom). In this new flow direction, Batch B acidifies the source fluid and Batch A is regenerated. The process switches back and forth between these two configurations to allow for near continuous carbon transfer from the source fluid to the target stream. In another configuration, source water is caused to flow through different batches of photoactive compounds that are illuminated or regenerated at different times without reversing the flow of source fluid. In another configuration, the photoactive compound is regenerated using source fluid from a different step of the process. In another configuration, the photoactive compound is regenerated using a fluid that is not the source fluid.

In another configuration the photoactive compound (photoacid) is attached to the source fluid side of a membrane or embedded within the membrane (FIGS. 9 and 10). In certain examples, adding photoactive compound to $CO_2$-permeable membrane materials such as polyacrylonitrile can be accomplished via an ultrasonication process. Upon illumination of the source fluid side of the membrane the photoacid is activated to its low pH state whereby it drives the production of carbonic acid and carbon dioxide from bicarbonate and carbonate ion in the source fluid, raising the partial pressure of carbon dioxide at the membrane boundary and the gradient of carbon dioxide between the source stream and the target stream. In one arrangement, the stimulated photoacid embedded within or bonded to the membrane can be regenerated by flowing source stream water in the absence of illumination. In another arrangement a rapidly regenerating photoacid can remain under continuous illumination as long as the timescale for $CO_2$ removal across the membrane is faster than the timescale of photoacid relaxation from the stimulated state.

In another configuration the photoacid can be contained in an auxiliary solution that is separated from the source stream by one or more ion exchange membranes that permit diffusion of protons into the source stream, as depicted in FIG. 11. In this configuration the auxiliary solution is illuminated to shift the photoacid into a more acidic state, which generate protons and then these protons are transported to the source fluid, for example through a membrane by diffusion. One example of several configurations that would maintain charge balance during proton diffusion is if this diffusion is accompanied by cation diffusion in the opposite direction. Other examples would be to replace cations in the auxiliary fluid using a separate fluid, or to remove anions from the auxiliary fluid. One other way these anions or cations could be generated is through an electrochemical process. The auxiliary fluid is then functionally separated from the part of the process where proton diffusion occurs. The auxiliary fluid is then allowed to return to the more basic state because illumination is removed and it is put in functional contact with another fluid stream, for example through an ion exchange membrane. This fluid, which could be the source fluid after carbon removal, or additional source fluid that has not been altered, or some other fluid that has a lower pH than the pKa of the photoacid in its basic form, acts as a source of protons. The photoacid is regenerated when protons diffuse into the auxiliary fluid. One example of several configurations that would maintain charge balance during proton diffusion is if this diffusion is accompanied by cation diffusion in the opposite direction. Other examples would be to replace cations in the auxiliary fluid using a separate fluid, or to remove anions from the auxiliary fluid. One other way these anions or cations could be generated is through an electrochemical process.

In another version of the process, $CO_2$ is first removed from the source stream to a working fluid through a membrane (FIGS. 5 and 6). As part of this process the source fluid is shifted into a lower pH state through the action of a photoacid, which causes $CO_2$ to move from the source stream to the working fluid, as described previously. The working fluid also contains a photoactive compound. This working fluid is then used to transfer carbon directly to the target stream or it is used to transfer carbon to other batches of working fluid as part of a multi-step process.

Another version of the above process utilizes temperature change with pH change and to control the flow of inorganic carbon. Increasing the temperature of a solution decreases the solubility of dissolved $CO_2$ and increases the partial pressure of $CO_2$. Heating of the carbon containing source stream to release the dissolved carbon might be done either before, after, or during exposing it to activated photoacids. Conversely, lowering the temperature of a solution increases $CO_2$ solubility and decreases the partial pressure of $CO_2$. This means that increasing temperature is analogous to decreasing pH of a carbon containing solution but temperature change does not require photoacids. The disadvantage of using temperature on its own, instead of pH and photoacids, is that the heat capacity of fluids like seawater and other natural waters is large and a correspondingly large amount of heat is transferred into or out of the source fluid and/or working fluids to cause appreciable shifts in carbon solubility. The use of temperature may be advantageous in settings where heating and cooling resources already exist in abundance, for example as part of a power plant that is cooled by water.

Another set of systems and methods combines the previously described approaches, utilizing heating, cooling, and pH changes of the source liquid and/or working fluid to capture carbon, an embodiment is depicted in FIG. 12.

The use of reversible photoactive compounds has been previously used as a technique to concentrate $CO_2$, specifically from gas streams, rather than liquids like seawater. The innovation described here leverages the natural concentration of inorganic carbon in liquids like seawater compared to air. For example, typical surface ocean seawater contains roughly 140 times the inorganic carbon as the same volume of air. Using seawater or other inorganic carbon-rich liquids as a carbon source can transform otherwise inefficient approaches into a useful carbon capture strategy. Despite the promise of using seawater or other liquids as a source of inorganic carbon for carbon capture and intense research activity in this field, practical carbon capture techniques are currently limited. The process described here combines the use of liquids like seawater to preconcentrate inorganic carbon with a method to transfer and further concentrate this carbon.

The resulting target stream rich in $CO_2$ can be used for many processes or stored, as described in more detail below.

Exemplary liquids for use as a source stream or carbon-containing liquid include: tap water, river water, seawater, lake water, glacier water, ocean water, saltwater, natural water, sound water, strait water, channel water, gulf water, estuary water, polynya water, bay water, inlet water, shoal water, ice water, acid water, basic water, industrial water, water associated with power plant or industrial cooling, water associated with desalination, water associated with industrial processes, and/or rainwater, among others.

Various components and parameters are involved in carrying out the removal and preconcentration of carbon from liquid sources. Such components and parameters can include: the carbon species for capture; the liquid solution housing the carbon species; a liquid source stream; a membrane or gas-contactor; a working fluid containing a photoactive compound; an auxiliary fluid containing a photoactive compound, the pre-acidification of the source stream using photoacids to convert bicarbonate and carbonate into dissolved $CO_2$; and a target stream.

Capturing the carbon from the liquid source includes separating the carbon produced or released from the liquid source.

The disclosed systems and methods can use aqueous or non-aqueous solutions or mixtures for the working fluid and/or for any auxiliary fluid. Advantages of aqueous solutions include simplicity, compatibility with a wide range of membrane and gas contactor materials, and ease of use. Advantages of non-aqueous solutions could include higher photoacid solubility and longer photoacid stability, which could enhance the efficiency and decrease operating costs of the process. Examples of nonaqueous solvents includes protic solvents (including ammonia, ethanol, and methanol) and aprotic solvents (including acetonitrile, acetone, and dimethyl sulfoxide).

As used herein, a working fluid contains photoactive compounds and draws carbon out of a carbon-containing liquid into itself. Systems using working fluids are depicted in, for example, FIGS. 7 and 8. An auxiliary fluid contains photoactive compounds and supplies acidity to a carbon-containing liquid but is not designed to draw carbon into itself. Instead, it is not part of the direct carbon removal and transfer pathway. Systems using auxiliary fluids are depicted in, for example, FIGS. 13, 14, and 15; 19, 20, and 22.

Within the context of the current disclosure, a "membrane" refers to a material that separates a liquid from either another liquid or a gas but allows for either (1) diffusion of $CO_2$ and/or $H_2CO_3$, or other gases, or (2) diffusion of certain ions between the liquids. A "gas contactor" refers to a material that separates a liquid from either a gas or other liquid but allows for diffusion of $CO_2$ and/or $H_2CO_3$. Such materials are well known to those of ordinary skill in the art. Examples include hollow fiber gas contactors with polymer, wood product, or ceramic fibers. A commercial example is produced by 3M under the name Liqui-Cel. Gas contactor polymer membrane materials include Polydimethylsiloxane (PDMS) or Poly-4-Methyl-penten-1 (PMP) and commercial non-porous membrane units include the SEPAREL product line (DIC Corporation). An "ion exchange membrane" refers to a material that separates a liquid from a liquid but allows for diffusion of certain ions between the liquids. Commercial examples of ion exchange membrane materials include Nafion (Chemours Company).

In certain examples, seawater is the source stream and air is the target stream. The systems can be constructed from commercially available membrane units like the SEPAREL product line (DIC Corporation) and any number of commercial pumps, like a centrifugal pump. Light can be administered using light emitting diodes, for example a Prizmatix fiber coupled LED, or other light sources. Photoacids can be synthesized following published methods, for example the photoacids and synthetic methods described in Berton et al., Thermodynamics and kinetics of protonated merocyanine photoacids in water. *Chemical Science,* 11(32), pp. 8457-8468; Shi et al., Long-lived photoacid based upon a photochromic reaction. J. Am. Chem. Soc. 2011, 133, 14699-14703; or Zayas et al., Tuning Merocyanine Photoacid Structure to Enhance Solubility and Temporal Control: Application in Ring Opening Polymerization. ChemPhotoChem 2019, 3, 467-472 or Wimberger, Laura, Joakim Andréasson, and Jonathon E. Beves. "Basic-to-acidic reversible pH switching with a merocyanine photoacid." *Chemical Communications* 58, no. 37 (2022): 5610-5613. To evaluate the effectiveness of the process, carbon transport rates and levels of carbon enrichment in a target stream can be monitored using total dissolved inorganic carbon analysis by the coulometric methods described in Dickson, Sabine, and Christian (Eds.) 2007. Guide to Best Practices for Ocean $CO_2$ Measurements. PICES Special Publication 3, and measurements of carbon dioxide partial pressure in the target stream using an instrument like a Li-Cor $CO_2$ analyzer (Li-Cor Bioscience), respectively.

Aspects of the disclosure related to (i) pH and Carbon Diffusion; (ii) Photoactive Compounds; and (iii) Uses and Locations of Carbon Removal Systems are now described with further detail and options as follows. These headings are provided for organizational purposes only and do not limit the scope or interpretation of the disclosure. Detailed examples, modeling, and experimental data are also provided in Example 1.

(i) pH and Carbon Diffusion. The main factor that governs whether carbon will diffuse from one stream through a membrane or gas contactor to another stream is the difference in the partial pressure of carbon dioxide ($pCO_2$) between the two streams. The two streams could be fluids or they could be a fluid and a gas. The first stream could be the source stream and the second the working fluid. The first stream could be the working fluid and the second could be the target stream. The first stream could be a sample of working fluid in a low pH state and the second stream could be a sample of working fluid in a high pH state. In a fluid, the partial pressure of carbon dioxide is:

$$pCO_2 = x_0 * DIC * K_H'.$$

$pCO_2$ is the partial pressure of carbon dioxide of a fluid. DIC is the concentration of total dissolved inorganic carbon in the fluid: $DIC=[CO_2*]+[HCO_3-]+[CO_3^{2-}]$. The term $[CO_2*]$ represents that combined concentration of the uncharged aqueous species $CO_{2(aq)}$ and $H_2CO_3$ such that $[CO_2*]=[CO_{2(aq)}]+[H_2CO_3]$. The use of the $CO_2*$ concept is a common approach in aquatic chemistry because it is experimentally difficult and typically impractical to distinguish $CO_{2(aq)}$ from $H_2CO_3$. $x_0$ is the mole fraction of dissolved carbon dioxide ($CO_2*$) relative to total dissolved carbon: $x_0=[CO_2*]/([CO_2*]+[HCO_3-]+[CO_3^{2-}])=[CO_2*]/DIC$. $K_H'$ is the apparent Henry's Law gas constant for the specific fluid conditions and is a function of temperature, pressure, ionic strength, major ion fluid components, and the type of fluid or solvent being used.

The abundance of dissolved carbon dioxide relative to total dissolved carbon, or $x_0$, is a function of pH (FIG. 25). This is important for the function of this process.

$$x_0 = [H^+]^2 / \left([H^+]^2 + [H^+]K_1' + K_1'{}^*(K_2')\right) \text{ and } [H^+] = 10^{-(pH)}.$$

$K_1'$ and $K_2'$ are the first and second apparent dissociation constants of carbonic acid that correspond to the specific temperature, pressure, ionic strength, and major ion concentrations of the specific fluid.

Because of the above relationships, which are well described in the aquatic chemistry literature (for example, Stumm and Morgan. Aquatic Chemistry—3$^{rd}$ ed. John Wiley & Sons Inc. (1996)), decreasing pH will increase the mole fraction of dissolved carbon dioxide relative to total dissolved carbon and will tend to increase the partial pressure of carbon dioxide. Conversely, increasing pH will decrease the mole fraction of dissolved carbon dioxide relative to total dissolved carbon and will tend to decrease the partial pressure of carbon dioxide.

The use of photoacids to lower the pH of the source stream will increase the partial pressure of carbon dioxide in the source stream. These photoacids can either be placed (1) within the source stream itself (such as embedded in solid particles or on surfaces that the water comes in contact with), (2) either on or within a gas-permeable membrane or gas-contactor membrane separating the source stream from a target stream, or (3) within an auxiliary fluid that is separated from the carbon-containing source stream by one or more ion exchange membranes that allow protons to pass from the photoacid solution to the source stream.

In the configuration shown in FIG. 5 and FIG. 6 the pH of the working fluid in contact with the source stream is high enough such that the partial pressure of carbon dioxide in the working fluid is lower than the partial pressure of carbon dioxide in the source stream. This will cause carbon dioxide to diffuse from the source stream into the working fluid. After the photoactive compound changes form and thereby lowers working fluid pH, this new pH is low enough so that the partial pressure of carbon dioxide in the working fluid is higher than the partial pressure of carbon dioxide in the target stream. This gradient in the partial pressure of carbon dioxide will cause carbon to diffuse from the working fluid into the target stream.

(ii) Photoactive Compounds. In particular embodiments, the term "light" refers to actinic light and includes all light that can produce photochemical reactions.

In particular embodiments, the term "photoactive" as used herein in reference to a compound or molecule refers to a compound capable of responding to light by chemical reaction such as a structural transformation.

In particular embodiments, the term "photoacid," as used herein in reference to a compound, refers to a compound convertible from a base or relatively weak acid into a relatively strong acid by a photochemical reaction.

Application of light to the photoactive compound converts the photoactive compound from at least one of the first or second state to the other of the first or second state. For example, the photoactive compound is in the first state, and on exposure to light, the photoactive compound changes from the first state to the second state. In this case, the first state of the photoactive molecule is a ground state, and the second state of the photoactive molecule is an excited state. Alternatively, the photoactive compound is in the second state, and on exposure to light, the photoactive compound changes to the first state. In this case, the second state of the photoactive molecule is a ground state, and the first state of the photoactive molecule is an excited state.

In an embodiment, the photoactive compound is sensitive to particular wavelengths of light. The photo-induced structural change between the required states is achieved by exposure or exclusion of light of specific wavelengths that correspond to the absorption bands of the photoactive molecule. In certain examples, the photoactive compound is sensitive to both UV light and visible light.

Alternatively, the photoactive compound may only be sensitive to visible light. In yet another alternative embodiment, the photoactive compound is sensitive to UV light. Using photoactive compounds that are sensitive to different wavelengths of light may be particularly advantageous when a solution of photoactive compounds includes multiple different types of photoactive compounds. The different types of photoactive compounds may be converted between their states at different wavelengths such that, more of the spectrum of the light illuminating the photoacid is converted into excited photoacids and protons. This provides more efficient use available light, which would allow for a smaller light collection area, and therefore lower capital costs.

In certain examples, the photo-induced change modifies the chemical environment of the photoactive compound; the change may be electronic in nature or result in a change in conformation. The photo-induced change may cause a change in the pH of the solution or the pKa of the photoactive compound.

In one set of embodiments, the photoactive compound is a photoacid. In certain examples, photoacid compounds useful within the current disclosure exist in acid form (i.e., protonated form) in the ground state and are transformable to an excited state upon irradiation with light. The excited state is typically a conjugate base of the photoacid and may exist in deprotonated form. The donation of a proton by the ground state form upon irradiation and transformation to the excited state form lowers the pH of the surrounding solution.

The operating range of the photoactive compound may be related to the difference in pKa between the excited and ground states of the photoactive molecule. The operating range may be ascertained by determining the pKa of the photoactive compound in its ground state (e.g., the base or relatively weak acid form) and the pKa of the compound in its excited state (e.g., the relatively strong acidic form). Therefore, the difference in pKa between these two forms can define the operating range of the photoactive compound.

In one embodiment, the operating range of an auxiliary solution that includes photoacids and additional acids or bases is used to shift and modulate the operating range of this auxiliary solution.

In one embodiment, the excited state form of the photoactive compound has a lower pKa than the ground state form of the compound.

In an alternative embodiment, the excited state form of the photoactive compound has a higher pKa than the ground state form of the compound.

In some embodiments, the pH of the source solution falls within the operating range pKa of the photoactive compound, and excitation of the photoactive compound provides a reduction in pH.

In certain examples, when the photoactive compound is in the first state, being the ground state, the solution has a higher pH; and on exposure to light, the photoactive compound is converted to the second state, where the solution has a lower pH. In certain examples, when the photoactive compound is in the first state, being the ground state, the solution is alkaline or weakly acidic; and on exposure to light, the photoactive compound is converted to the second state, where the solution is acidic. In one set of embodiments, photo-excitation of the photoactive molecule leads to a decrease in the pH of the surrounding solution. In certain examples, the pH of the solution when the photoactive compound is in the first state is from 7 to 10 or 9 to 12; and the pH of the solution when the photoactive compound is in the second state is from 2 to 7.5 or 0 to 8.

In certain examples, the change of pKa on excitation of the photoactive compound is at least 0.5, at least 1.0, at least 2.0, or at least 3.0. In certain examples, the photo-induced change is a change in the acid dissociation constant or base dissociation constant of a functional group.

In one set of embodiments, the light energy applied to the solution is sufficient to cause the photoactive compound to undergo a photo-induced change but is not sufficient to result in heating of the working solution.

In certain examples, the photoactive compound is present in the working solution at a concentration of from 0.1 mol/L to 50 mol/L, from 0.01 mmol/L to 0.1 mol/L, or from 0.1 mmol/L to 10 mol/L. In certain examples, the photoactive compound is present in a concentration of from 1 mol/L to 10 mol/L. In certain examples, the photoactive compound is present in the solution at a concentration of from 3 mol/L to 7 mol/L. The concentration range may be from any of the lower concentration values to any of the upper concentration values. The concentration of the photoactive compound may change depending on the presence of other compounds in the solution. If an additional absorbent molecule is present, such as an amine, then a lower concentration of the photoactive compound may be used.

In certain embodiments the photoacids are embedded within solid particles or membranes through which or by which the carbon-containing fluid passes in order to lower the pH of the source stream and increase its $pCO_2$.

In another set of embodiments, the photoacid is placed within a auxiliary fluid separated from the carbon-containing source stream by an ion exchange membrane that allows for the passage of protons into the source stream, or the accumulation of protons on the membrane itself facing the source stream, in order to lower the pH of the source stream in contact with the membrane and increase its $pCO_2$.

In one set of embodiments, the pH change may relate to the concentration of the photoactive compound in the solution, and in some cases, increasing the concentration of the photoactive compound may allow a greater pH change to be achieved.

Some general classes of photoactive compounds may be described with reference to the non-limiting examples illustrated below, which show the transformation actuated by irradiation with light.

Fulgides

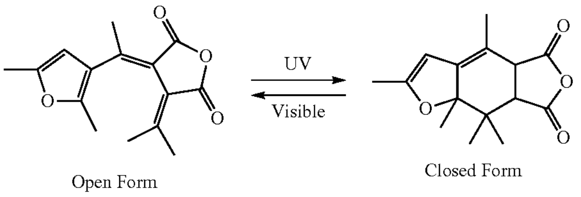 [SMILES: CC(C)=C1C(=O)OC(=O)/C1=C(\C)c1cc(C)oc1C ; "UV" ; CC1=CC2=C(C)C3C(=O)OC(=O)C3C(C)(C)C2(C)O1]

Diarylethenes

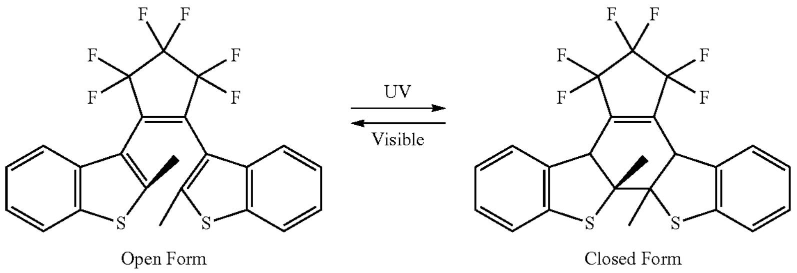

Azobenzenes

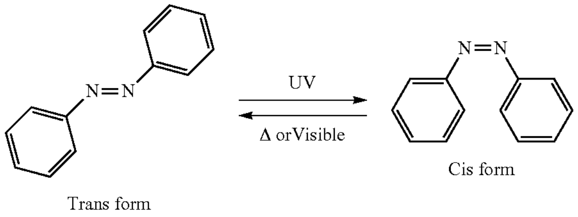 [SMILES: c1ccc(/N=N/c2ccccc2)cc1 ; "UV" ; c1ccc(/N=N\c2ccccc2)cc1]

Spiropyrans and Merocyanines

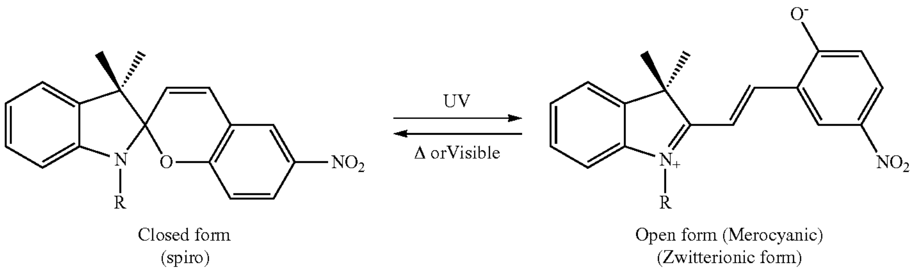

Spirooxazines and Merocyanines

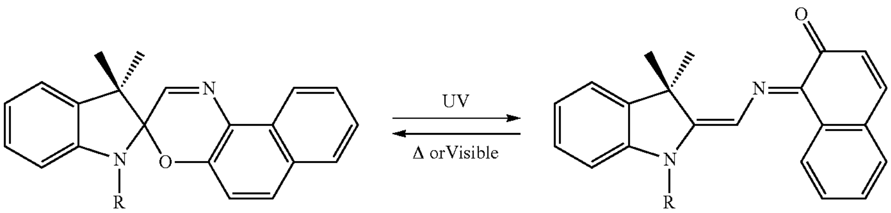

Closed form (spiro)

Open form (Merocyanine) (Quinonic form)

Quinones

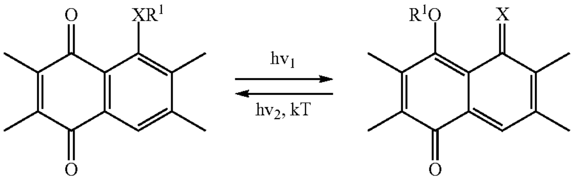

Wherein a) X═O, $R^1$=Ph; b) X═$CR^2R^3$, $R^1$═H; c) X═O, $R^1$ =

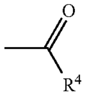

where $R^2$ and $R^3$ are hydrogen or alkyl where $R^4$ is alkyl.

Triphenylmethanes

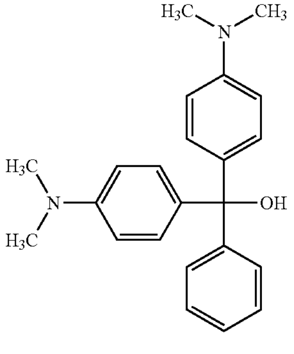 [SMILES: CN(C)c1ccc(C(O)(c2ccccc2)c2ccc(N(C)C)cc2)cc1]

Tricyanofurans

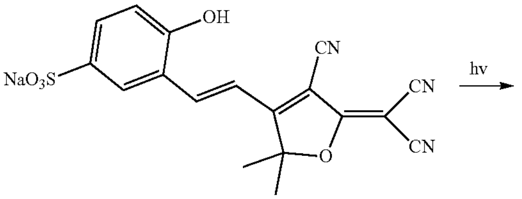

-continued

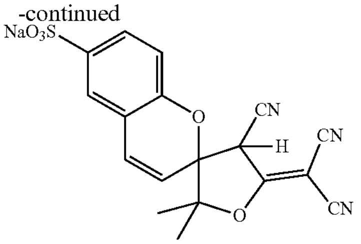

In the above examples of spiropyrans, merocyanines, and spirooxazines, the substituent "R" may, for example, be selected from the group consisting of hydrogen, $C_1$ to $C_6$ alkyl, and a —$(CH_2)_nW$ where n is from 1 to 6 (e.g., 2 to 4) and W is —$NH_2$, $CO_2^-$, or $SO_3^-$ (e.g., $SO_3^-$).

In the above example spiropyrans and merocyanines, the —$NO_2$ functional group on the ring may not be present or may be located at another position or may be replaced with another functional group.

In the above example spiropyrans, merocyanines, and spirooxazines, functional groups like —OCH3 may be added or may replace other functional groups.

In certain examples, the photoactive compound(s) is/are selected from the group consisting of: leucohydroxides, perimidinespirocyclohexadienones, azobenzenes, spiropyrans, spirooxazines, dithienylethenes, fulgides, quinones, benzo and napthopyrans, and dihydroindolizines. In certain examples, the photoactive compounds(s) is/are selected from the group consisting of: spiropyrans, merocyanines, and naphthols (such as 1-(2-nitroethyl)-2-naphthol).

In embodiments, reversible photoacids include fulgides, diarylethenes, azonbenzenes, merocyanines, spiropyrans, spirooxaines, and quinones.

In embodiments, the photoactive compounds are metastable-state photoacids, such as those that undergo conformational or structural changes upon exposure to light, altering their acidity or basicity. Examples of such compounds are given in [0100], all of which have published synthetic routes.

In particular embodiments, merocyanines are preferred photoacids, owing to their long activated state lifetime (typically minutes), the high dark pKa values that can be achieved (that dictate the useful range of natural water pH values that can be utilized), their relatively high aqueous solubility, and their relatively high stability to hydrolysis and photodegradation. In particular embodiments, the merocyanine reported by Wimberger et al. (Basic-to-acidic reversible pH switching with a merocyanine photoacid, *Chemical Communications*, 2022, 58(37) 5610-5613) with a methoxy substituent on the indolinium ring and a butyl-sulfonate group on the indolinium nitrogen is preferred. In particular embodiments, this preferred photoacid is:

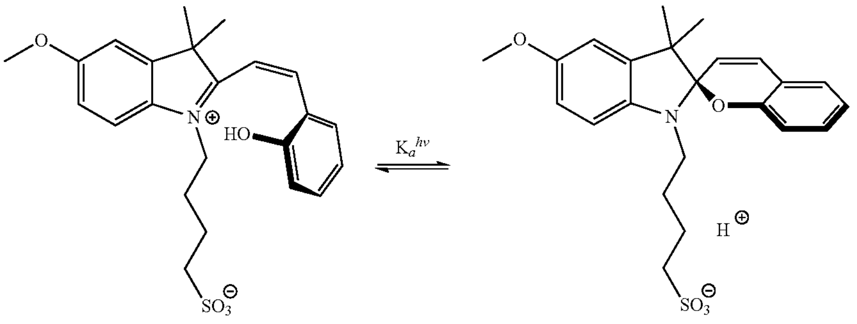

cis-MCH SP

The left structure is the unactivated (ground state) form (a merocyanine) and the right structure is the activated (excited state) form (a spiropyran). Further structural modifications to this compound can likely result in even higher dark pKa values, stability to hydrolysis, and higher aqueous solubility.

FIG. 3 also depicts a useful merocyanine-spiropyran pair. With this pair, activation occurs with visible light (not UV), and relaxation occurs spontaneously (e.g., with heat).

Additional examples of photoacid compounds suitable for use are known in the art and are described in Berton et al., Thermodynamics and kinetics of protonated merocyanine photoacids in water. Chemical Science, 2020, 11(32), pp. 8457-8468; Shi et al., Long-lived photoacid based upon a photochromic reaction. J. Am. Chem. Soc. 2011, 133, 14699-14703; or Zayas et al., Tuning Merocyanine Photoacid Structure to Enhance Solubility and Temporal Control: Application in Ring Opening Polymerization. ChemPhotoChem 2019, 3, 467-472; Berkovic et al., Chem. Rev. 2000, 100, 1741-1754; Metsuda et al., J. Photochem. Photobiol., C2004, 5169-182; Yokoyama Chem. Rev. 2000, 100, 1717-1740; U.S. Pat. Nos. 4,636,561; 6,549,327; 5,879,592; 5,185,390; 6,211,374; EP0277639; Chen et al., Photochem. Photobiol. Sci., 2011, June, 10(6) 1023-9; Johns et al., Chemistry, 2014, Jan. 13: 20(3):689-92; US 2013/0192978; Shi et al. J. Am. Chem. Soc. 2011, 133 (37) 14699-14703; Bao et al. RSC Adv., 2014, 4, 27277-27280; Luo et al. J. Mater. Chem. B, 2013, 1, 887-1001; Nunes et Al., J. Am. Chem. Soc., 2009, 14331 (26) 9356-9462; Lauren et al., Acc. Chem. Res., 2002, 35, 19-27; U.S. Pat. No. 7,588,878; Prog. Polym. Sci. vol. 21, 1-45, 1996; and WO2011/020928.

(iii) Uses and Locations of Carbon Removal Systems. $CO_2$ product produced from disclosed carbon capture processes can be used for a wide range of industrial applications and for carbon sequestration. Industries that use large quantities of $CO_2$ in their manufacturing process include: urea manufacturers (fertilizer production), methanol manufacturers, plastic manufacturers, and biofuel manufacturers. Most of the $CO_2$ used in these industries comes from fossil sources such as the burning of natural gas. Another industry that uses large quantities of $CO_2$ is the petroleum industry. The petroleum industry pumps massive quantities of $CO_2$ into oil and gas wells to enhance recovery of hydrocarbons (referred to as Enhanced Oil Recovery, or EOR). Most of the $CO_2$ used in EOR is extracted from fossil reservoirs of geologic $CO_2$. In all cases, these industries would benefit from using $CO_2$ captured from natural waters by disclosed processes as regulatory and investor pressures increase to decarbonize operations and find non-fossil fuel sources for $CO_2$.

$CO_2$ captured from disclosed processes could also be used to enhance the growth of algae and improve the efficiency of algal biofuel production.

$CO_2$ captured from disclosed processes could be used in the production of hydrocarbons and fuel from $CO_2$, for example ethanol, long chain hydrocarbons, jet fuel, gasoline, and diesel. In one scenario $CO_2$ captured from disclosed processes would be used in the Fischer-Tropsch process to produce these chemicals and fuels. In particular embodiments, long chain hydrocarbons have >8 carbon atoms.

Cannabis growth is an important market for $CO_2$. During cannabis production in greenhouses, $CO_2$ is added to the greenhouse air to enhance plant growth. Most of this $CO_2$ is sourced from burning biomass or fossil fuels. The $CO_2$ from the greenhouse is then eventually released to the environment where it contributes to global warming and climate change. Using $CO_2$ captured from the atmosphere for greenhouse production of Cannabis or other crops reduces the negative climate impacts of $CO_2$ enrichment. Disclosed capture processes make $CO_2$ more available for agriculture and reduces the climate impact of the utilized $CO_2$. Crops can be grown in an atmosphere enriched in $CO_2$ by injecting captured $CO_2$ into greenhouses or other relevant enclosures. The leaf openings responsible for $CO_2$ transport (stomata), that become smaller in a high $CO_2$ environment, are also one of the main pathways for water loss. Thus adding $CO_2$ from disclosed processes to the air around plants could limit water loss and enhance drought resilience as well as enhance growth.

A natural location for disclosed carbon capture installations is on the US Gulf Coast where numerous oil and gas companies and fertilizer and methanol producers operate. Close proximity of disclosed installations to such end users of captured $CO_2$ product reduces the costs and logistics of transporting captured $CO_2$ to end users. Furthermore, there is $CO_2$ sequestration capacity for thousands of gigatons of $CO_2$ in depleted oil and gas wells underneath the Gulf of Mexico, and many of the drilling and logistic support operators involved in oil and gas recovery are increasingly positioning themselves to transition their infrastructure and business models to carbon sequestration in the coming years.

Another good location for the for disclosed carbon capture installations is near geologic reservoirs where injection of captured $CO_2$ would lead to weathering and/or mineralization, and long-term sequestration. Examples of locations include basalts in Eastern Washington like the Columbia River Basalt, which are located near rivers with high levels of dissolved inorganic carbon (Yakima River, Snake River, and Columbia River). Other locations include offshore deployments near seafloor basalts, which represent one of the most abundant types of host rock for $CO_2$ mineralization on the planet. An offshore installation of a seawater-based carbon capture process like the one disclosed here could produce $CO_2$ for sequestration in ocean basalts and reduce the need to transport $CO_2$ to the ocean locations. Yet another example is near outcrops of ultramafic rocks in Oman, which are well suited for carbon sequestration via $CO_2$ mineralization and are located near seawater.

Cost benefits would accrue from co-locating disclosed carbon capture facilities with entities that already pump and discard large quantities of seawater or river water, such as thermoelectric and nuclear power plants, and desalination plants. These operators could turn a waste stream into a revenue stream by providing their waste water for subsequent carbon removal. Many such facilities exist along the US east and west coasts and along major rivers such as the Mississippi River, which also contains high concentrations of dissolved carbon. An added benefit to co-locating with such facilities that already pump and discard seawater is that the discarded water is often at a higher temperature than the water initially taken in (for example, because this water is frequently used for cooling mechanical or chemical systems). The higher temperatures are advantageous for disclosed processes because they increase the partial pressure of $CO_2$ in the water, making the carbon removal efficiency of disclosed processes greater. Another advantage of co-locating disclosed carbon capture installations with such facilities is that the discarded water is often at a hydraulic head greater than zero. Because disclosed process utilize only modest pressures energy costs for water pumping can be saved if the provided system intake water has some hydraulic head. Hydraulic head can also be provided by river currents, tidal currents, water behind dams or levees, or the spillways of dams or levees.

Further use cases and maritime co-location sites for disclosed carbon capture facilities include:

- Offshore wind installations. These are increasingly being deployed globally to harness wind energy where it is most abundant and predictable, and where massive structures can be placed without acquiring large tracts of land. These installations sometimes produce more electricity than the current demand, requiring them to curtail operations or pay to offload surplus electricity. By co-locating disclosed carbon capture facilities with offshore wind installations, surplus electricity can be used to drive the carbon capture process. Advantages accrue as well from the direct proximity to seawater and the cost savings that could accrue from not needing to acquire or lease land for disclosed carbon capture installations.
- Ships that capture carbon at sea and then transport it to end users and/or sequestration sites. Disclosed carbon capture systems can have a smaller form factor than direct air capture systems that require large fan farms, and there are large fluxes of seawater used and discarded in the engine cooling systems of ships that would be useful as source water for disclosed carbon capture systems.
- Offshore oil drilling rigs. Their direct connection to depleted oil and gas wells that can sequester large amounts of $CO_2$ make these platforms ideal for siting disclosed carbon capture facilities. The infinite reservoir of seawater in which they sit makes pumping and piping simpler than on land-based installations.
- Floating solar farms. These are becoming increasingly common as the cost of land in coastal communities increases. Siting disclosed carbon capture facilities with offshore (floating) solar farms would be beneficial because sequestration sites in offshore saline aquifers and depleted oil and gas wells can be close by, decreasing the transport distance of captured $CO_2$ product. Seawater is also on site, avoiding transport infrastructure. When these solar PV farms produce more electricity than is being demanded, such as in mid-day, the surplus electricity could be shunted to disclosed carbon capture processes, potentially saving electricity costs. This environment also has the advantage of being offshore in close proximity to marine basalts, which are large surface reservoirs of host rocks for carbon sequestration by weathering.
- Naval ships. Current fleets of aircraft carriers are being built with nuclear reactors capable of producing a significant surplus of energy beyond what is required for current operations, which could permit the manufacture of synthetic fuel while at sea. Multiple companies are developing synthetic fuel technology, many of which use $CO_2$ as an input. By placing disclosed carbon capture installations onboard naval ships seeking to produce their own fuel at sea, raw material can be provided on an as-needed basis. The surplus electricity being generated by the nuclear reactors could be used to power the most space-efficient form factor of disclosed systems, which is one that employs banks of LED lights.

A form factor for disclosed systems can be similar to that of hybrid solar photovoltaic-solar thermal (PVT) panels (see, e.g., FIG. 22). This form factor is attractive because it allows for modular mass production of disclosed carbon collectors. Hybrid PVT panels are increasingly being installed by homeowners and businesses due to their efficient use of incident sunlight—converting it both to electricity (requiring only 20% of the incident solar energy) and heated water—that can then be used for swimming pools, appliances, and hot water applications. There is great synergy between using sunlight to activate disclosed photochemical reactions and to produce electricity via photovoltaics in the same panel. This is feasible because disclosed photochemical reactions may only use some 15-20% of the incident solar spectrum. The remainder could be used to generate electricity by a PV panel placed below the photoacid chamber (which itself would be on the order of 1 cm thick). The presence of fluid chambers above or below the PV panel can cool it and increase the electricity-generating efficiency of photovoltaics. Heat generated can be used to warm the carbon-containing liquid, raising its $pCO_2$, and increase the efficiency of $CO_2$ transfer from source fluid to target stream.

Photoacidification can be used to enhance mineral weathering rates as part of an additional carbon removal technique. One developing approach for the removal of $CO_2$ from the atmosphere is weathering of calcium carbonate (limestone) or ultramafic rocks (i.e., those with a color index greater than 90). This process makes use of the $CO_2$ neutralization capabilities of certain minerals, such as calcium carbonate and olivine, among others. One of the issues making this approach to carbon removal inefficient is the slow rate at which these minerals react with $CO_2$. The kinetics of many weathering reactions can be sped up by adding acid or additional $CO_2$ to an aqueous solution that is applied to the finely ground minerals. The disclosed processes for producing acid by activating photoacids with light could be used to generate the acidity and/or higher $CO_2$ concentrations needed to speed up the dissolution and weathering of substances such as ultramafic rocks or calcium carbonate. This would increase the rate of carbon dioxide removal in weathering installations. Minerals could be exposed to a target solution that is made more acidic through the action of photoacids. In one embodiment, photoacids are activated in an auxiliary solution such that the photoacids generate protons. These protons are then transferred to the target solution through a membrane, which lowers the pH of the target solution, and accelerates weathering. The weathering reaction results in carbon removal, through well described geochemical processes. The photoacid could also be attached to surfaces in contact with the target solution, like beads, plates, or the target solution side of membranes.

EXEMPLARY EMBODIMENTS

1. A method of removing carbon from a carbon-containing liquid, the method including: exposing the carbon-containing liquid to photoactive compounds thereby removing the carbon from the carbon-containing liquid into a secondary environment.

2. The method of embodiment 1, wherein the secondary environment includes a target stream or a working fluid.

3. The method of embodiment 2, wherein the target stream is a liquid or gas.

4. The method of embodiment 2 or 3, wherein the secondary environment is the target stream and the removing of the carbon to the target stream is through a membrane, gas contactor, or through direct transfer.

5. The method of any of embodiments 2-4, wherein the secondary environment is the working fluid and the removing of the carbon to the working fluid is through a membrane.

6. The method of embodiment 5, wherein the membrane is a gas-permeable membrane.

7. The method of embodiment 5 or 6, wherein the membrane is an ion exchange membrane.

8. The method of any of embodiments 2-7, wherein the working fluid is between the carbon-containing liquid and the target stream.

9. The method of embodiment 8, wherein the working fluid is separated from the carbon-containing liquid by a membrane.

10. The method of embodiment 8 or 9, wherein the working fluid is separated from the target steam by a membrane or gas contactor.

11. The method of any of embodiments 8-10, wherein the working fluid is separated from the carbon-containing liquid by a membrane and the target steam by a membrane or gas contactor.

12. The method of any of embodiments 2-11, wherein the photoactive compounds are within the working fluid.

13. The method of any of embodiments 1-12, wherein the photoactive compounds are within the carbon-containing liquid or at a boundary in contact with the carbon-containing liquid.

14. The method of any of embodiments 1-13, wherein the photoactive compounds are within an auxiliary fluid separated from the carbon-containing liquid.

15. The method of embodiment 14, wherein the auxiliary fluid and the carbon-containing liquid are separated by an ion exchange membrane.

16. The method of embodiment 15, wherein the ion exchange membrane is a cation exchange membrane through which protons diffuse.

17. The method of any of embodiments 13-16, wherein the photoactive compounds lower the pH of the carbon-containing liquid.

18. The method of any of embodiments 1-17, wherein the photoactive compounds are activated photoactive compounds.

19. The method of embodiment 18, wherein the activated photoactive compounds generate protons which diffuse across a membrane to the carbon-containing liquid thereby lowering the pH of the carbon-containing liquid and removing the carbon.

20. The method of any of embodiments 1-19, wherein the photoactive compounds include photoacids.

21. The method of embodiment 20, wherein the photoacids include reversible photoacids.

22. The method of embodiment 20 or 21, wherein the photoacids include metastable-state photoacids.

23. The method of any of embodiments 1-22, wherein the photoactive compounds include merocyanines, spiropyrans, tricyanofurans, fulgides, diarylethenes, azobenzenes, spirooxazines, quinones, or triphenylmethanes.

24. The method of any of embodiments 1-23, wherein the photoactive compounds include merocyanines.

25. The method of embodiment 24, wherein the merocyanine includes a methoxy substituent on the indolinium ring and a butyl-sulfonate group on the indolinium nitrogen.

26. The method of any of embodiments 1-25, wherein the method further includes activating the photoactive compounds.

27. The method of embodiment 26, wherein activating the photoactive compounds includes exposing the photoactive compounds to light.

28. The method of embodiment 27, wherein the light is sunlight or artificial light.

29. The method of embodiment 28, wherein the artificial light is from a light emitting diode (LED) light.

30. The method of embodiment 29, wherein the light is sunlight and the photoactive compounds have different absorption spectra.

31. The method of any of embodiments 1-30, wherein the photoactive compounds are embedded within a material and/or coated on the surface of a material.

32. The method of embodiment 31, wherein the material includes a bead, particle, tube, plate, or membrane.

33. The method of embodiment 31 or 32, wherein the material includes the gas-permeable membrane of embodiment 7.

34. The method of any of embodiments 31-33, wherein the material includes the ion exchange membrane of embodiment 8.

35. The method of any of embodiments 31-34, wherein the material is within the carbon-containing liquid of embodiment 13.

36. The method of any of embodiments 31-35, wherein the material is at the boundary in contact with the carbon-containing liquid of embodiment 13.

37. The method of any of embodiments 31-36, wherein the material is within the auxiliary fluid of embodiment 14.

38. The method of any of embodiments 17-37, wherein the lowering of the pH increases the partial pressure of carbon dioxide in the carbon-containing liquid.

39. The method of any of embodiments 1-38, wherein the lowered pH is between 2 and 7.

40. The method of any of embodiments 1-39, wherein the lowered pH is between 3 and 6.

41. The method of any of embodiments 1-40, further including directing a flow of the carbon-containing liquid toward the activated photoactive compounds.

42. The method of any of embodiments 1-41, further including heating the carbon-containing liquid with a heating source.

43. The method of embodiment 42, wherein the carbon-containing liquid is heated to a temperature of −2 to 120° C.

44. The method of embodiment 42 or 43, wherein the heating source includes solar thermal energy or waste heat from power generation or an industrial process.

45. The method of embodiment 44, wherein the power generation is thermoelectric power generation or nuclear power generation.

46. A method of accelerating mineral weathering reactions including exposing minerals to a target liquid exposed to photoactive compounds that lower the pH of the target liquid thereby accelerating the mineral weathering reactions.

47. A method of capturing carbon, including exposing minerals to a target liquid exposed to photoactive compounds that lower the pH of the target liquid thereby concentrating carbon from other gases or fluids into the target liquid.

48. The method of embodiment 46 or 47, wherein the minerals are ground minerals.

49. The method of any of embodiments 46-48, wherein the minerals are ultramafic rock and/or limestone and/or olivine.

50. The method of any of embodiments 46-49, wherein the source of the carbon is combustion of fossil fuels and/or biofuels.

51. The method of any of embodiments 46-50, wherein the source of the carbon is an industrial process.

52. The method of embodiment 51, wherein the industrial process is cement production.

53. The method of any of embodiments 46-52, wherein the source of the carbon is the atmosphere.

54. The method of any of embodiments 46-53, wherein the source of the carbon is a liquid.

55. The method of embodiment 54, wherein the liquid is seawater.

56. The method of any of embodiments 46-55, wherein the photoactive compounds are within a mineral-containing target liquid or at a boundary in contact with the mineral-containing target liquid.

57. The method of any of embodiments 46-56, wherein the photoactive compounds are within an auxiliary fluid separated from the target liquid.

58. The method of embodiment 57, wherein the auxiliary fluid and the target liquid are separated by a cation exchange membrane through which protons diffuse.

59. The method of any of embodiments 1-58, further including capturing the removed carbon.

60. The method of embodiment 59, wherein the capturing of the removed carbon follows de-activation of the photoactive compounds.

61. The method of any of embodiments 18-60, further including deactivating the photoactive compounds.

62. The method of embodiment 61, wherein the deactivating includes removing exposure of the photoactive compounds to light.

63. The method of embodiment 61 or 62, wherein activating and deactivating of the photoactive compounds takes place sequentially based on a direction of flow of the carbon-containing liquid and wherein capturing the removed carbon takes place in between the activating and deactivating of the photoactive compounds.

64. The method of embodiment 62 or 63, wherein the removing exposure of the photoactive compounds to light returns the photoactive compounds to their relaxed stated, thereby regenerating the photoactive compounds for further use in the method of embodiment 1.

65. The method of embodiment 64, wherein the method further includes activating the regenerated photoactive compounds and reversing the direction of the flow of the carbon-containing liquid after the photoactive compounds have regenerated, thereby removing additional carbon.

66. The method of any of embodiments 2-65, wherein the method further includes maintaining a charge balance in the working fluid.

67. The method of any of embodiments 14-66, wherein the method further includes maintaining a charge balance in the auxiliary fluid.

68. The method of embodiment 66 or 67, wherein maintaining charge balance includes replacing protons moved from the working fluid or auxiliary fluid to the carbon-containing fluid with cations or moving anions together with protons moved from the working fluid or auxiliary fluid to the carbon-containing fluid.

69. The method of embodiment 68, where the cations or anions come from a carbon-containing fluid or from another fluid.

70. The method of any of embodiments 66-69, wherein maintaining the charge balance in the working fluid or the auxiliary fluid includes using an electrochemical reaction.

71. The method of embodiment 70, wherein the electrochemical reaction occurs based on the presence of an anode or cathode.

72. The method of any of embodiments 14-71, further including placing the auxiliary fluid in contact with a fluid stream through an ion exchange membrane, and wherein the fluid stream includes a proton source.

73. The method of any of embodiments 1-72, wherein the carbon in the carbon-containing liquid is in the form of carbon dioxide, carbonic acid, bicarbonate, and/or carbonate.

74. The method of any of embodiments 1-73, wherein the removed carbon is carbon dioxide.

75. The method of any of embodiments 1-74, wherein the carbon-containing liquid is water.

76. The method of embodiment 75, wherein the water is seawater, ocean water, or river water.

77. The method of embodiment 75 or 76, wherein the water is brackish water.

78. The method of any of embodiments 75-77, wherein the water is waste water from a power generation process or an industrial process.

79. The method of embodiment 78, wherein the power generation process is thermoelectric power generation or nuclear power generation.

80. The method of embodiment 78 or 79, wherein the industrial process is desalination.

81. A system for performing the method of any of embodiments 1-80.

82. A system for removing carbon from a carbon-containing liquid, wherein the system includes:

- a duct for carrying the carbon-containing liquid to photoactive compounds;
- a substance including the photoactive compounds; and
- a stimulator for activating the photoactive compound in the substance.

83. The system of embodiment 82, further including a unit for capturing the removed carbon.

84. The system of embodiment 82 or 83, wherein the system further includes an apparatus for flowing the carbon-containing liquid towards the photoactive compounds.

85. The system of any of embodiments 82-84, wherein the apparatus includes a pump or a hydraulic head.

86. The system of embodiment 85, wherein the hydraulic head is provided by a tide, river, or dam.

87. The system of embodiment 85 or 86, wherein the apparatus generates a convection of heated fluid.

88. The system of any of embodiments 83-87, wherein the system further includes a material between the unit and a target stream, and wherein the material enables the transfer of the removed carbon from the unit and into the target stream.

89. The system of embodiment 88, wherein the material includes a membrane, gas contactor, or a material that enables direct transfer of the removed carbon to the target stream.

90. The system of any of embodiments 82-89, wherein the system further includes a second duct for carrying a working fluid or an auxiliary fluid.

91. The system of embodiment 90, wherein the system further includes a third duct for carrying the working fluid or the auxiliary fluid.

92. The system of any of embodiments 82-91, wherein the stimulator includes a light source.

93. The system of embodiment 92, wherein the light source is an artificial light source.

94. The system of embodiment 93, wherein the artificial light source is an LED light source.

95. The system of any of embodiments 82-94, further including a heat source to heat the carbon-containing liquid 96. The system of embodiment 95, further including a fourth duct for carrying the carbon-containing liquid to the heat source.

97. A system for removing carbon from a carbon-containing liquid, wherein the system includes:

a first duct for carrying the carbon-containing liquid;

a stimulator for activating the photoactive compound;

a processor; and a computer-readable medium storing computer-executable instructions that, when executed, cause the system to perform operations including:

exposing the carbon-containing liquid in the first duct to photoactive compounds; and removing the carbon from the carbon-containing liquid into a secondary environment.

98. The system of embodiment 97, wherein:

the stimulator includes a light source; and the operations further include activating the photoactive compounds using the light source.

99. The system of embodiment 97 or 98, further including a flowing apparatus for driving the carbon-containing liquid to flow;

wherein the operations further include directing, using the flowing apparatus, a flow of the carbon-containing liquid toward activated photoactive compounds.

100. The system of any of embodiments 97-99, the operation further including deactivating the photoactive compounds by removing exposure of the photoactive compounds to the light source.

101. The system of any of embodiments 97-100, further including a capture unit for capturing the removed carbon;

wherein the operations further include capturing, via the capture unit, the removed carbon.

102. The system of embodiment 101, wherein capture of the removed carbon follows de-activation of the photoactive compounds.

103. The system of any of embodiments 97-102, wherein:

the secondary environment includes a target stream;

the system further includes a material between the capture unit and the target stream;

the operations further include allowing, for a period of time, the transfer of the removed carbon from the capture unit and into the target stream via the material.

104. The system of embodiment 103, wherein the material includes a membrane, gas contactor, or a material that enables direct transfer of the removed carbon to the target stream.

105. The system of any of embodiments 97-104, further including a heat source to heat the carbon-containing liquid;

wherein the operations further includes heating the carbon-containing liquid with the heating source.

106. The system of any of embodiments 97-105, wherein:

the secondary environment includes a working fluid;

the system further includes:

a second duct for carrying the working fluid; and a membrane in functional contact with an auxiliary fluid including the photoactive compounds;

the exposing the carbon-containing liquid to the photoactive compounds includes:

exposing the carbon-containing liquid to the membrane, when the auxiliary fluid is in a higher pH state, for a period of time sufficient to allow carbon removal from the carbon-containing liquid into the working fluid.

107. The system of any of embodiments 97-106, wherein the system further includes a pump or a hydraulic head;

wherein the operations further include disrupting, via the pump or the hydraulic head, the functional contact between the membrane and the auxiliary fluid.

108. The system of any of embodiments 82-107, further including a photovoltaic panel.

109. The system of embodiment 108, wherein the photovoltaic panel is below the substance including the photoactive compounds.

110. The system of embodiment 108 or 109, wherein the photovoltaic panel is semi-transparent and above the substance including the photoactive compounds.

111. The system of any of embodiments 82-110, wherein the photoactive compounds have different absorption spectra.

112. The system of any of embodiments 82-111, wherein the substance including the photoactive compounds further includes minerals.

113. The system of embodiment 112, wherein the minerals are ground minerals.

114. The system of embodiment 112 or 113, wherein the minerals are ultramafic rock and/or limestone.

115. The system of any of embodiments 82-114, within 1000 miles, 100 miles, 50 miles, within 40 miles, within 30 miles, within 20 miles, within 10 miles, within 5 miles, within 2 miles or within 1 mile of a carbon sequestration site.

116. The system of embodiment 115, wherein the carbon sequestration site is within an ocean, sea, river, or continental crust.

117. The system of embodiment 115 or 116, wherein the carbon sequestration site is within a rock bed.

118. The system of embodiment 117, wherein the rock bed is within an ocean, sea, or river or under an ocean, sea, or river.

119. The system of embodiment 117 or 118, wherein the rock bed is a hydrocarbon generating formation.

120. The system of embodiment 119, wherein the hydrocarbon generating formation is used for enhanced oil recovery (EOR).

121. The system of any of embodiments 117-120, wherein the rock bed contains a saline aquifer.

122. The system of any of embodiments 115-121, wherein the carbon sequestration site is within a depleted oil and gas well.

123. The system of any of embodiments 115-122, wherein the carbon sequestration site is within a saline aquifer.

124. The system of any of embodiments 82-123, within 10 miles, within 5 miles, or within 2 miles of a coastline.

125. The system of any of embodiments 82-124, installed on an offshore oil drilling rig, an offshore wind installation, a ship, offshore structure, or a floating solar farm.

126. The system of embodiment 125, wherein the ship is a naval ship.

127. Use of carbon removed from a carbon-containing liquid according to any of embodiments 1-80 as a component of a product.

128. The use of embodiment 127, wherein the product is fertilizer, plastics, cement, or a fuel.

129. The use of embodiment 128, wherein the fuel is a biofuel, petroleum, gasoline, diesel, jet fuel, or a synthetic fuel.

130. The use of embodiment 129, wherein the biofuel is an algal biofuel.

131. The use of any of embodiments 127-130, wherein the product is methanol, ethanol, or hydrocarbons.

132. The use of embodiment 131, wherein the hydrocarbons are long chain hydrocarbons.

133. Use of carbon removed from a carbon-containing liquid according to the method of any of embodiments 1-80 in the growth of a life form.

134. The use of embodiment 133, wherein the life form is algae.

135. The use of embodiment 133, wherein the life form is a crop.

136. The use of embodiment 135, wherein the crop is an agricultural crop.

137. The use of embodiment 133, wherein the life form is a plant.

138. The use of embodiment 137, wherein the plant is a cannabis plant.

139. The use of any of embodiments 133-138, wherein the use occurs in a greenhouse.

Example 1. Overall Carbon Capture Process. During the first step of the chemical cycle (FIG. 17), visible light excites reversible photoacids to release protons. These protons acidify seawater or other carbon containing liquids, lower the pH of this source liquid, and shift the dissolved carbon in this source liquid into $CO_2$ gas. This $CO_2$ gas can be removed from the source liquid by passive diffusion, for example, across commercially available gas contactor membranes. Meanwhile light is removed from the photoacid and it spontaneously relaxes back to its more basic form. The cycle is completed when the now basic photoacid is regenerated using spent source liquid. In some implementations this regeneration can also be performed with other fluids, like seawater that is not otherwise part of the process. For implementations using seawater as a carbon source fluid, the carbon-deficient seawater that is returned to the ocean has the added benefit of locally counteracting ocean acidification. The following discussion primarily describes one implementation of disclosed processes where photoacids are dissolved in an auxiliary fluid. Other implementations envision photoacids attached to the surface of substrates or embedded within materials, but the overall cycle can be analogous to the one described here.

In greater detail, a reversible photoacid adds protons to seawater or other liquids containing dissolved carbon in exchange for $Na^+$ or other cations during acidification (FIG. 18). This process could occur through a cation exchange membrane, for example. Because this process is electroneutral, which means that an equal amount of positive charge is simultaneously lost and gained, electrical potentials that would slow the rate of acidification are avoided. In aquatic chemistry terms, this cation exchange step is equivalent to removing alkalinity from the incoming seawater. During regeneration, the same amount of alkalinity is returned to the outgoing seawater through an analogous proton and cation exchange process operating in the reverse direction. Thus, alkalinity is moved between steps of the disclosed processes, but no net alkalinity is added to or removed from the ocean. This is an important advantage of disclosed processes because the need for massive chemical inputs or generating the large waste streams associated with most proposals that change whole-ocean alkalinity is avoided. Disclosed processes include the overall cycle of using a light and photoacids to move alkalinity between samples of a fluid or between different fluids (FIG. 18). Additional details and supporting results are included in the sections below for specific steps of this process.

One scenario for implementing disclosed processes, developed from process modeling, is included here with detailed process flows and chemical properties:

Excitation of Photoacids in a Photoreactor to Produce Protons. Reversible photoacids (RPAs) react to form several different chemical species in solution. Examples of these species include a ground state protonated species (GSH), a ground state deprotonated species (GS), and an excited state deprotonated species (ES). In disclosed chemical processes, light is used to excite GSH species of an RPA to the ES species, which releases protons and results in a lower pH solution, which is more acidic. The act of shining light on reversible photoacids to cause a decrease in solution pH has been demonstrated in the laboratory for many different RPAs, as has the repeated cycling of pH swings through multiple light dark cycles.

The fraction of applied light that results in a desired reaction is one key performance parameter of a photoreaction. This performance metric is controlled by the portion of applied light that matches the absorption spectrum of the GSH photoacid; the amount of incident light that is absorbed, which is a function of the extinction coefficient, path length, and concentration of the absorbing species; and the portion of absorbed light that results in the desired photoreaction (quantum yield, p). Existing RPAs are typically excited by visible blue light and are characterized by large extinction coefficients (on the order of $10^4$ L $mol^{-1}$ $cm^{-1}$). Large extinction coefficients mean that these compounds efficiently absorb light near their maximum excitation wavelength ($\lambda_{max}$=425 nm for this example photoacid). The length scale for 99% attenuation of incident light at $\lambda_{max}$ within a solution of RPAs is on the order of 1 mm, when calculated using typical RPA characteristics of an extinction coefficient of $10^4$ and an aqueous solubility of the GSH species of 2 millimolar. Total attenuation of incident blue light and excitation of GSH to ES with quantum yields up to 0.7 have been demonstrated in the laboratory in previous studies (Berton et al., 2020). These characteristics mean that practical and compact photoreactors can be designed to efficiently release protons when light is channeled through a solution containing GSH RPAs along a pathlength on the order of only a few millimeters. Other implementations could channel light onto RPAs that are either attached to the surface of materials or incorporated within materials. The high extinction coefficient and high quantum yields of RPAs means that thin layers of RPAs should be effective in these implementations.

There is also the flexibility to make pathlengths and photoreactor dimensions larger than 1 mm because most RPAs are photochromic. In photochromic compounds the absorption spectrum of the ground state species is significantly different from the absorption spectrum of the excited state species. This shift in absorption limits self-shading. Photochromic RPAs that convert to ES do not attenuate light at the wavelengths that best match GSH excitation. Therefore, light should be able to penetrate a solution of RPAs and react with remaining GSH species even if the solution thickness is larger than the characteristic length of 1 mm described above.

The optimal dimensions and design of a photoreactor will account for additional factors that include whether RPAs are dissolved in solution or fixed on a substrate; flow rates and mixing if the RPAs are dissolved in a solution; the path of the incident light, the source, intensity, and wavelengths of incident light; whether the photoreactor is integrated into other aspects of disclosed processes; and whether the photoreactor is integrated into other industrial processes. One implementation where several steps of the process are combined in modular panels is shown in FIG. 20.

FIG. 21 shows an implementation of an exemplary disclosed carbon capture system in which the source water is acidified within a series of individual carbon collectors like those shown in FIG. 20, and the acidified source water is transferred to a central gas transfer facility. This gas transfer equipment is centrally located so as to minimize gas transport pipes and capital costs. In one implementation thermosiphoning is used to recirculate the photoacid solution in each panel to eliminate the need for active fluid pumping which would reduce electricity needs, as well as reduce the capital costs of water pumps.

Use of Artificial Light Sources. Light for the RPA excitation reaction can be provided by sunlight or artificial light sources. One example of artificial light sources are light emitting diodes (LEDs). Some of the advantages of using LEDs are a compact photoreactor design and the ability to closely match the wavelength of the light source to the absorption spectrum of RPAs. High intensity blue LEDs are commercially available that match the absorption spectrum of existing RPAs. For example, the OSLON GD CSBRM2.14 Deep Blue by OSRAM is a commercially available LED with a peak emission at 445 nm that would work well with disclosed processes. This LED has a typical efficiency of 70%, which means that it produces 1.4 watts (J $sec^{-1}$) of light energy centered when driven by 2 W of input electrical energy. In one implementation, a 500 W $m^{-2}$ LED array that produces 1860 μmol photons sec $m^{-2}$ and consumes 720 watts of electrical power could be assembled using 350 LEDs (spaced 5 cm apart, which is large compared to the LED case size of 3 mm to a side). This high intensity light source is similar to the light frames used for artificially illuminated hydroponic agriculture. LEDs could also be arranged in more complex shapes to optimize RPA exposure or coupled process steps. This level of illumination would result in (1860 μmol photons $sec^{-1}$ $m^{-2}$)×(estimated 95% optical coupling between light source and photoreaction solution)×(0.7 quantum yield)=1237 μmol of ES and protons produced $sec^{-1}$ $m^{-2}$ and cost $0.043 per hour in electricity assuming a price of $0.06 $kWh^{-1}$ for commercial electricity. If the protons produced by this reaction result in $CO_2$ transfer with 85% efficiency, then a 1 $m^2$ LED array would produce (1237 μmol protons $sec^1$)×(85%)×(60 sec/1 min)×(60 min/1 hr)=3.79 mol $CO_2$ $hr^{-1}$ or 167 g of $CO_2$ $hr^{-1}$. There are $10^6$ g of $CO_2$ in a ton, so the LED electrical costs per ton of $CO_2$ in this scenario is $259 dollars $ton^{-1}$ $CO_2$ captured. For this example LED array system, the area of LED illumination required for a 1 kton $CO_2$/yr installation is 685 $m^2$. If each modular panel is 10 cm tall, then the system could be contained in a volume that is 3 m tall and 5 m per side, which is about the same volume as a standard 40-Ft High Cube shipping container.

Sunlight as a Light Source. Using sunlight to excite the photoacids is an energy efficient option that can reduce operational costs because the energy and costs to operate LEDs or other artificial lights is no longer needed. However, only a portion of the solar spectrum matches the absorption spectrum of GSH photoacids; sunlight is only available during a portion of the day; and sunlight is less intense than many artificial light sources, so the area required to collect sufficient light can be large. The choice between sunlight and/or artificial light will depend upon the specific application and will be governed by factors including energy costs, sunlight availability, land availability, size constraints, and the capital costs associated with manufacturing photoreactors.

The typical amount of sunlight available at several locations near seawater or rivers with dissolved $CO_2$ is summarized in the following table.

| Location | Direct normal daily solar irradiation averaged over the year (kWh $m^{-2}$ $day^{-1}$) | Considerations |
|---|---|---|
| San Diego, CA | 6.0 | West Coast, USA; nearby desalination plant |
| Pismo Beach, CA | 5.7 | Location of Diablo Canyon near nuclear power plant |
| Corpus Christi, TX | 5.3 | Gulf Coast, USA; close to sequestration potential of Gulf of Mexico |
| Salalah, Oman | 6.6 | Major Oman coastal industrial city; Oman has large geological sequestration potential |
| Iquique, Chile | 6.8 | Major port and industrial zone near high dissolved carbon seawater |
| Jubail, Saudi Arabia | 5.9 | Largest seawater system and industrial city in the world |
| Perth, Australia | 5.7 | Major city; there is much higher solar potential to the north |
| Puntarenas, Costa Rica | 6.6 | Major port city that may be near offshore sequestration potential |

-continued

| Location | Direct normal daily solar irradiation averaged over the year (kWh $m^{-2}$ $day^{-1}$) | Considerations |
|---|---|---|
| Rotterdam, Netherlands | 3.4 | Major port with access to North Sea oil fields for possible sequestration |
| Bergen, Norway | 2.5 | Major port with access to North Sea oil fields for possible sequestration |
| Richland, WA, USA | 4.8 | Near the Columbia River, a source of natural water with dissolved carbon that has several dams to provide water flow, and a nearby geologic carbon sequestration demonstration site. |

San Diego with 6.0 kWh $day^{-1}$ $m^{-2}$ or 2200 kWh per year $m^{-2}$ of direct normal solar radiation is provided as a design example. Currently available photoacids are expected to absorb roughly 13% of the earth surface solar spectrum. Example calculations follow for the solar collector area required for a 1 kton $CO_2$/yr facility at a site with sunlight like San Diego. With the parameters used in these calculations, 10,000 $m^2$, or about two American football fields of area are needed to capture the sunlight required for a 1 kton $CO_2$/yr installation.

(2200 kWh $yr^{-1}$ $m^{-2}$) (0.95 optical loss) (13% of solar spectrum active) (100% attenuation)=272 kWh $yr^{-1}$ $m^{-2}$ of active radiation absorbed by photo acid;

(272 kWh $yr^{-1}$ $m^{-2}$ absorbed) (1000 Wh/1 kWh) (3,600 J/1 Wh)=$1\times10^9$ J $yr^{-1}$ $m^{-2}$ absorbed;

($1\times10^9$ J $yr^{-1}$ $m^{-2}$ absorbed)/($4.62\times10^{-19}$ J per 430 nm photon—see above) (1 mole/$6.02\times10^{23}$ photons)=3,706 moles photons absorbed $yr^{-1}$ $m^{-2}$;

(3,706 moles photons absorbed $yr^{-1}$ $m^{-2}$) (0.7 quantum yield)*(0.85 conversion to $CO_2$)=2,205 moles of $CO_2$ generated $yr^{-1}$ $m^{-2}$;

A 1 kton $CO_2$ facility requires $22.7\times10^6$ moles/yr so a ($22.7\times10^6$ moles $yr^{-1}$)/($2.20\times10^3$ moles $CO_2$ yr $m^{-2}$)=10,307 m2 of solar collection area would be needed;

An American Football field is 360 ft×160 ft=57,600 $ft^2$. This is (57,600 $ft^2$)/(3.28 ft $m^{-1}$)/(3.28 ft $m^{-1}$)=5,354 $m^2$. This means a 1 kton $CO_2$ facility with current tech would require (10,307 $m^2$)/(5,353 $m^2$)=1.9 American Football fields of solar collection area.

For this scenario, solar energy requires 15 times the surface area of the LED example. Notably, the solar collection area cannot be stacked and made compact like LED or other artificial light source scenarios.

One way to improve the efficiency of the sunlight driven process is if multiple photoacids are used with different absorption spectrums (with several different lambda max), so that they can collect more of the solar spectrum. This approach is supported by studies showing that chemical changes to RPA structure can shift the lambda max (Liu, Junning, Wenqi Tang, Lan Sheng, Zhen Du, Ting Zhang, Xing Su, and Sean Xiao-An Zhang. "Effects of Substituents on Metastable-State Photoacids: Design, Synthesis, and Evaluation of Their Photochemical Properties." *Chemistry—An Asian Journal* 14, no. 3 (February 2019): 438-45. doi.org/10.1002/asia.201801687.

In another implementation to use the energy in sunlight more efficiently, the photoreactor could be combined with solar photovoltaic panels (FIG. 22). This implementation is analogous to commercially available hybrid solar photovoltaic-solar thermal panels that are used to generate electricity and heat water simultaneously. For example, photovoltaic panels could be placed below a solution containing RPAs. The sunlight not absorbed by the RPAs would travel through the solution and be absorbed by the PV collector to generate electricity. This approach would use the energy in sunlight to both capture carbon and produce electricity. This approach could boost revenue and the beneficial environmental impact of the system. In one alternative implementation a specialized semi-transparent solar PV panel is placed above the RPA solution instead of placing the PV panel under the RPA solution.

$CO_2$ Diffusion. Extensive lab and field tests under relevant seawater flow rates have been conducted to show that the diffusion step does not require exotic membranes or high pressures and can be attained using off-the-shelf components. In these experiments, a commercial gas contactor membrane (Separel EF-040p-Q-AN, Japan) that is porous to $CO_2$ but not water or ions was used to extract $CO_2$ from seawater. Carbon dioxide diffuses passively across a 40 μm thick Poly-4-Methyl-penten-1 (PMP) membrane that separates the lumen and shell sides of the device. The surface area of the EF-040p-Q-AN membrane that was used is 40 $m^2$, but larger and smaller sizes are available. Seawater is pumped through the shell side of the membrane and a small flow of sweep gas (ambient air in this case) is pulled through the lumen side using a sealed laboratory vacuum pump (Welch 2585B) positioned downstream of the membrane. In other tests, a sweep gas was pushed through the membrane using a pump upstream of the gas contactor. In yet other tests, a vacuum was applied to the lumen side of the membrane without sweep gas. Comparable $CO_2$ transfer efficiencies form the liquid to the gas are achieved whether operating the gas side of the membrane under vacuum or at positive (>1 atm) pressure.

As $CO_2$ is transferred from the water side of the gas contactor membrane to the air side, the DIC of the water decreases and alkalinity is unchanged. Therefore, the carbon flux across the membrane is indicated by the drop in DIC between the seawater entering and exiting the contactor multiplied by the water flow rate according to Equation 1:

$$CF_{SWAC} = (DIC_{SWAC} - DIC_{OUT})\frac{SF}{\rho_{SWAC}}. \quad \text{(Equation 1)}$$

Carbon fluxes across the membrane were also independently calculated from $pCO_2$ of the gas exiting the lumen side of the membrane. The overall agreement between these two independent estimates shows the ability to accurately measure carbon fluxes. Experimental data was also compared to a numeric model of a membrane-based gas contactor that accounts for advection, diffusion, and chemical reactions of inorganic carbon. In this model, seawater and sweep gas within the gas contactor are broken into discrete boxes. Countercurrent flow advects seawater and sweep gas in opposite directions. $CO_2$ moves between seawater and the sweep gas by diffusion through the membrane. Inorganic carbon within each well-mixed seawater box is subject to kinetic and equilibrium chemical reactions. This validated numeric model is used to predict carbon transfer rates across a broad range of conditions to aid design for process optimization.

In one series of experiments, seawater was acidified such that the alkalinity of the seawater was reduced from 2300 to 300 μequiv/kg, which corresponds to the approximate level expected in disclosed processes. Carbon fluxes increased dramatically with acidification of the seawater. For example, carbon flux rates increased 33-fold from 25 μmol $CO_2$ $min^{-1}$ $m^{-2}$ of membrane in unacidified seawater to 825 μmol $CO_2$ $min^{-1}$ $m^{-2}$ in acidified seawater, while other experimental conditions remained constant. These experiments demonstrate one of the fundamental principles underlying disclosed processes, that the removal of $CO_2$ from natural waters can be enhanced through acidification. One factor that distinguishes disclosed processes from other techniques is that this acidification is achieved using reversible photoacids. Furthermore, these experimental data agree well with the numeric gas transfer model, which predicted carbon removal rates of 860 μmol $CO_2$ $min^{-1}$ $m^{-2}$ for acidified seawater under these experimental conditions, or an accuracy error of less than 5%.

For a given level of acidification, the highest carbon fluxes that could be removed from seawater with the Separel EF-040p-Q-AN membrane were attained when seawater flow rates were maximized, heating of the seawater was maximized, and the vacuum strength was near 0.85 atm (FIG. 23).

The reproducibility of carbon fluxes with different membranes of the same design; at different locations, including using natural seawater in the field and artificial seawater in the laboratory; when measured several months apart; and in comparison to the previously described modelling builds confidence in the ability to predictably remove $CO_2$ from seawater.

Photoacid Degradation and Ideal Photoacid Characteristics. One factor to consider in implementing disclosed processes is photoacid degradation. Current RPAs are known to hydrolyze in aqueous solutions on the timescale of hours to days. At these rates, replacing RPAs could become cost prohibitive for some applications. Adjustments to RPA structure could slow this degradation reaction (Berton, et al. 2021). The main degradation pathway is known (Berton, et al. 2020), and is just the reverse of the last synthetic step for making RPA (FIG. 24). In other words, the products of the degradation reaction are the starting materials for the last step of RPA synthesis. This means that it can be possible to recover the degradation products to regenerate RPAs. RPAs are also stable for months in some non-aqueous solvents like acetonitrile. Another approach to limiting degradation is the use of non-aqueous solvents or mixtures of non-aqueous and aqueous solvents for the RPA containing working fluid. Immobilizing RPAs on surfaces or within materials may also positively impact degradation rates.

Closing Paragraphs. Unless otherwise indicated, the practice of the present disclosure can employ conventional techniques of chemistry, organic chemistry, biochemistry, analytical chemistry, physical chemistry, and electrochemistry. These methods are described in the following publications. See, e.g., Harcourt, et al., Holt McDougal Modern Chemistry: Student Edition (2018); J. Karty, Organic Chemistry Principles and Mechanisms (2014); Nelson, et al., Lehninger Principles of Biochemistry 5th edition (2008); Skoog, et al., Fundamentals of Analytical Chemistry (8th Edition); Atkins, et al., Atkins' Physical Chemistry (11th Edition); Lefrou, et al., Electrochemistry: The Basics, with Examples, 2012, Anslyn and Dougherty, Modern Physical Organic Chemistry.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Exemplary computer-readable storage media includes phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to the drawings. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Each embodiment disclosed herein can comprise, consist essentially of, or consist of its particular stated element, step, ingredient, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient, or component not specified. The transition phrase "consisting essentially of" limits the scope of the embodiment to the specified elements, steps, ingredients, or components and to those that do not materially affect the embodiment. A material effect would cause a statistically significant reduction in the efficiency with which carbon can be removed from a carbon containing fluid and transferred to a target gas or liquid stream.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the," and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents, printed publications, journal articles, and other written text throughout this specification (referenced materials herein). Each of the referenced materials are individually incorporated herein by reference in their entirety for their referenced teaching.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Definitions and explanations used in the present disclosure are meant and intended to be controlling in any future construction unless clearly and unambiguously modified in the examples or when the application of the meaning renders any construction meaningless or essentially meaningless. In cases where the construction of the term would render it meaningless or essentially meaningless, the definition should be taken from Webster's Dictionary, 3rd Edition, or a dictionary known to those of ordinary skill in the art, such as the Oxford Dictionary of Biochemistry and Molecular Biology (Eds. Attwood T et al., Oxford University Press, Oxford, 2006).

What is claimed is:

1. A method of removing dissolved inorganic carbon from a flowing liquid source stream comprising a carbon-containing liquid, the method comprising: exposing the carbon-containing liquid to photoactive compounds thereby removing the dissolved inorganic carbon from the carbon-containing liquid into an environment.

2. The method of claim 1, wherein the photoactive compounds are within the carbon-containing liquid, at a boundary in contact with the carbon-containing liquid, or within an auxiliary fluid separated from the carbon-containing liquid.

3. The method of claim 1, wherein the photoactive compounds lower a pH of the carbon-containing liquid.

4. The method of claim 3, wherein exposing the carbon-containing liquid to the photoactive compounds lowers the pH of the carbon-containing liquid to a level between 2 and 7.

5. The method of claim 1, wherein the photoactive compounds are activated photoactive compounds.

6. The method of claim 1, wherein the photoactive compounds comprise reversible photoacids.

7. The method of claim 1, wherein the method further comprises activating the photoactive compounds by exposing the photoactive compounds to a light source.

8. The method of claim 7, further comprising deactivating the photoactive compounds by removing exposure of the photoactive compounds to the light source.

9. The method of claim 1, wherein the photoactive compounds are within a material and/or coated on the material.

10. The method of claim 9, wherein the material is within the carbon-containing liquid, at a boundary in contact with the carbon-containing liquid, or within an auxiliary fluid.

11. The method of claim 1, further comprising capturing the removed carbon.

12. The method of claim 1, further comprising deactivating the photoactive compounds by removing exposure of the photoactive compounds to light and regenerating the photoactive compounds by allowing proton transfer into an auxiliary fluid comprising the photoactive compounds.

13. The method of claim 1, wherein a charge balance in the carbon-containing liquid and/or an auxiliary fluid comprising the photoactive compounds is maintained by replacing protons moved from the auxiliary fluid to the carbon-containing liquid with cations, moving anions together with protons moved from the auxiliary fluid to the carbon-containing liquid, and/or generating the protons and/or the anions using an electrochemical reaction.

14. The method of claim 1, wherein the dissolved inorganic carbon comprises one or more carbon-containing compounds selected from carbon dioxide, carbonic acid, bicarbonate, and/or carbonate; and/or the carbon-containing liquid is water.

15. A method, comprising:

receiving, by a duct, a liquid source stream comprising a carbon-containing liquid;

exposing, by the duct, the carbon-containing liquid to a material comprising and/or coated with photoactive compounds, thereby removing inorganic carbon from the carbon-containing liquid; and capturing, by a unit, the inorganic carbon.

16. The method of claim 15, the duct being a first duct, the method further comprising:

carrying, by a second duct, a working fluid comprising the material or an auxiliary fluid comprising the material.

17. The method of claim 15, the material being a first material, the method further comprising:

transferring, by a second material disposed between the unit and a target stream, the inorganic carbon from the unit into the target stream.

18. The method of claim 1, wherein the carbon-containing liquid is one or more of tap water, river water, seawater, lake water, glacier water, ocean water, saltwater, natural water, sound water, strait water, channel water, gulf water, estuary water, polynya water, bay water, inlet water, shoal water, ice water, acid water, basic water, industrial water, water associated with power plant or industrial cooling, water associated with desalination, water associated with industrial processes, rainwater, waste water from a power generation process or an industrial process, or brackish water.

19. The method of claim 1, further comprising:

receiving the flowing liquid source stream from an ocean or a lake.

20. A system, comprising:

a flowing apparatus;

one or more ducts configured to receive a flow of a liquid source stream;

a material comprising and/or coated with photoactive compounds configured to be activated by a first portion of incident light, the material being disposed in the one or more ducts;

a photovoltaic cell disposed underneath the material and configured to generate electricity using a second portion of the incident light;

a gas contactor;

one or more processors; and memory storing instructions that, when executed by the one or more processors, cause the one or more processors to perform operations comprising:

exposing a carbon-containing liquid in the liquid source stream to the photoactive compounds by causing the flowing apparatus to pump the liquid source stream comprising a carbon-containing liquid in the one or more ducts, thereby causing the material to transfer inorganic carbon from the carbon-containing liquid to the target stream.

21. A method of removing dissolved inorganic carbon from a carbon-containing liquid, the method comprising: exposing a flow of the carbon-containing liquid to at least one photoactive compound thereby removing the dissolved inorganic carbon from the carbon-containing liquid into an environment.

* * * * *